United States Patent
Takayama et al.

[11] Patent Number: 6,119,060
[45] Date of Patent: *Sep. 12, 2000

[54] ELECTRONIC EQUIPMENT APPARATUS AND ELECTRONIC EQUIPMENT ASSEMBLY

[75] Inventors: Masatoshi Takayama, Hiroshima; Hiroshi Ohmura, Hatsukaichi; Isao Hirashima, Hiroshima-ken; Nagahisa Fujita; Futoshi Shoji, both of Hiroshima; Yoshinori Otsubo, Higashihiroshima, all of Japan

[73] Assignee: Mazda Motor Corporation, Hiroshima, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/046,662

[22] Filed: Mar. 24, 1998

[30] Foreign Application Priority Data

| Mar. 31, 1997 | [JP] | Japan | 9-081581 |
| Mar. 31, 1997 | [JP] | Japan | 9-081741 |
| Mar. 31, 1997 | [JP] | Japan | 9-081742 |
| Mar. 31, 1997 | [JP] | Japan | 9-081743 |
| Mar. 31, 1997 | [JP] | Japan | 9-096675 |

[51] Int. Cl.[7] .................................................. G06F 7/00
[52] U.S. Cl. .................................. 701/36; 701/1; 701/49; 307/9.1
[58] Field of Search .................................. 701/1, 36, 49; 345/112, 121; 307/9.1, 10.1; 340/461

[56] References Cited

U.S. PATENT DOCUMENTS

| 5,091,856 | 2/1992 | Hasegawa et al. | 701/36 |
| 5,404,443 | 4/1995 | Hirata | 701/36 |
| 5,467,277 | 11/1995 | Fujisawa et al. | 701/36 |
| 5,555,502 | 9/1996 | Opel | 701/36 |
| 5,916,288 | 6/1999 | Hartman | 701/36 |

FOREIGN PATENT DOCUMENTS

| 6-107082 | 4/1994 | Japan . |
| 61-244636 | 10/1996 | Japan . |

*Primary Examiner*—William A. Cuchlinski, Jr.
*Assistant Examiner*—Gertrude Arthur

[57] ABSTRACT

An opening portion (2) is formed on an instrumental panel (1). A plurality of units (U1–U3) and a panel body (P) corresponding to the units are arranged. The units (U1–U3) have neither an input portion such as switches operated by the passenger nor an output portion such as a display for the passenger, and switch groups (7, 8) and a display (5) are mounted on the panel body (P). The units (U1–U3) and panel body (P) are coupled and connected to each other in advance to obtain an electronic equipment assembly. Of this assembly, the units (U1–U3) are stored in the instrumental panel (1) via the opening portion (2), and the opening portion (2) is covered by the panel body (P), so that the panel body (P) constitutes a portion of the wall surface in the passenger room.

49 Claims, 91 Drawing Sheets

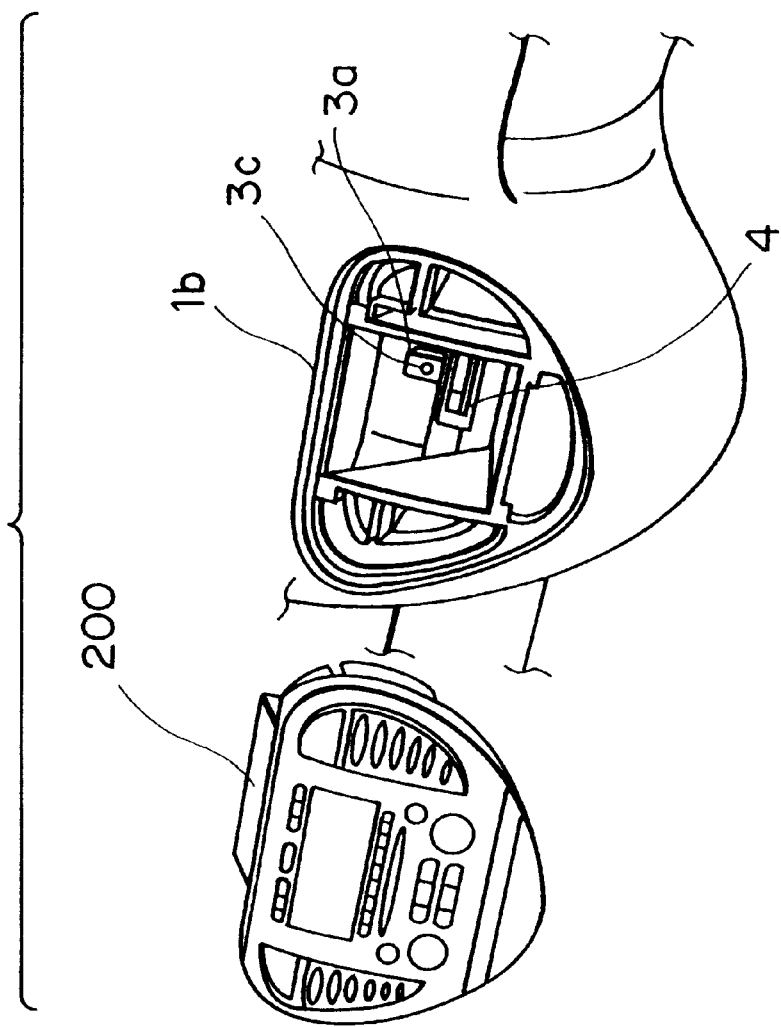
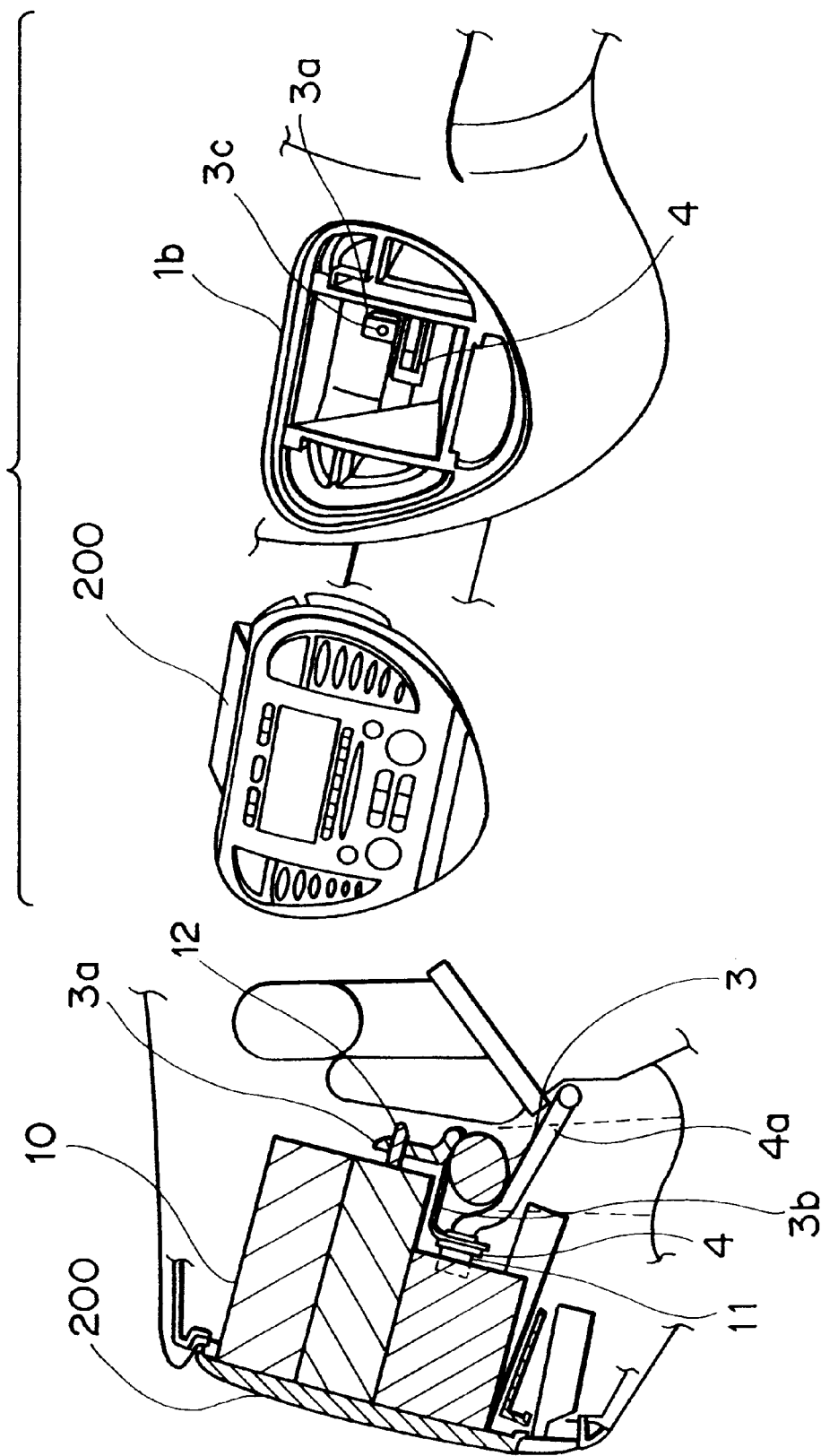
FIG. 62A
FIG. 62B

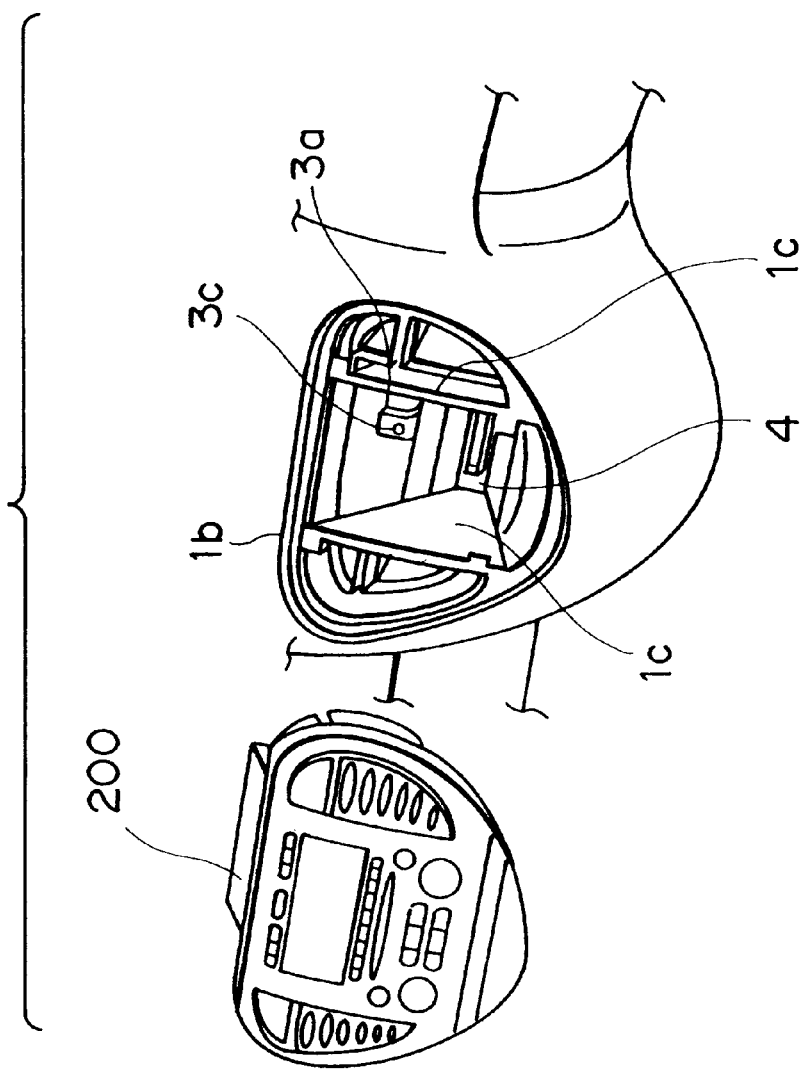
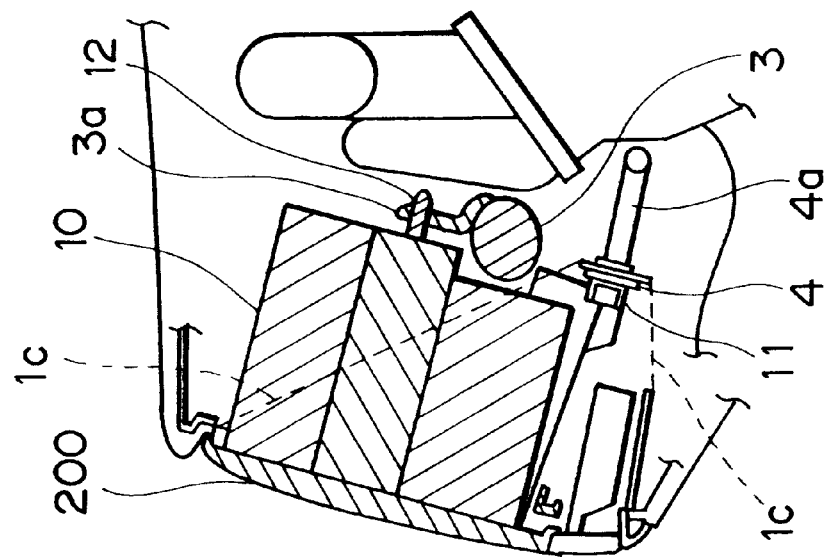
FIG. 64A
FIG. 64B

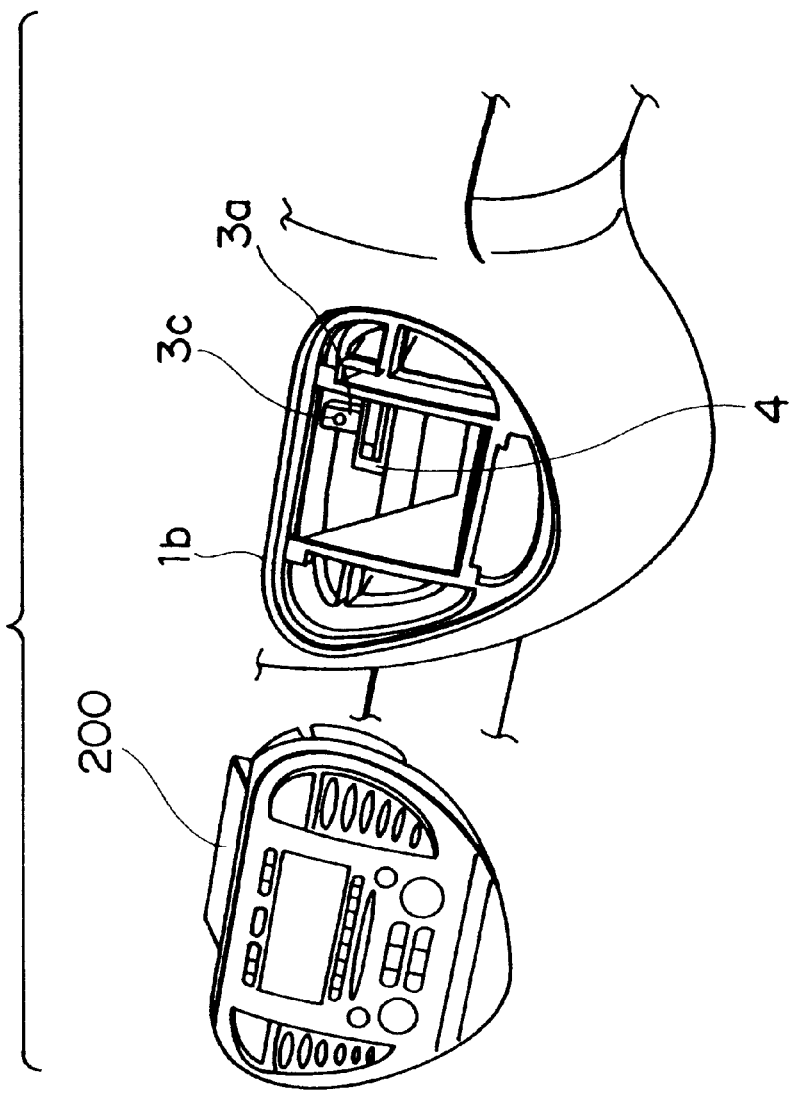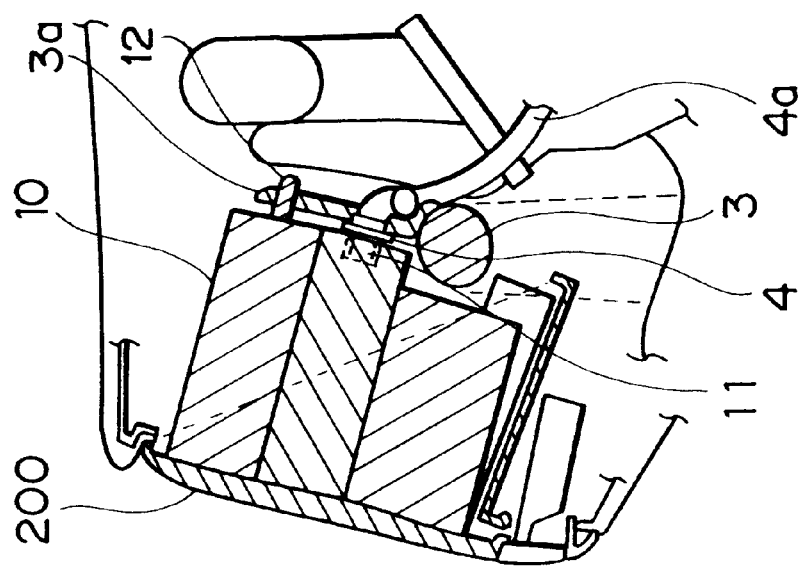

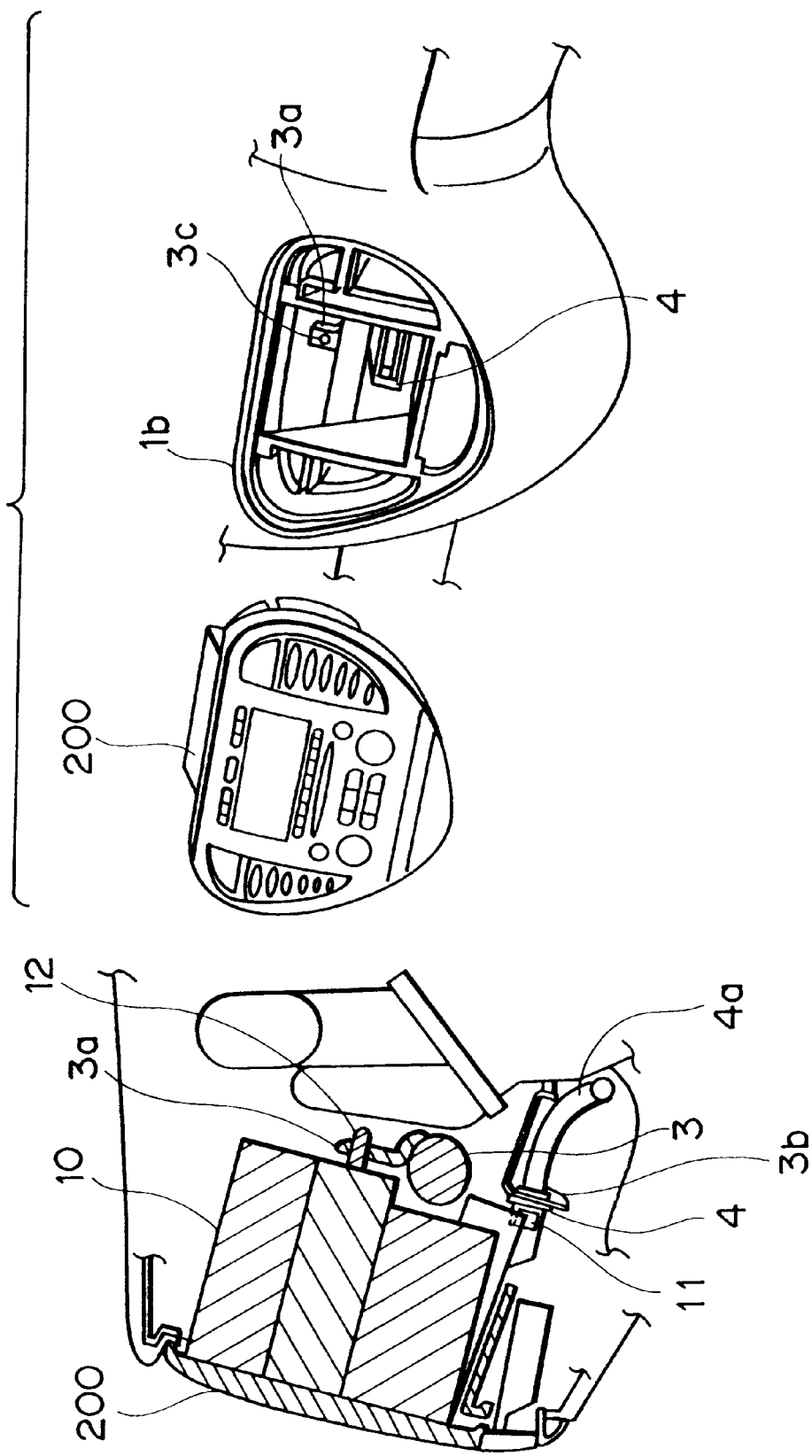

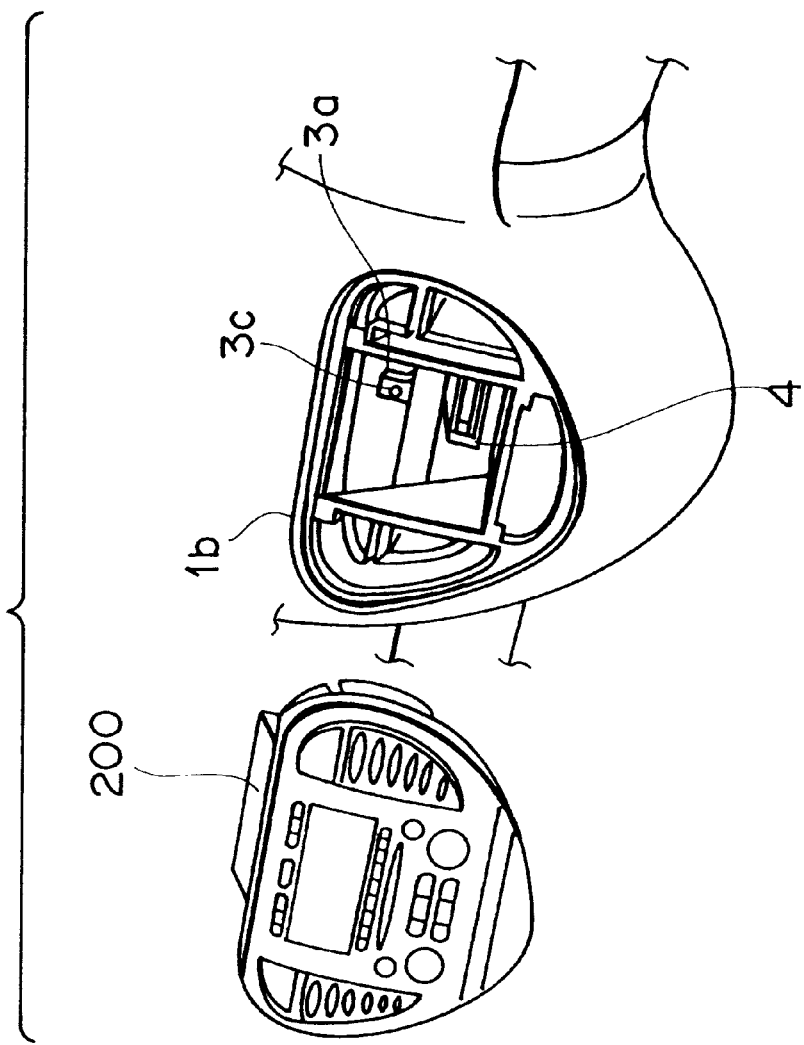
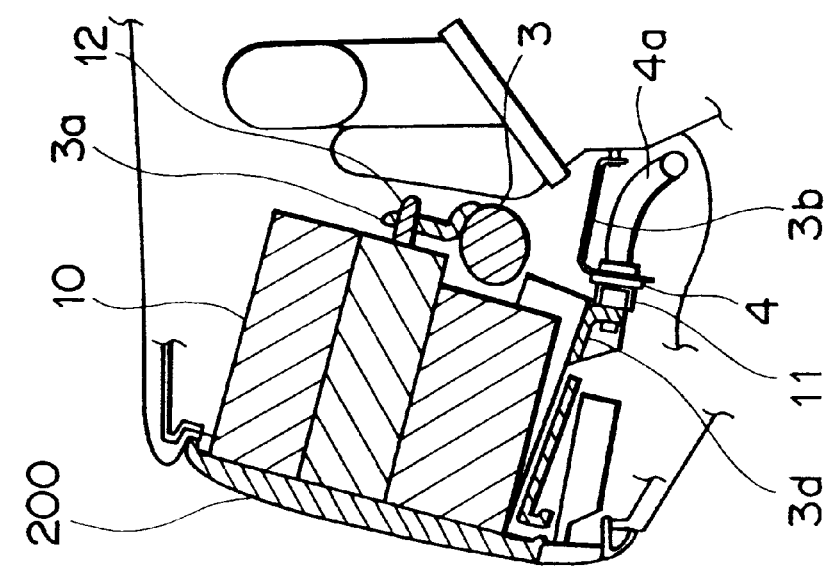
FIG. 67A
FIG. 67B

FIG.78

| bit NO | SW SIGNAL TRANSFER CONTENTS | |
|---|---|---|
| 1 | CM7 | COMMAND |
| 2 | CM6 | |
| 3 | CM5 | |
| 4 | CM4 | |
| 5 | CM3 | |
| 6 | CM2 | |
| 7 | CM1 | |
| 8 | CM0 | |
| 9 | AUTO | SW CONTENTS |
| 10 | OFF | |
| 11 | NOT USED | |
| 12 | REC/FRE | |
| 13 | DEF | |
| 14 | MODE | |
| 15 | A/C | |
| 16 | FAN | |
| 17 | NOT USED | |
| 18 | UP | |
| 19 | DOWN | |
| 20 | NOT USED | |
| 21 | P3 | PARITY |
| 22 | P2 | |
| 23 | P1 | |
| 24 | P0 | |

FIG.79A

| bitNO | DISPLAY SIGNAL TRANSFER CONTENTS | |
|---|---|---|
| 1 | CM7 | COMMAND |
| 2 | CM6 | |
| 3 | CM5 | |
| 4 | CM4 | |
| 5 | CM3 | |
| 6 | CM2 | |
| 7 | CM1 | |
| 8 | CM0 | |
| 9 | 1a | MODE |
| 10 | 1b | |
| 11 | 1c | |
| 12 | 1d | |
| 13 | A/C | COMPRESSOR |
| 14 | ECON | |
| 15 | ※1 | |
| 16 | 2a | FAN |
| 17 | 2b | |
| 18 | 2c | |
| 19 | 2d | |
| 20 | 2e | |
| 21 | 2f | |
| 22 | 2g | |
| 23 | 2h | |
| 24 | 2i | |
| 25 | 2j | |
| 26 | 2k | |
| 27 | 2l | |
| 28 | ※1 | |
| 29 | SET | TENP |
| 30 | ※1 | |
| 31 | ※1 | |
| 32 | ※1 | |
| 33 | ※1 | |

Columns 9–12 grouped as MODE; columns 13–15 as COMPRESSOR; columns 16–28 as FAN; columns 29–33 as TENP. All of MODE, COMPRESSOR, FAN, TENP grouped under DISPLAY CONTENTS.

※1: NOT USED:1
0 WHEN ALL ON STATE

FIG.79B

| bitNO | DISPLAY SIGNAL TRANSFER CONTENTS | | |
|---|---|---|---|
| 34 | 4a | | DISPLAY CONTENTS |
| 35 | 4b | | |
| 36 | 4c | | |
| 37 | 4d | TEN LEVEL | |
| 38 | 4e | | |
| 39 | 4f | | |
| 40 | 4g | | |
| 41 | 5a | | |
| 42 | 5b | | |
| 43 | 5c | | |
| 44 | 5d | UNIT LEVEL | |
| 45 | 5e | | |
| 46 | 5f | | |
| 47 | 5g | | |
| 48 | A DECIMAL POINT | | |
| 49 | 6a | | |
| 50 | 6b | | |
| 51 | 6c | | |
| 52 | 6d | TENTH | |
| 53 | 6e | | |
| 54 | 6f | | |
| 55 | 6g | | |
| 56 | FULL AUTO | STATUS INDICATOR | |
| 57 | PARTIAL AUTO | | |
| 58 | DEF | | |
| 59 | FRE | | |
| 60 | REC | | |
| 61 ≀ 66 | ※1 | | |
| 67 | P5 | PARITY | |
| 68 | P4 | | |
| 69 | P3 | | |
| 70 | P2 | | |
| 71 | P1 | | |
| 72 | P0 | | |

FIG.80

| COMMAND CONTENTS | CM7 | CM6 | CM5 | CM4 | CM3 | CM2 | CM1 | CM0 |
|---|---|---|---|---|---|---|---|---|
| DISPLAY SIGNAL TRANSFER | 1 | 1 | 1 | 1 | 1 | 1 | 1 | 1 |
| SW SIGNAL TRANSFER | 1 | 1 | 1 | 1 | 1 | 1 | 1 | 0 |
| FAILURE DIAGNOSIS SIGNAL TRANSFER | 0 | 1 | 1 | 1 | 1 | 1 | 1 | 1 |

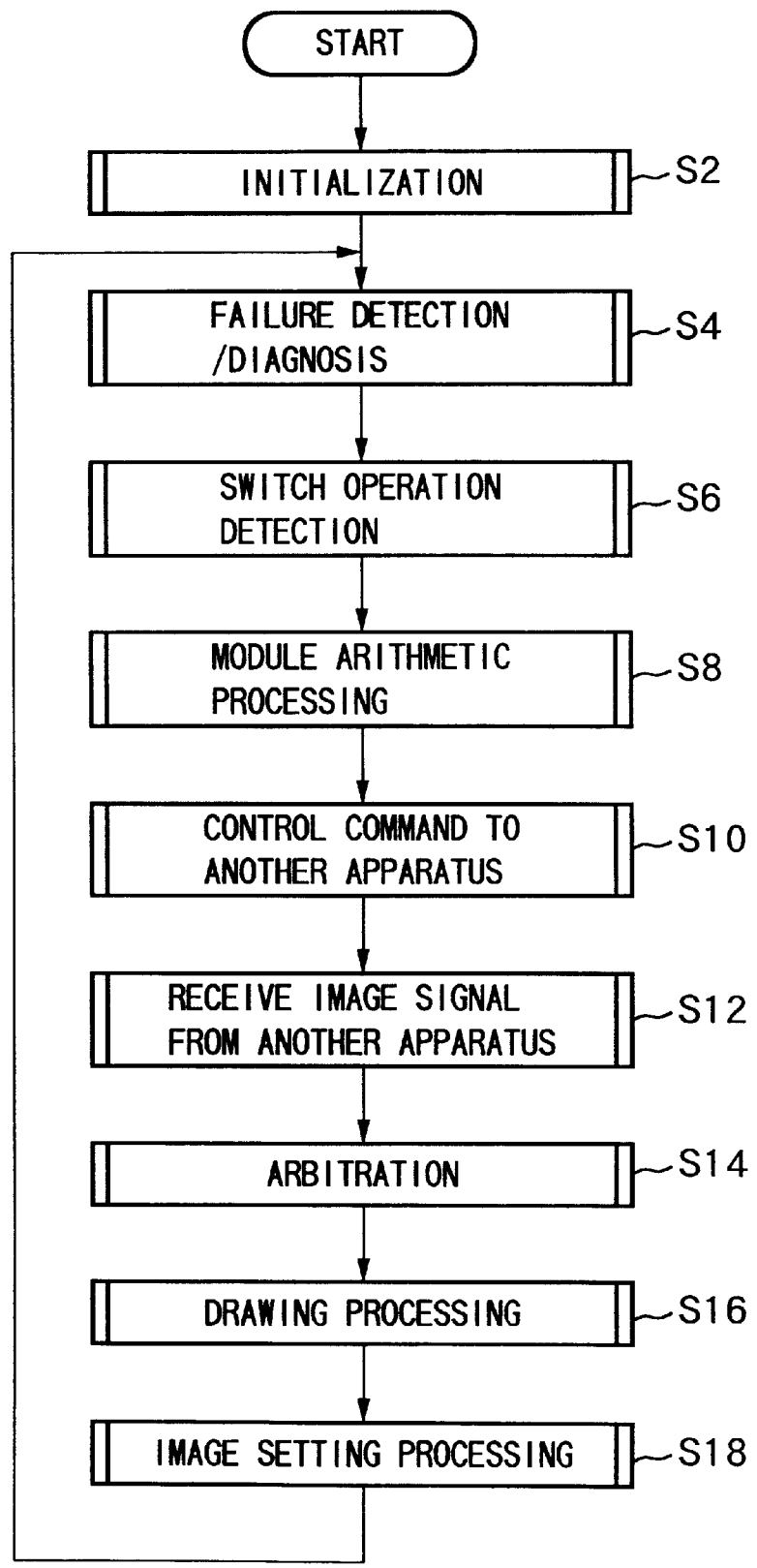

FIG.82

| FLAG | MEANING | SET CONDITION | RESET CONDITION |
|---|---|---|---|
| F7 | SERIOUS FAILURE | UPON OCCURRENCE OF SERIOUS FAILURE | UPON RECOVERY FROM FAILURE |
| F6 | MIDDLE-LEVEL FAILURE | UPON OCCURRENCE OF MIDDLE-LEVEL FAILURE | UPON RECOVERY FROM FAILURE |
| F5 | LIGHT-LEVEL FAILURE | UPON OCCURRENCE OF LIGHT-LEVEL FAILURE | UPON RECOVERY FROM FAILURE |
| F4 | INITIAL SCREEN | UPON INITIAL POWER ON | UPON DETECTION OF ANOTHER EVENT |
| F3 | SWITCH OPERATION | UPON SWITCH OPERATION | WHEN SWITCH OPERATION HAS NOT BEEN MADE FOR PREDETERMINED TIME |
| F2 | ANOTHER APPARATUS CONTROL | UPON UPDATING ANOTHER APPARATUS CONTROL INFORMATION | UPON COMPLETION OF SCREEN ARBITRATION |
| F1 | CENTER MODULE CONTROL | UPON UPDATING CENTER MODULE CONTROL INFORMATION | UPON COMPLETION OF SCREEN ARBITRATION |
| F0 | SPARE FOR SYSTEM | | |

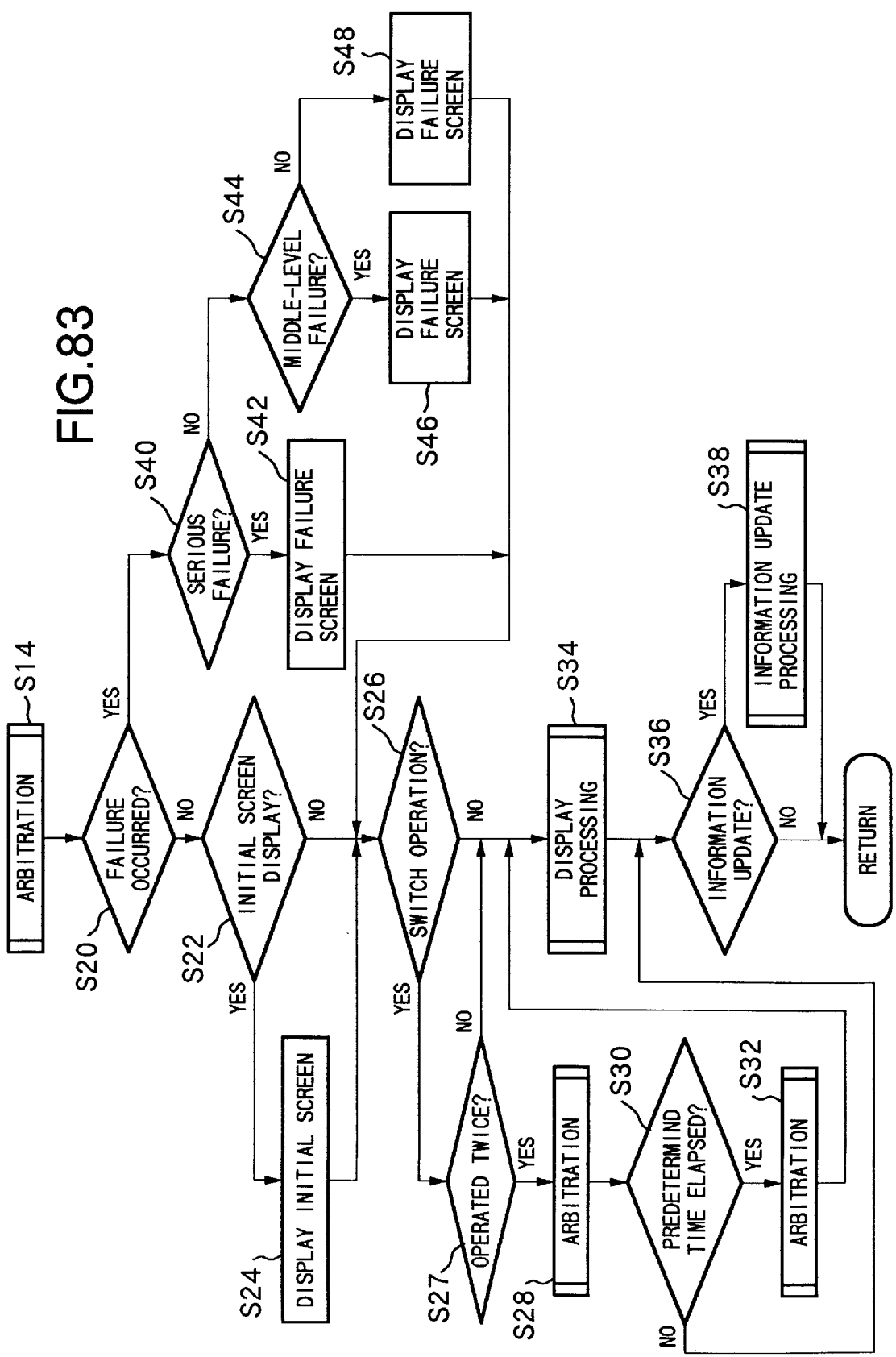

FIG.84

| SCREEN DISPLAY EVENT | DISPLAY PATTERN | DISPLAY AREA |
|---|---|---|
| FAILURE (SERIOUS) | P7※ | L |
| FAILURE (MIDDLE) | P8※ | M |
| FAILURE (LIGHT) | P2, P3 | D |

※REDUCED-SCALE DISPLAY ON DISPLAY AREA D ONLY WHEN USER RECOGNIZES FAILURE (PRESSES "OK" SWITCH)

FIG.85

| SCREEN DISPLAY EVENT | DISPLAY PATTERN | DISPLAY AREA |
|---|---|---|
| INITIAL SCREEN | P6 | K |

FIG.86

| ITEM OPERATION / SCREEN | ICC | PAS | AIR CONDITIONER | NAVIGATION | AUDIO | DIS | TELEPHONE |
|---|---|---|---|---|---|---|---|
| P1 | P5→P1 | ↓ | ↓ | P4 | P5→P1 | ↓ | P4 |
| P3 | P5→P3 | ↓ | ↓ | P4 | P5→P3 | ↓ | P4 |

※DISPLAY ITEM OF INTEREST IN ENLARGED SCALE FOR PREDETERMINED TIME WHEN ITEM (SYSTEM) IS OPERATED
※RESUME SCREEN DIVISION STATE BEFORE OPERATION AFTER ELAPSE OF PREDETERMINED TIME

FIG.87

| SCREEN \ ITEM OPERATION | ICC | PAS | AIR CONDITIONER | NAVIGATION | AUDIO | DIS | TELEPHONE |
|---|---|---|---|---|---|---|---|
| P1 | P1※1 P3※2 | P1※1 P3※2 | P1※1 P3※2 | P4 | P1※1 P3※2 | DISPLAY P3 ON AREA D | P4 |
| P3 | P3※1 | P3※1 | P3※1 | P4 | P3※1 | P3※1 | P4 |
| P4 | P1※2 P4※1 | P1※2 | P1※2 P4※1 | P4 | P1※2 P4※1 | P1※2 P4※1 | P4 |
| P6 | P1※2 | P1※2 | P1※2 | P4 | P1※2 | P1※2 | P4 |

※1: TURN OFF ITEM (SYSTEM) WITH LOWER PRIORITY LEVEL
(DELETE LOWER-ORDER ITEM WHILE NUMBER OF DISPLAY ITEMS
REMAINS THE SAME), AND DISPLAY ICC OR PAS

※2: SORT AND DISPLAY ALL ITEMS

※: DISPLAY ITEM IN OPERATION ON DISPLAY AREA E

FIG.88

| SERIOUS FAILURE | MIDDLE-LEVEL FAILURE | LIGHT-LEVEL FAILURE |
|---|---|---|
| •BRAKE FAILURE<br>•FAILURE THAT MAY INTERFERE WITH TRAVELING | •TIRE PNEUMATIC PRESSURE DROP<br>•DECREASE IN REMAINING FUEL AMOUNT<br>•ICC FAILURE<br>•AIRBAG FAILURE<br>•VOLTAGE ABNORMALITY | •SHORTAGE OF WASHER DETERGENT<br>•OPERATION ERROR OF COMPOUND EQUIPMENT |

FIG.91

| SCREEN DISPLAY EVENT | DISPLAY PATTERN | DISPLAY AREA |
|---|---|---|
| INITIAL SCREEN | P4 | I |

FIG.92

| | | NUMBER OF ITEMS TO BE DISPLAYED | | | | |
|---|---|---|---|---|---|---|
| | | 2 | 3 | 4 | 5 | MORE THAN 6 ITEM |
| MAXIMUM NUMBER OF DISPLAYABLE ITEMS | 3 | P6 | P4 | P4 | P4 | P4 |
| | 4 | P6 | P4 | P1 | P1 | P1 |
| | 5 | P6 | P4 | P1 | P3 | P4 |

FIG.93A

| PRIORITY OF ITEM | 1 | FAILURE |
| --- | --- | --- |
| | 2 | ICC |
| | 3 | PAS |
| | 4 | AIR-CONDITIONER APPARATUS |
| | 5 | NAVIGATION APPARATUS |
| | 6 | AUDIO APPARATUS |
| | 7 | DIS APPARATUS |
| | 8 | TELEPHONE |

FIG.93B

| | | DISPLAY PATTERN | | | |
| --- | --- | --- | --- | --- | --- |
| | | P6 | P4 | P1 | P3 |
| PRIORITY ORDER | 1 | K | I | H | B |
| | 2 | | | A | A |
| | 3 | | | | D |

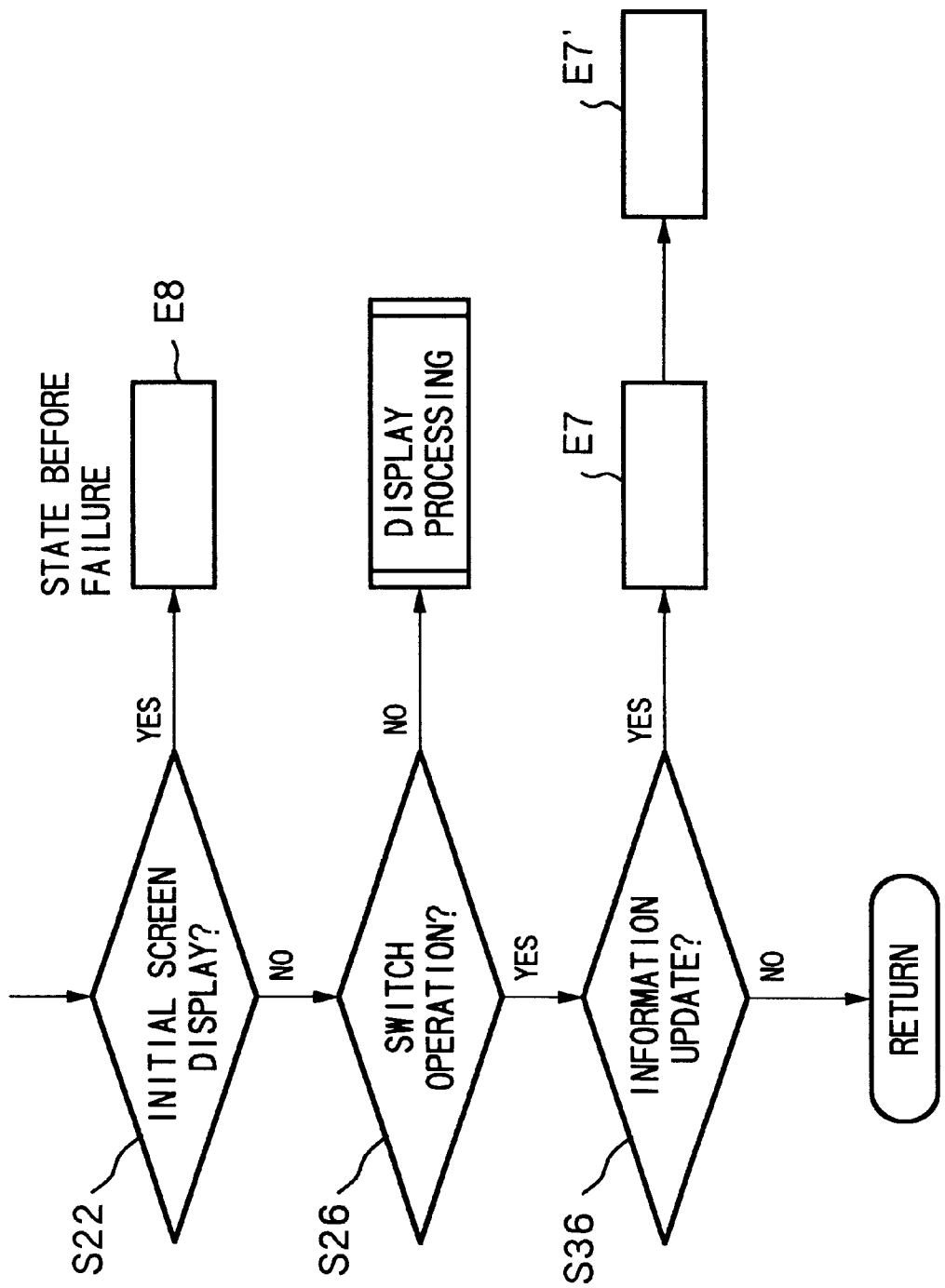

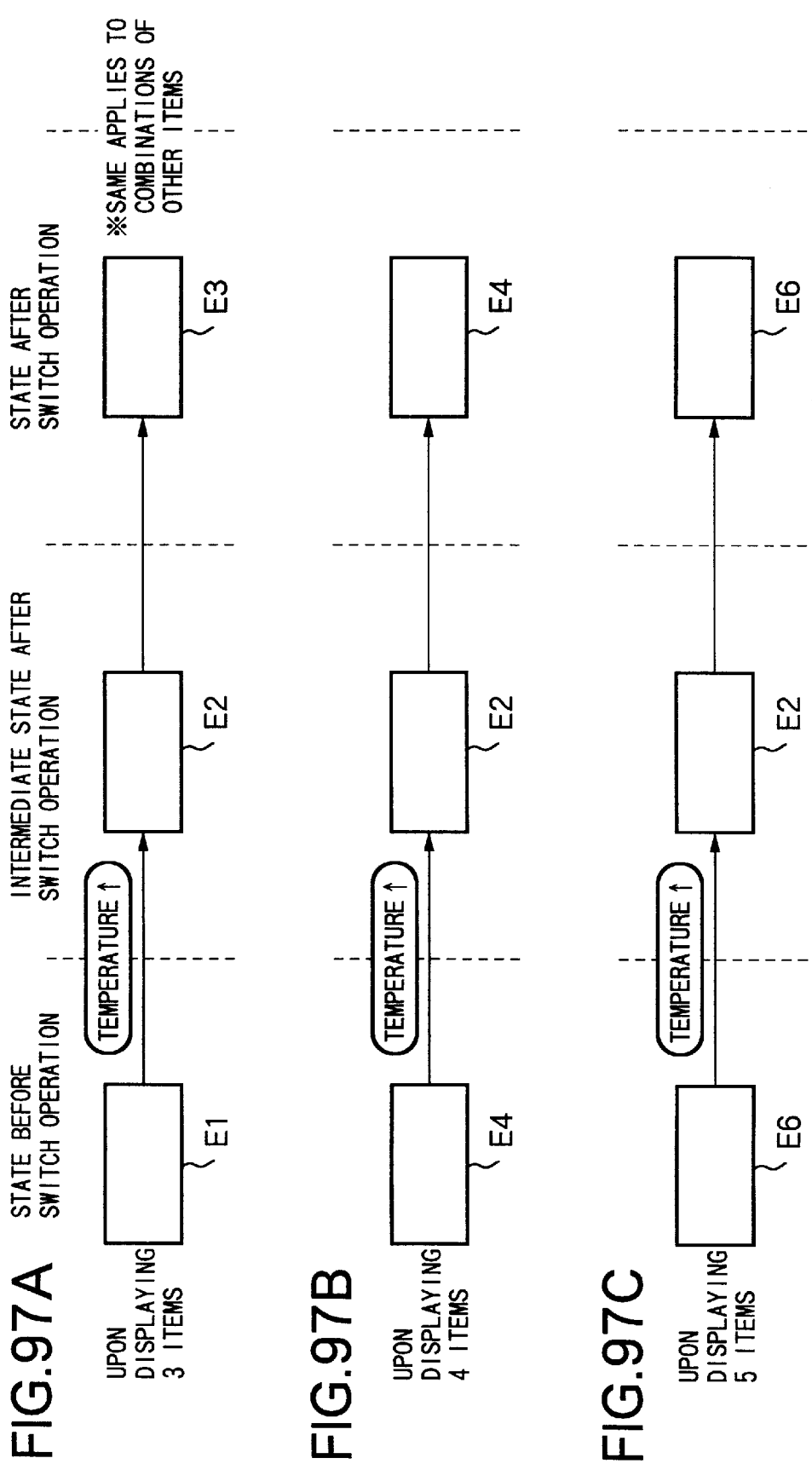

FIG.100

| | | POWER ON/OFF | CONTROL SELECTION SW |
|---|---|---|---|
| AUDIO | CD | ② | ② |
| | CASSETTE | | |
| | RADIO | | |
| | | | |
| AIR CONDITIONER | AUTO / FAN | ② | ① |
| | AUTO / TEMPERATURE | | ② |
| | AUTO / DUCT | | ① |
| | MANUAL / FAN | | ② |
| | MANUAL / TEMPERATURE | | ② |
| | MANUAL / DUCT | | ② |
| DIS | | ② | ① |

① DISPLAY ACCORDING TO DISPLAY SIGNAL
② DISPLAY SIMULTANEOUSLY

ELECTRONIC EQUIPMENT APPARATUS AND ELECTRONIC EQUIPMENT ASSEMBLY

BACKGROUND OF THE INVENTION

1. Field of the Invention

The present invention relates to an electronic equipment apparatus and electronic equipment assembly and, more particularly, to an electronic equipment and electronic equipment assembly, which are connected to a plurality of electrical car accessories (vehicle electric devices) such as a car navigation apparatus, car audio system, and the like via connectors, and can concentratively operate and control these vehicle electric devices 2. Description of Related Art In a vehicle, especially, an automobile, the number (variety) of electric device units (also called information processing units or space-occupying units) which operate in accordance with passenger's operations is growing, and such electric device units are concentratively arranged in the middle of an instrumental panel between the driver seat and front passenger seat. More specifically, an air-conditioner control unit and audio control unit are disposed in this portion, and a console including switches and the like operated by a passenger, and a display unit such as a display for displaying the operation states of the units are mounted on its front surface, i.e., the surface facing the passenger room. Recently, the variety of audio units has increased, and the number of audio units including an AM/FM radio receiver, cassette deck, CD player, MD player, equalizer, and the like alone is considerable. In addition to these units, a navigation unit is also popularly mounted, and a display for displaying the map for navigation is required.

Conventionally, electric device units having different functions (contents of information processing) are independent of each other, and have consoles operated by the passenger and display units for the passenger on their front surfaces, i.e., the surfaces facing the passenger room in units of independent units. In order to concentrate or commonly use the display units and a large number of consoles as much as possible, a plurality of electric device units having different functions are sometimes combined into a single unit.

Japanese Patent Laid-Open No. 61-244636 proposed a frame that combines a plurality of independent electric device units having different functions into one set. More specifically, this reference proposed a frame which comprises a chassis portion for coupling a plurality of vertically stacked electric device units into a single set, and a front surface panel portion that forms a wall surface facing the passenger room. However, the individual electric device units independently have display units and consoles, and the front surface panel portion is formed with only openings that allow observation of these display units from the passenger room, and openings that allow operation of the consoles from the passenger room. That is, the frame merely serves as a fastening component for combining a plurality of independent electric device units into one set.

As described above, when many electric device units are concentrated on a narrow portion, the layout of the display units and many consoles is considerably limited, and it is not preferable in terms of operability and visibility. As the number of units becomes larger, the operability and visibility for some units worsen.

As a method of improving operability and visibility, as described above, different functions are combined to build a single unit. However, in this case, since the number and variety of units to be mounted and (the number and variety of functions) vary depending on grades even in an identical model of vehicle, a considerable number of combinations exist for the number and variety of units to be mounted. For this reason, when sets of units are prepared in correspondence with these many combinations, the number (variety) of sets becomes considerable. This fact limits formation of such sets, and the number of sets manufactured per kind becomes small, resulting in high cost.

Especially, in recent vehicles, a console for an air conditioner is arranged in the middle portion of an instrumental panel in the widthwise direction of the vehicle in advance from the vehicle design process, and a 2-DIN opening is formed in a portion except for the console for the air conditioner. Units of the audio system, navigation apparatus, and the like must be arranged within this 2-DIN space, thus tremendously limiting the layout of the consoles and display units of the electric device units.

In commercially available electric device components for a vehicle, consoles including operation switches and the like are prepared in units of units, and the passenger arbitrarily operates these consoles of the electric device components.

Japanese Patent Laid-Open No. 6-107082 discloses a method in which a wiring connector that secures connection of a car radio unit is attached to a vehicle-side bracket, a radio-side connector is provided to the rear portion of the car radio unit, and the wiring connector and radio-side connector are coupled to each other upon attachment of the car radio unit, so as to simultaneously attain attachment and wiring of an audio equipment.

However, in the above prior art, since the consoles of the vehicle electric device components are arranged in units of electric device units, the automobile manufacturers, dealers, and the like must have a large stock of vehicle electric device components so as to change grade in correspondence with the types of vehicle. When the user wants to grade up electric device components, the user must exchange them in units of components, resulting in troublesome attachment and large cost for the user.

The user must operate each of the vehicle electric device components, and must confirm each of the display units of the vehicle electric device components in correspondence with switch operations.

The vehicle electric device components must display on the corresponding display units, and a display corresponding to switch operation must be confirmed on the corresponding one of the display units of the vehicle electric device components.

Also, the wire harness that connects the vehicle-side connector and electric device components is complicated. When the user wants to grade up electric device components, the user must exchange and connect them in units of components using the vehicle-side connector, resulting in complicated attachment in later processes.

SUMMARY OF THE INVENTION

The present invention has been made in consideration of the above situation, and has as its first object to provide an electronic equipment apparatus and electronic equipment assembly with high operability and visibility.

It is the second object of the present invention to provide an electronic equipment apparatus and electronic equipment assembly which can also improve the aesthetic aspect or appearance of the wall surface in the passenger room.

It is the third object of the present invention to provide an electronic equipment apparatus and electronic equipment assembly, which can easily obtain a combination of a plurality of electric device units having different functions especially in terms of cost.

It is the fourth object of the present invention to provide an electronic equipment apparatus, which can reduce the manufacturing cost and allows easy assembly by using common vehicle electric device components among all the types of vehicle and arranging a control apparatus that can concentratively control them.

It is the fifth object of the present invention to provide an electronic equipment apparatus, which can broaden the range of choice by the user and allows the user to consider the appearance of the passenger room upon choosing a control apparatus by preparing control apparatuses having different functions and designs in correspondence with the types of vehicle.

It is the sixth object of the present invention to provide an electronic equipment apparatus which can appropriately execute display control for the passenger in correspondence with the traveling state and the like of a vehicle.

It is the seventh object of the present invention to provide an electronic equipment apparatus which can appropriately make a display required for the user in accordance with the failure level, priority order, and the like upon receiving a plurality of image signals from another compound equipment by switch operation even when a common display is used.

It is the eighth object of the present invention to provide an electronic equipment apparatus which can improve the assembly performance and operability of electric device components by integrating connections between a plurality of electric device components and vehicle-side connectors.

It is the ninth object of the present invention to provide an electronic equipment apparatus which can reduce the arithmetic operation loads on other electric device components by systematically managing data input/output to/from electric device components.

In order to solve the above-mentioned problems and to achieve the above objects, an electronic equipment apparatus according to the present invention comprises the following arrangement. That is, An electronic equipment apparatus comprising: a plurality of information processing units which execute different information processing calculations; a plurality of cases which store each of said information processing units; a panel body which is formed independently of said information processing units, and has an output portion for a passenger and an input portion operated by the passenger; and a controller which is adapted to, when said information processing units and said panel body are connected to each other, control to operate said information processing units in accordance with a passenger's operation for said input portion, and to output a processing state of each of said information processing units to said output portion, wherein said panel body constitutes a portion of a wall surface in a passenger room, and covers entire surfaces of the cases of said information processing units which face to the passenger room so that said information processing units cannot be visually observed from the passenger room.

Also, an electronic equipment assembly according to the present invention comprises the following arrangement. That is, An electronic equipment assembly comprising: a plurality of control units which have different functions, and cannot be directly operated by a passenger; a plurality of cases which store each of said information processing units; and a panel body which is formed independently of said control units, and has, on a surface thereof, an output portion for displaying operation states of at least some of said control units, and an operation input portion that allows the passenger to operate said control units, wherein said panel body and said control units are detachably coupled to each other and are electrically connected to each other to be able to exchange an electrical signal therebetween, while said control units are arranged on a back surface side of said panel body.

Furthermore, an electronic equipment assembly according to the present invention comprises the following arrangement. That is, An electronic equipment apparatus comprising: a plurality of electric device units; a plurality of cases which store each of said electric device units; first control means, arranged in each of said electric device units, for controlling operation of the electric device unit; operation means having a console and display for said electric device units; and second control means, arranged in said operation means, for distributing and outputting operation signals from said console to said first control means of the corresponding electric device units, wherein said electric device units include at least a car navigation system, and said first control means of said car navigation system directly controls said display of said operation means without mediating said second control means.

Moreover, an electronic equipment apparatus according to the present invention comprises the following arrangement. That is, An electronic equipment apparatus comprising: a plurality of electric device units; first control means, arranged in each of said electric device units, for controlling operation of the electric device unit; operation means having a console and display for said electric device units; and second control means, arranged in said operation means, for outputting operation signals from said console to said first control means and controlling said display on the basis of display control signals output from said first control means, wherein said second control means distributes and outputs the operation signals to said first control means of the corresponding electric device units, and controls said display on the basis of display control signals corresponding to the operation signals output to said first control means.

In addition, an electronic equipment apparatus according to the present invention comprises the following arrangement. That is, An electronic equipment apparatus comprising: a plurality of electric device units; a plurality of cases which store each of said electric device units; first control means, arranged in each of said electric device units, for controlling operation of the electric device unit; display means having a display; and second control means for controlling said display on the basis of a display control signal output from each first control means, wherein when said second control means receives display control signals from a plurality of first control means, said second control means selects some of the display control signals on the basis of a predetermined condition, and controls said display on the basis of the selected display control signals.

Lastly, an electronic equipment apparatus according to the present invention comprises the following arrangement. That is, An electronic equipment apparatus comprising: a plurality of electric device units; a plurality of cases which store each of said electric device units; a unit-side coupling portion for outputting information of said plurality of electric device units together; and a vehicle-body-side coupling portion which is coupled to said unit-side coupling portion, and inputs/outputs information associated with said electric device units.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is an overall block diagram showing an example of connections among a panel body, units, and the like;

FIG. 62A is a sectional view showing the first attachment structure of a center module and compound equipment;

FIG. 62B is a perspective view showing the first attachment structure of a center module and compound equipment;

FIG. 64A is a sectional view showing the third attachment structure of a center module and compound equipment;

FIG. 64B is a perspective view showing the third attachment structure of a center module and compound equipment;

FIG. 65A is a sectional view showing the fourth attachment structure of a center module and compound equipment;

FIG. 65B is a perspective view showing the fourth attachment structure of a center module and compound equipment;

FIG. 66A is a sectional view showing the fifth attachment structure of a center module and compound equipment;

FIG. 66B is a perspective view showing the fifth attachment structure of a center module and compound equipment;

FIG. 67A is a sectional view showing the sixth attachment structure of a center module and compound equipment;

FIG. 67B is a perspective view showing the sixth attachment structure of a center module and compound equipment;

FIG. 78 is a table showing switch signal transfer data transferred from the center module to an air-conditioner apparatus;

FIG. 79A is a table showing display signal transfer data transferred from the air-conditioner apparatus to the center module;

FIG. 79B is a table showing display signal transfer data transferred from the air-conditioner apparatus to the center module;

FIG. 80 is a table showing data for designating the transfer contents in a command field;

FIG. 81 is a flow chart showing the main control operation of the center module;

FIG. 82 is a table showing the meanings of flags set in the center module;

FIG. 83 is a flow chart showing arbitration of the center module;

FIG. 84 is a table showing the display pattern on a display upon failure;

FIG. 85 is a table showing the display pattern on a display in an initial state;

FIG. 86 is a table showing the switching sequence of the display screen upon switch operations;

FIG. 87 is a table showing the switching sequence of the display screen upon adding display items by switch operations;

FIG. 88 is a table showing failure ranks;

FIG. 91 is a table showing the display pattern upon operation of an FM multiplex switch;

FIG. 92 is a table showing the display pattern determined based on a predetermined number of maximum displayable items and the number of items to be displayed;

FIG. 93A is a table showing the priority order of display items;

FIG. 93B is a table showing the display pattern according to the priority order;

FIG. 96 is a chart showing an example of the screen displays in the arbitration shown in FIG. 83;

FIGS. 97A to 97C are charts showing examples of the screen displays in the arbitration shown in FIG. 83;

FIG. 100 is a table showing operations corresponding to other signal input/output modes of the center module and compound equipment.

DETAILED DESCRIPTION OF THE PREFERRED EMBODIMENTS

The preferred embodiments of the present invention will be described in detail hereinafter with reference to the accompanying drawings.

Note that an electronic equipment apparatus of this embodiment is connected to a navigation apparatus, audio equipment, and the like, and constitutes a compound body of electronic devices so as to be able to control these apparatuses via a display and control panel. Hence, in the following description, the electronic equipment apparatus will be referred to as a panel body or center module.

The center module is connected to vehicle electric device components such as an audio apparatus, navigation apparatus, and the like in place of their normal operation switches, and the like, and can concentratively control these components.

With this arrangement, vehicle electric device components which are conventionally individually attached can be integrally arranged, and center modules having different designs and functions are prepared in correspondence with the types of vehicles, thus broadening the range of choice by the user and allowing the user to consider the appearance of the passenger room upon choosing the center module.

Figure 1:
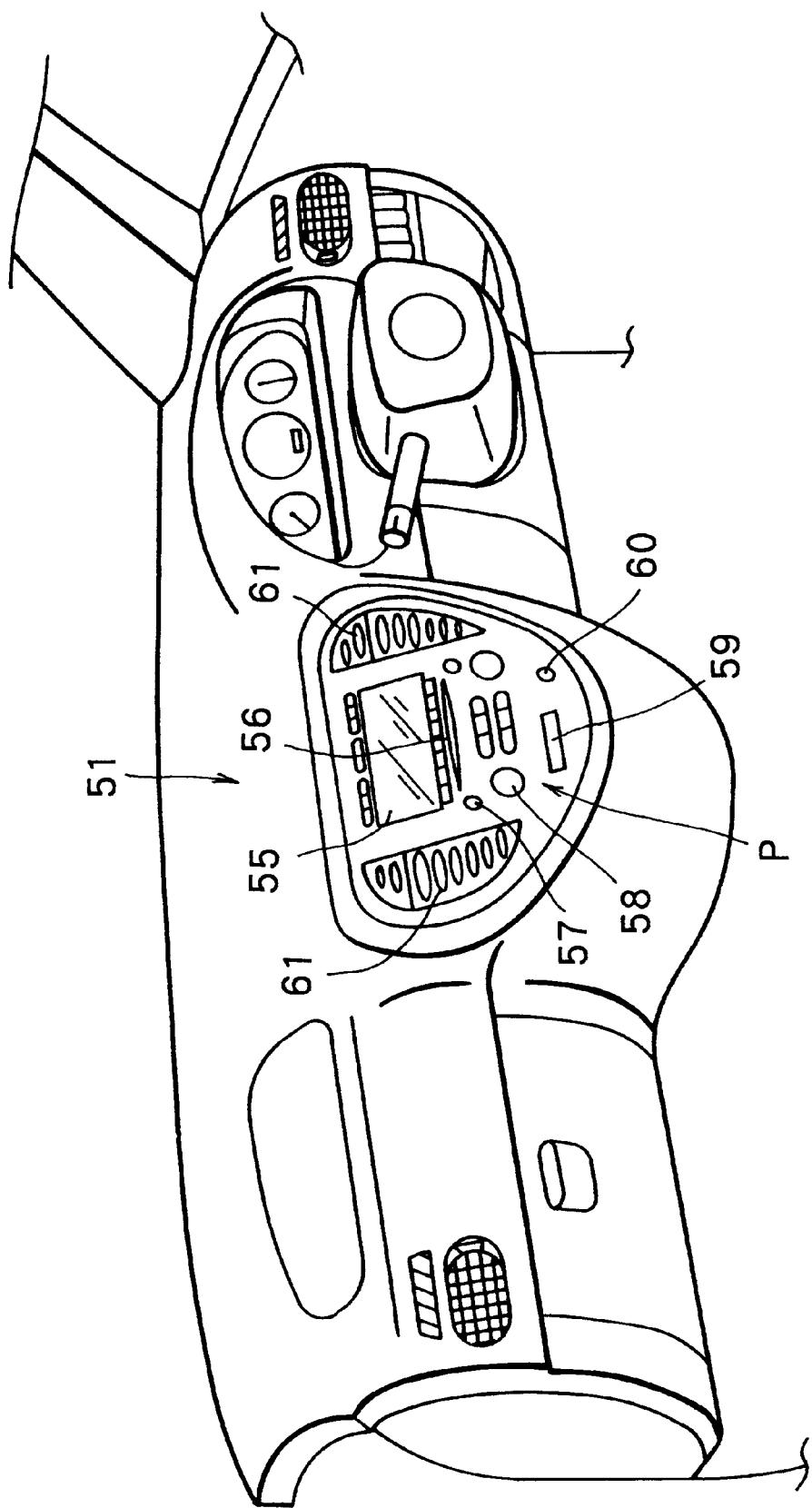
FIG. 1 is a perspective view showing an example in which an embodiment of the present invention is applied to an instrumental panel portion.
Figure 2:
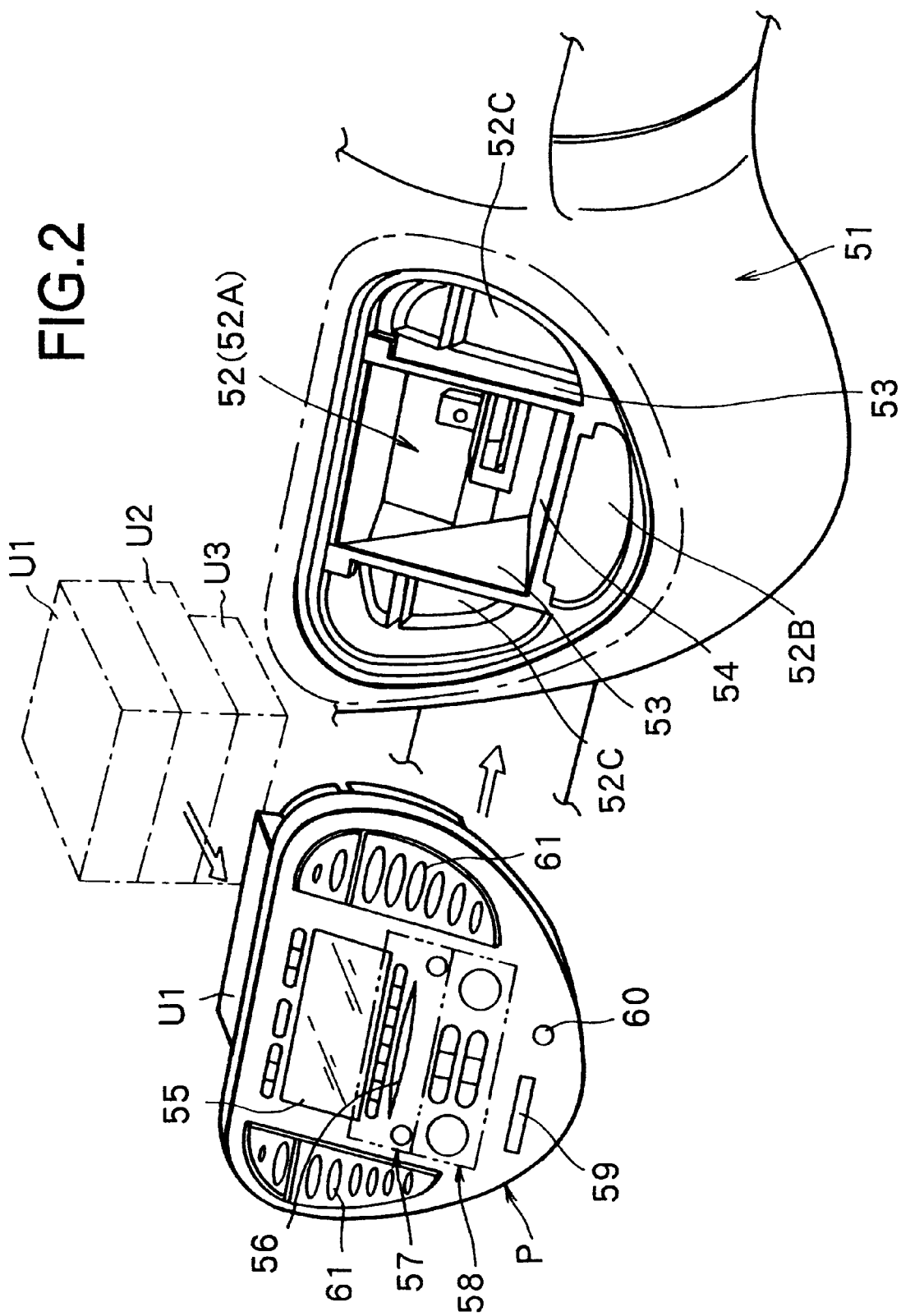
FIG. 2 is an exploded perspective view showing principal part of FIG. 1.

[Description of FIGS. 1 and 2]

The outline of the overall embodiments of the present invention will be explained below with reference to FIGS. 1 and 2. In FIGS. 1 and 2, reference numeral 51 denotes an instrumental panel (dashboard) serving as a panel member which defines the wall surface in the passenger room. The instrumental panel 51 has an opening portion 52 formed at nearly the middle portion in the widthwise direction of the vehicle. The opening portion 52 is larger than a 2-DIN size in both the vertical and horizontal directions. Such opening portion 52 is covered by a panel body P to be concealed from the passenger room. The panel body P essentially constitutes a portion of the instrumental panel 51.

Three electric device units (corresponding to information processing units and space-occupying units) U1, U2, and U3 are arranged on the rear surface side of the panel body P, i.e., on the side opposite to the passenger room, so as to be located within the opening portion 52, i.e., the instrumental panel 51. The panel body P and the units U1, U2, and U3 are coupled to and integrated with each other, and are electrically connected to each other to attain signal communications. Note that the unit U1 is an AM/FM radio unit, the unit U2 is a CD player unit, and the unit U3 is an air-conditioner (manual air-conditioner) unit. Each of the units U1 to U3 has a size substantially equal to or smaller than a 1-DIN size, and is formed into a vertically low-profile box shape.

The units U1 to U3 have neither consoles (input units) operated by the passenger nor display units (output units) for displaying the operation states and the like (the same applies to other electric device units to be described later), and the display unit and console for these units U1 to U3 are arranged on the panel body P. That is, the panel body P has a display 55 as a visual display unit comprising a liquid crystal display, an opening 56 which is formed below the display 55 and is used for loading/unloading a compact disk (CD) into/from the unit U1, an audio operation switch group 57 arranged around the opening 56, and an air-conditioning switch group 58 arranged below the opening 56 and switch group 57.

The display 55 is commonly used by the units U1 to U3. The switch group 57 is commonly used by the units U1 and U2. The switch group 58 is exclusively used by the unit U3. In this manner, the passenger operates the units U1 to U3 using the switch groups 57 and 58 as a console arranged on the panel body P, and the activation conditions of the units U1 to U3 corresponding to the operation conditions of the switch groups 57 and 58 are displayed on the display 55 as well as the operation states (operation selection states) of the switch groups 57 and 58. Note that the types of switches included in the switch groups 57 and 58 and the display contents on the display 55 are the same as those of a conventional CD player, AM/FM radio unit, and air conditioner.

The panel body P also has an ashtray 59 and cigarette lighter 60, which are juxtaposed in the widthwise direction of the vehicle below the air-conditioner switch group 58. Furthermore, air outlets 61 for the air conditioner are formed on the right and left end portions of the panel body P.

The opening portion 52 is divided into a total of four small opening portions 52A to 52D by a pair of right and left vertical partition walls 53, and a single, nearly horizontal partition wall 54. The largest small opening portion 52A stores the units U1 to U3. The small opening portion 52B formed underneath the small opening portion 52A stores the ashtray 59 and cigarette lighter 60. The small opening portions 52D and 52C formed on the right and left sides of the small opening portion 52A serve as paths for air-conditioning air adjusted by the air-conditioning air outlets 61 of the panel body P, and are connected to an air-conditioning air duct (not shown).

The panel body P and units U1 to U3 form an integrated assembly in advance before they are mounted on the vehicle, and the assembly is mounted on the vehicle near the opening portion 52 from the side of the units U1 to U3, so that the units U1 to U3 are stored in the small opening portion 52A. Upon completion of assembly, the panel body P essentially constitutes a portion of the instrumental panel 51. Note that the outer edge portion of the panel body P is substantially flush with the opening edge portion of the opening portion 52, i.e., the instrumental panel 51 upon completion of assembly to the instrumental panel 51.

Figure 3:
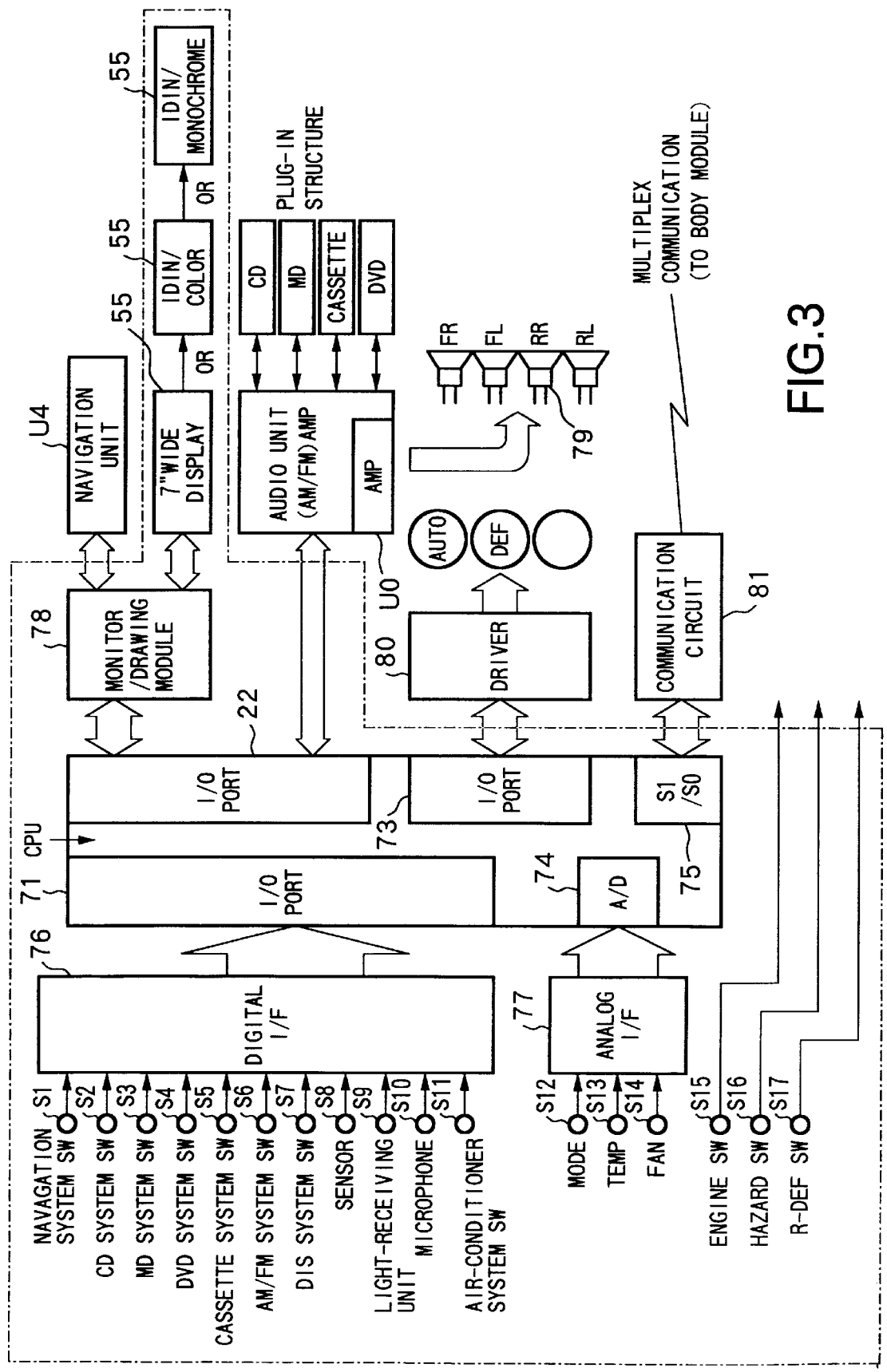

[Description of FIG. 3]

The relationship between the panel body P and units (U1 to U3) will be described in detail below with reference to FIG. 3. FIG. 3 shows all the functions that can be added to the panel body P for a high grade, and FIGS. 1 and 2 show only some of the functions shown in FIG. 3.

Under such condition, a portion bounded by the one-dashed chain line in FIG. 3 indicates the panel body P. The panel body P has a microcomputer, i.e., CPU, and a plurality of I/O ports 71 to 73, A/D port 74, and SI/SO port 75. The I/O port 71 is connected to various switches and the like S1 to S11 via a digital I/F 76. Note that each of the switches and the like S1 to S11 in FIG. 3 is represented by a single switch, but often comprises a plurality of switches and the like in practice.

Reference numeral S1 denotes a navigation switch; S2, a CD player switch; and S3, an MD (mini-disk) player switch. Reference numeral S4 denotes a DVD (digital video disk) switch; S5, a cassette deck switch; and S6, an AM/FM radio switch. Reference numeral S7 denotes a driver information system switch, which is used for requesting display of the current vehicle traveling state, road environment state, and the like, for example, the traffic information, current mileage, the current average vehicle velocity, and the like.

Reference numeral S8 denotes a sensor for detecting the environment in the passenger room, e.g., the temperature, noise level, and the like in the passenger room. Reference numeral S9 denotes a light-receiving unit as a receiver, which serves as an input unit of a radio signal (e.g., an infrared ray signal or the like) sent from a separate remote control switch. Reference numeral S10 denotes a microphone for detecting, e.g., the voice of a passenger in use of an automobile telephone, and inputting voice commands to the units. Reference numeral S11 denotes an air-conditioner switch.

The A/D port 74 receives the signals from switches and the like S12 to S14. Reference numeral S12 denotes an outlet mode selection switch of air-conditioning air. Reference numeral S13 denotes a temperature selection switch of air-conditioning air. Reference numeral S14 denotes an outlet amount selection switch of air-conditioning air.

The panel body P has a monitor/screen module 78 to which the display 55 as the display unit is connected. Note that the display 55 can use, e.g., a 7" display using a large-size liquid crystal display, as shown in FIGS. 1 and 2. In addition, a 1-DIN color display, monochrome display, or the like may be used.

The panel body P has switches and the like S15 to S17 associated with other electric device units in addition to those coupled to the panel body P. Reference numeral S15 denotes an engine switch which serves as a conventional ignition switch. Reference numeral S16 denotes a hazard switch. Reference numeral S17 denotes a defogger heater switch for a rear windshield glass.

As the units included in association with the panel body P, FIG. 3 illustrates a navigation unit U4 and audio unit U0. The audio unit U0 includes various kinds of audio units, e.g., an AM/FM radio receiver, cassette player, MD player, DVD player, and the like. The audio unit U0 is connected to loudspeakers 79.

A driver 80 and communication IC 81 are arranged outside the panel body P. The driver 80 is connected to devices such as a defroster and the like which require a large driving force (electric power). The communication IC 81 is connected to devices associated with the switches and display arranged on the panel body P via a multiplex communication cable.

Figure 4:
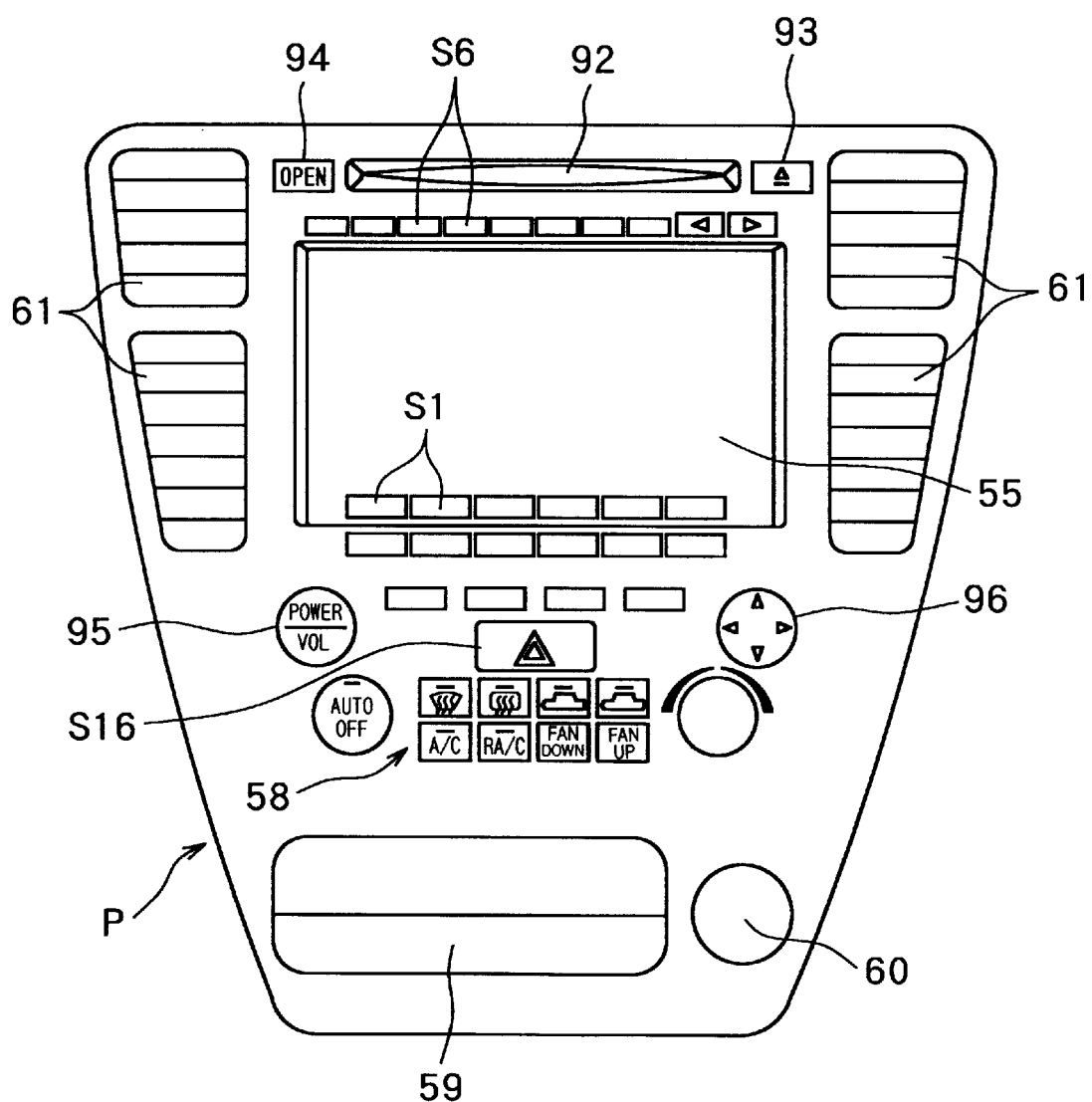
FIG. 4 is a front view showing the first embodiment of the panel body.
Figure 5:
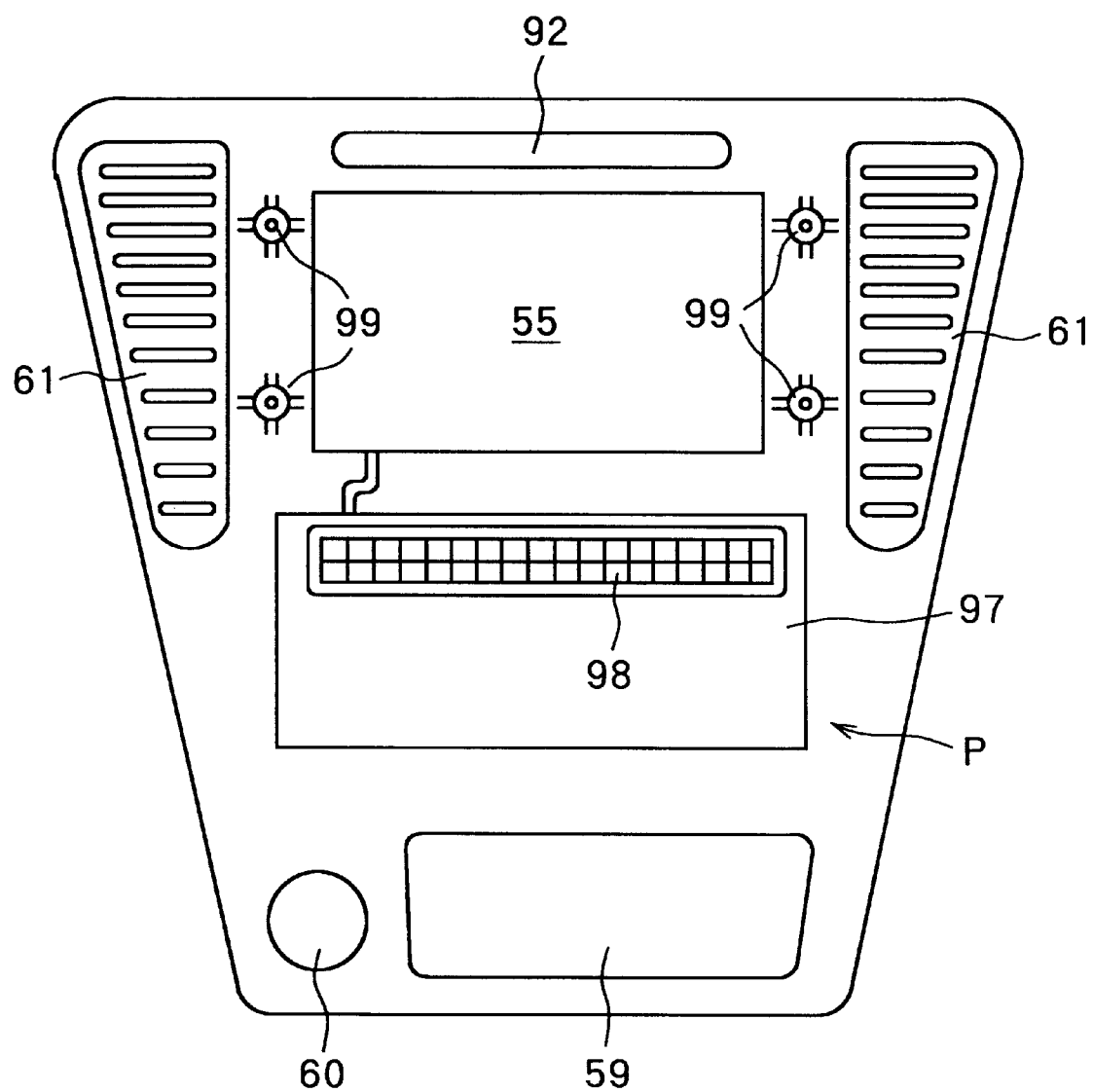
FIG. 5 is a rear view of FIG. 4.
Figure 6:
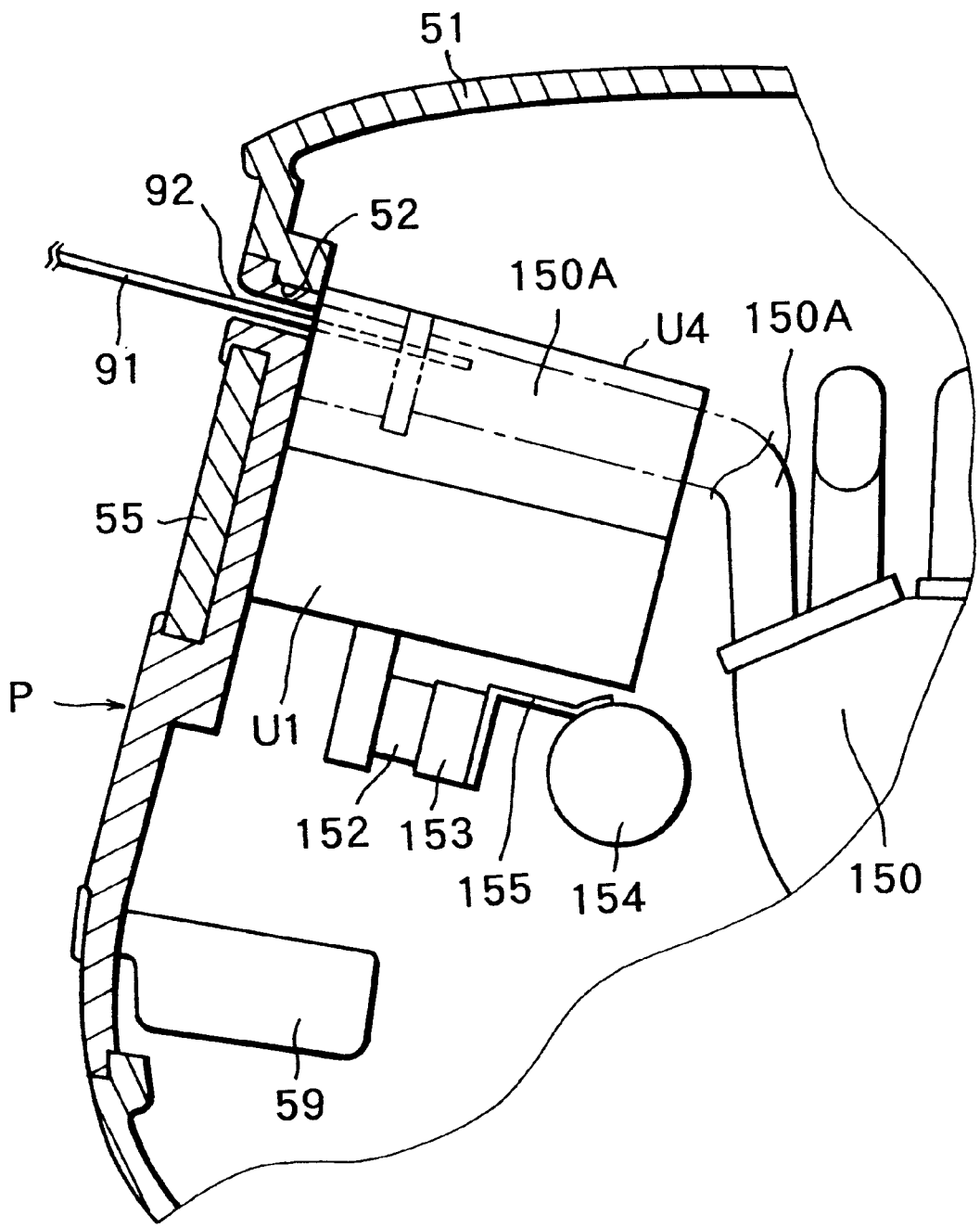
FIG. 6 is a side sectional view of FIG. 4.

[Description of FIGS. 4 to 6]

The relationship between the panel body P and electric device units will be described in more detail below with reference to FIGS. 4 to 6. In the example shown in FIGS. 4 to 6, the navigation unit U4 (also serving as a CD player) and AM/FM ratio unit U1 are used as the electric device units. More specifically, on the back side of the panel body P, the navigation unit U4 is set at an upper position, and the unit U1 is vertically stacked under the navigation unit U4. The units U1 and U4 are integrated to form a set of units. The coupling method of the units in the stacking state, and the connection method between the units and the panel body P will be described later. In the following description, reference numerals of switches and the like used shown in FIGS. 1, 2, or 3 are used, and a repetitive description thereof will be avoided. Also, characteristic portions unique to FIGS. 4 to 6 will be mainly described.

As shown in FIG. 4, an opening 92 for loading/unloading a disk 91 into/from the navigation unit U4 is open to a position above the large-size display 55 on the surface (the surface facing the passenger room) of the panel body P. Reference numeral 93 denotes a loading switch of the disk 91; and 94, an unloading switch. A switch group S6 for the unit U1 is located immediately above the display 55 in a direction parallel to the widthwise direction of the vehicle. A switch group S1 as touch panel switches for the navigation unit U4 is located on the lower portion of the display 55. Function switches F.1 to F.6 for selecting functions are disposed immediately below the display 55 in a direction parallel to the widthwise direction of the vehicle.

Traffic information display request, time display request, navigation selection, and CD selection switches are provided beneath the function switches in a direction parallel to the widthwise direction of the vehicle. A power ON/OFF switch 95 for navigation and a display scroll switch 96 are mounted on the left and right portions of the traffic information display request switch and the like. The air-conditioner switch group 58 is set underneath these switches 95 and 96 in a direction parallel to the widthwise direction of the vehicle, and the ashtray 59 and cigarette lighter 60 underneath the switch group 58.

FIG. 5 shows the rear surface of the panel body P. In FIG. 5, reference numeral 97 denotes a switch board (CPU board); and 98, a connector for transmitting signals to the units U1 and U4. A total of four, upper and lower right and left screw holes 99 are formed on the rear surface of the panel body P. The two, upper right and left screw holes 99 are used for the unit U4, and the two, lower right and left screw holes 99 are used for the unit U1.

In FIG. 6, reference numeral 150 denotes an air-conditioning air duct, from which branch air ducts 150A branch. These branch air ducts 150A are connected to the air-conditioning air outlets 61 formed on the panel body P via paths on the right and left sides of the unit. The panel body P is connected to devices other than the units U1 and U4 via a connector 152 which is arranged on the unit U1 via the lower unit U1, and a connector 153 fixed to the vehicle body. More specifically, the connector 153 on the vehicle body side is fixed to a steering support member 154, which extends in the widthwise direction of the vehicle and has high rigidity, via a bracket 155. The surface on the connection side of the connector 154 with respect to the connector 153 faces the opening portion 52, i.e., agrees with the insertion direction of the units U1 and U4 via the opening portion 52 formed on the instrumental panel 51. With this structure, when the units U1 and U4 (i.e., the assembly of these units and the panel body P) are inserted into the opening portion 52, the connectors 152 and 153 are automatically connected to each other. Note that electric power may be supplied to the panel body P using an independent line but may be supplied via, e.g., the connectors 152 and 153.

Figure 7:
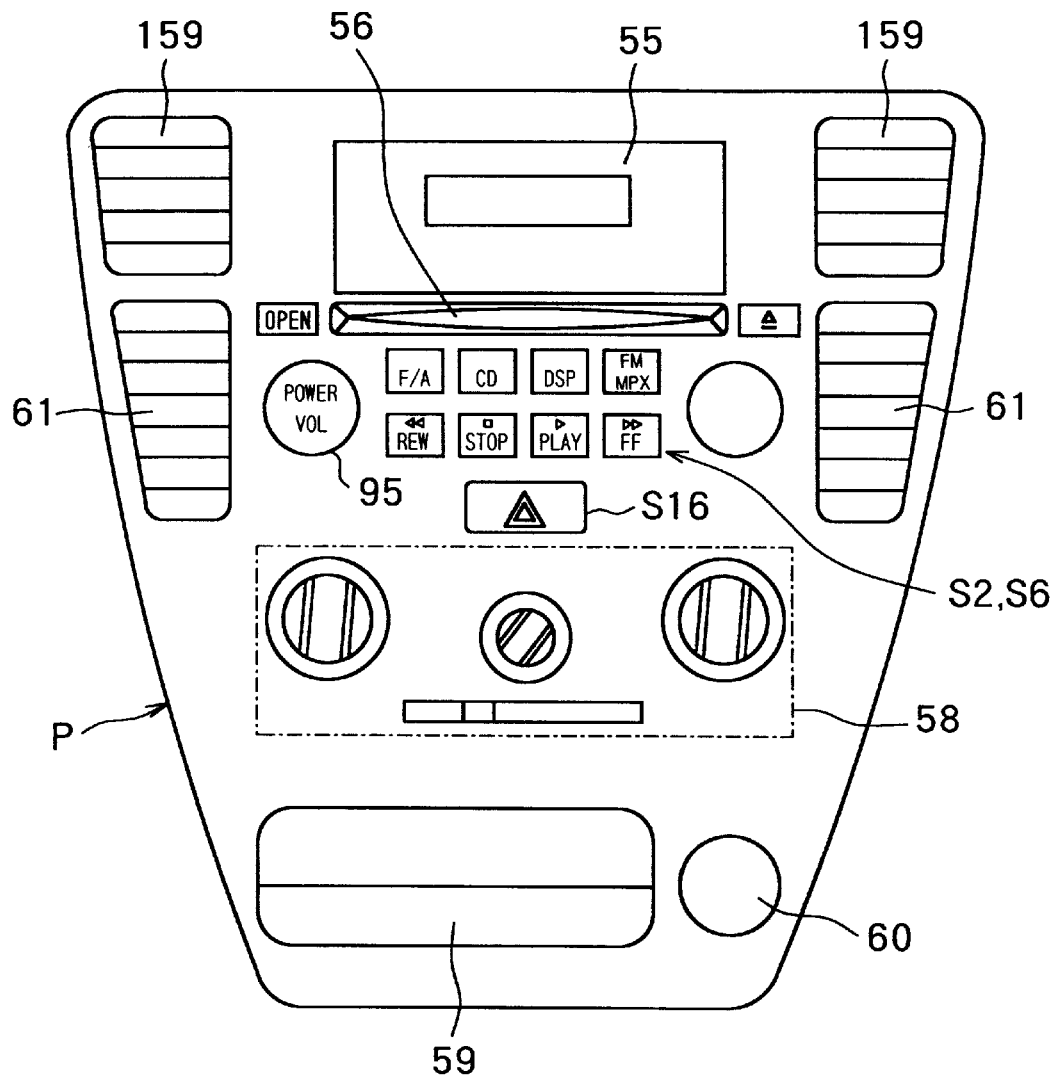
FIG. 7 is a front view showing the second embodiment of the panel body.
Figure 8:
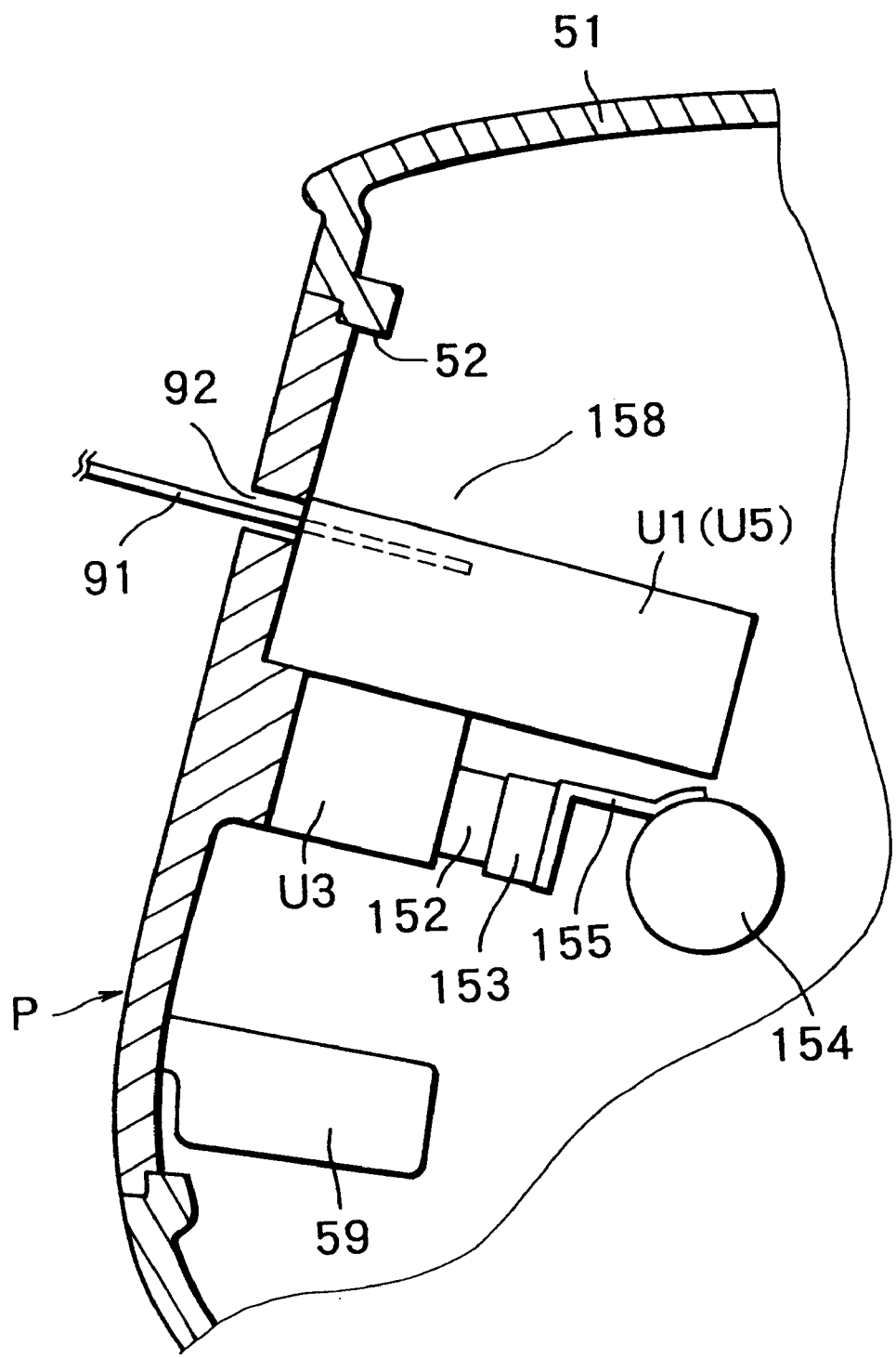
FIG. 8 is a side sectional view of FIG. 7.

[Description of FIGS. 7 and 8]

FIGS. 7 and 8 show the second embodiment of the present invention, and correspond to FIGS. 4 and 6. In this embodiment, the AM/FM radio unit U1, CD unit U5, and air-conditioner unit (manual air-conditioner) unit U3 are used as the electric device units. In this embodiment, a CD player is built in the AM/FM radio unit U1, and a portion corresponding to the unit U4 shown in FIG. 6 forms a space 158. The connector 152 on the unit side for the connector 153 on the vehicle body side is arranged on the lowermost unit U3.

Note that an opening may be formed on the panel body P at a position in front of the space 158, and may be covered by a blank cover. In this case, a small-size display 55 may be used, or only loudspeakers for audibly transmitting information may be used as an information transmission means (display unit) instead of the display. In this case, the loudspeakers can be set at positions indicated by reference numeral 159 in parentheses in FIG. 7 (if no loudspeakers 159 are arranged, these portions also serve as the outlets 61).

Figure 9:
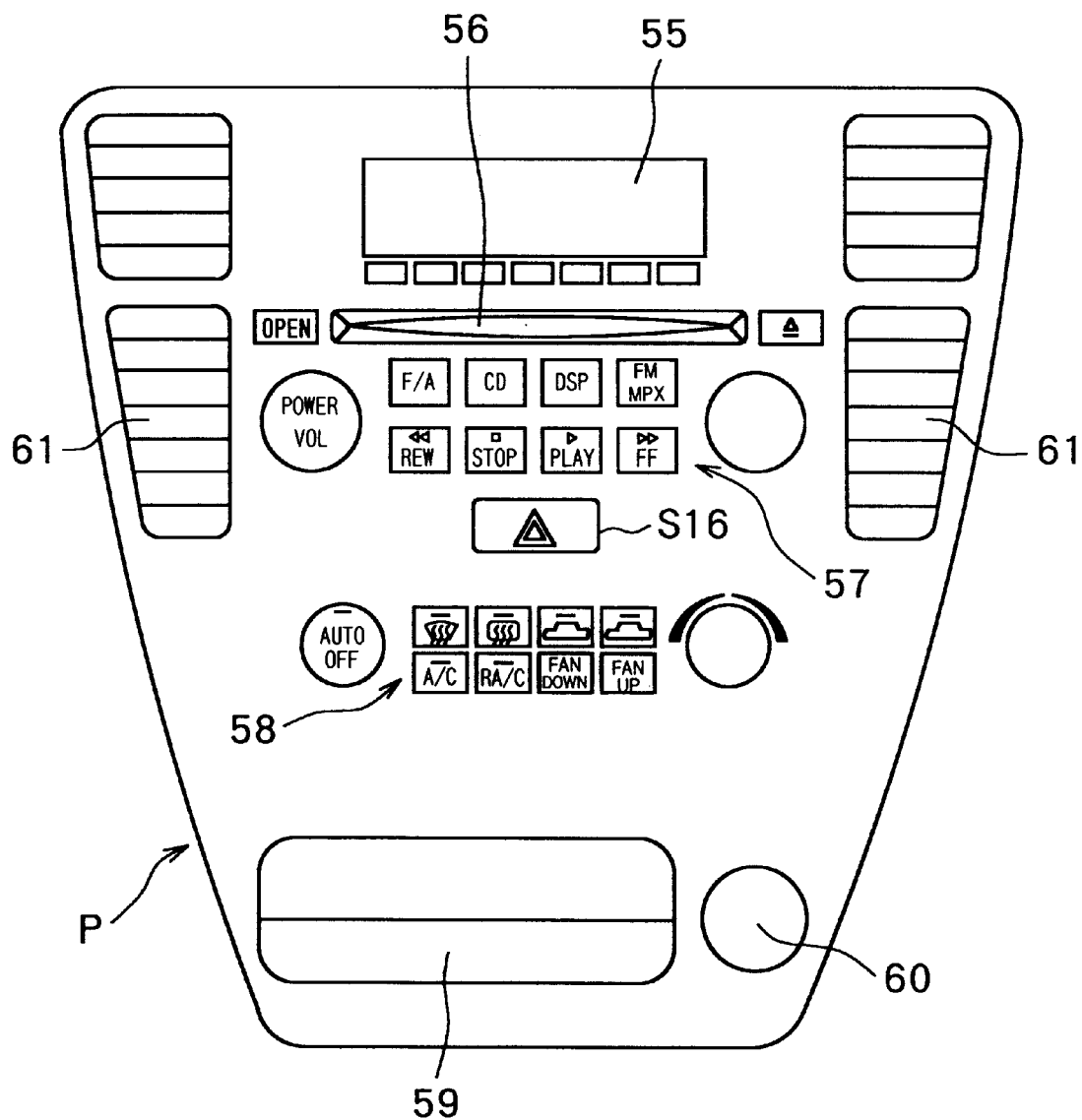
FIG. 9 is a front view showing the third embodiment of the panel body.
Figure 10:
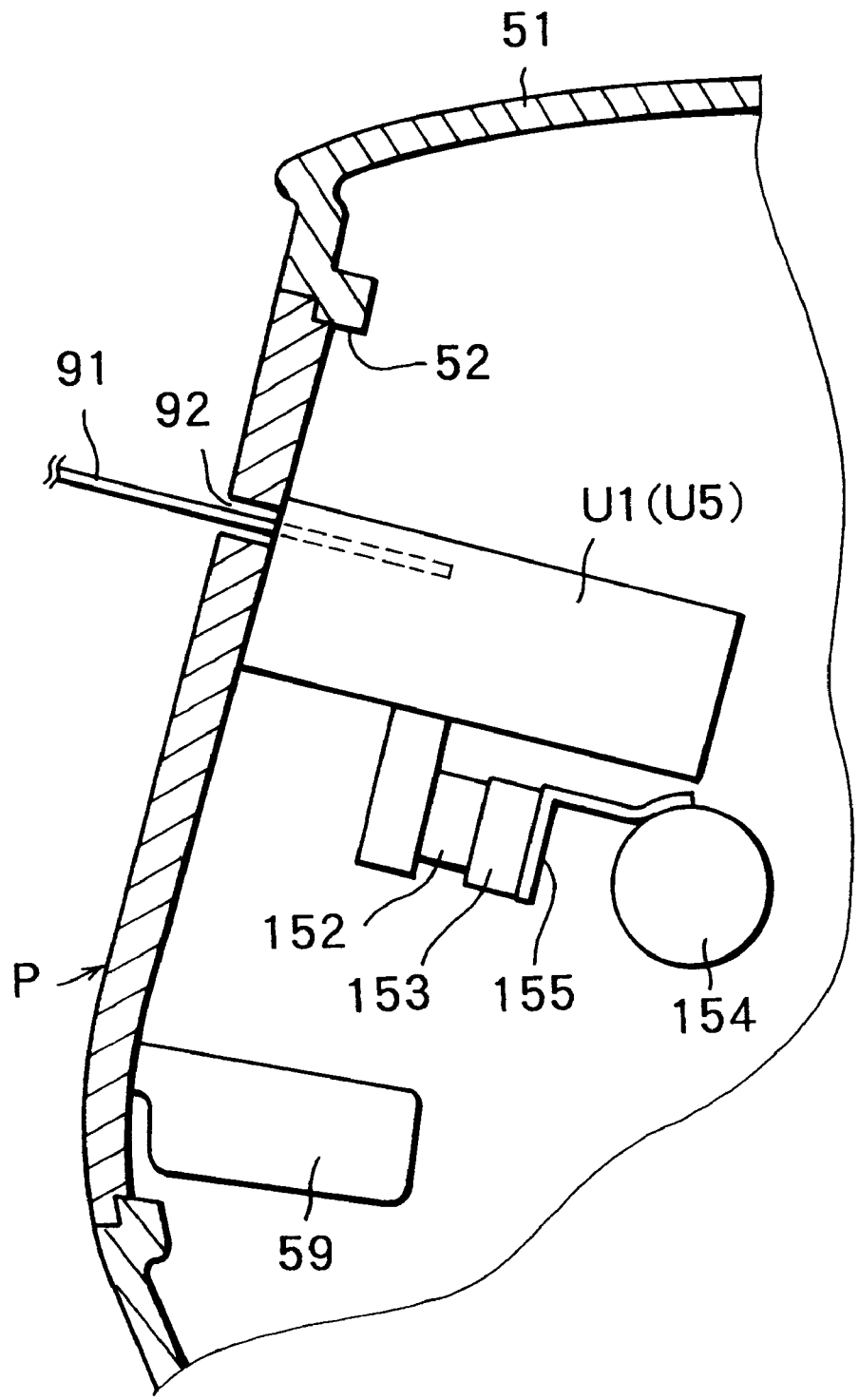
FIG. 10 is a side sectional view of FIG. 9.

[Description of FIGS. 9 and 10]

FIGS. 9 and 10 show the third embodiment of the present invention, and the AM/FM radio unit U1 and CD unit U5 are used as the electric device units as in FIGS. 7 and 8. However, since an automatic air conditioner is used, its electric device unit is arranged at a position separated from the panel body P, and is not shown in FIGS. 9 and 10 (the panel body P and the air-conditioner unit are connected via a multiplex communication means).

Figure 11:
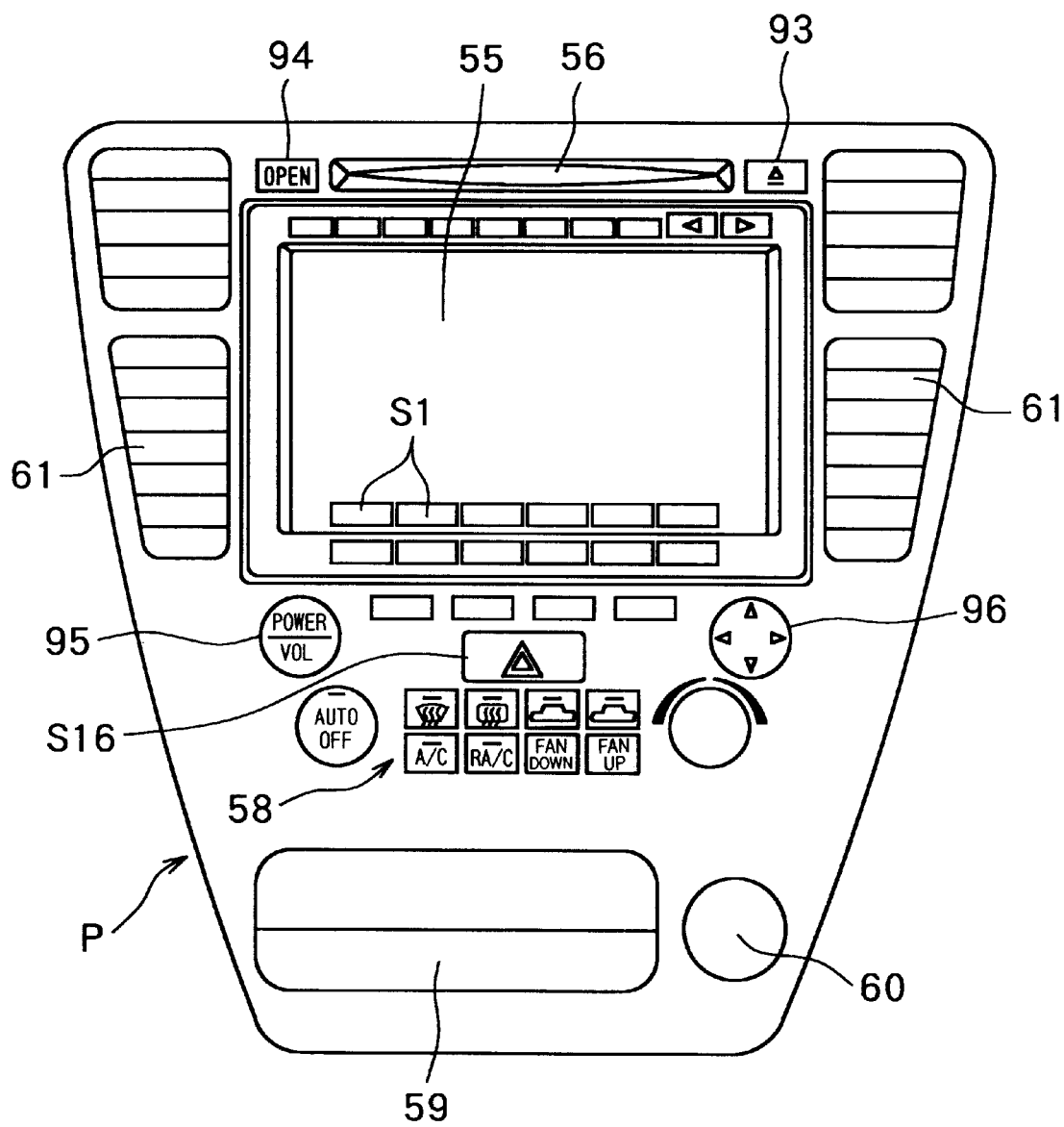
FIG. 11 is a front view showing the fourth embodiment of the panel body.
Figure 12:
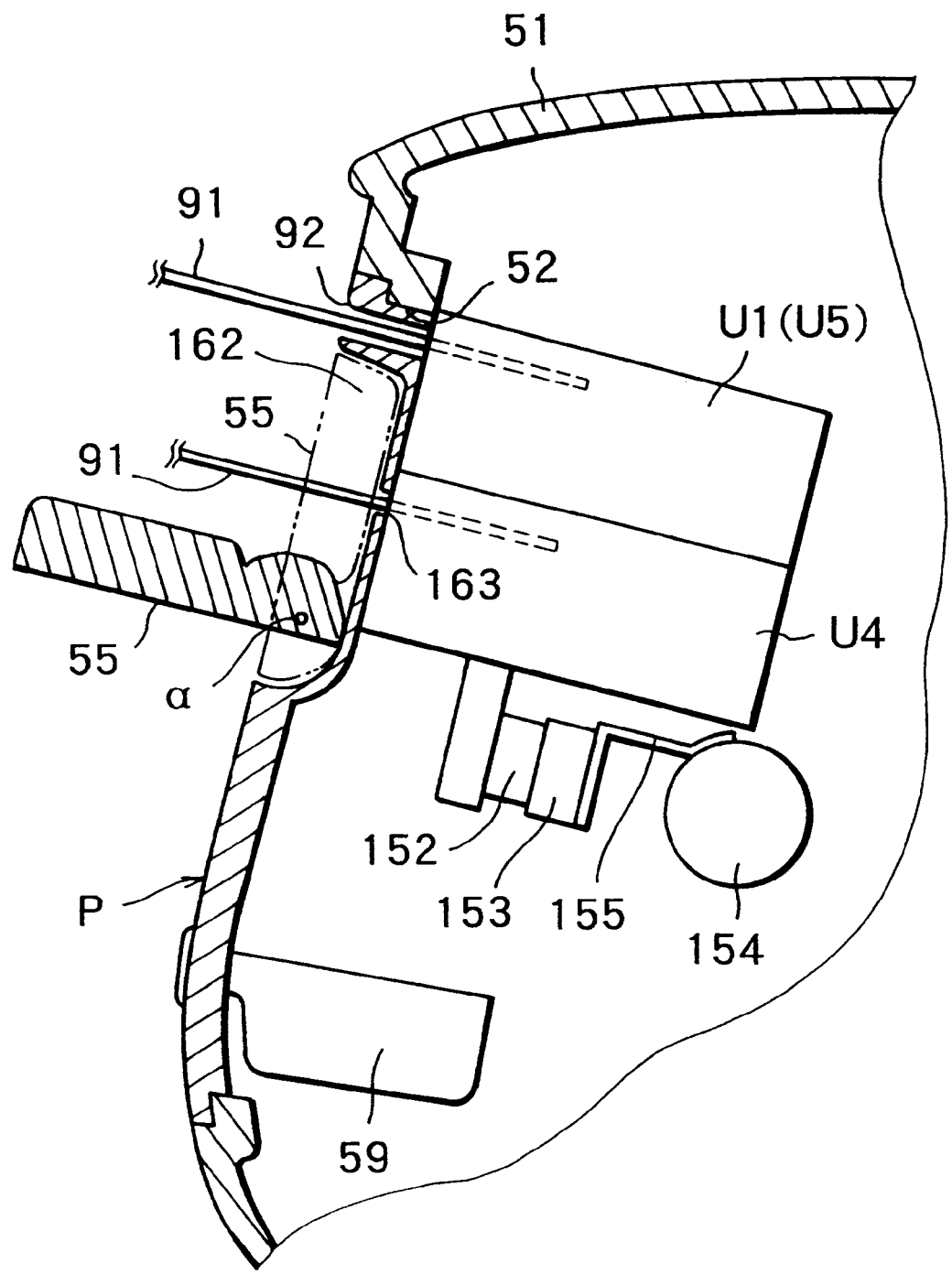
FIG. 12 is a side sectional view of FIG. 11.
Figure 13:
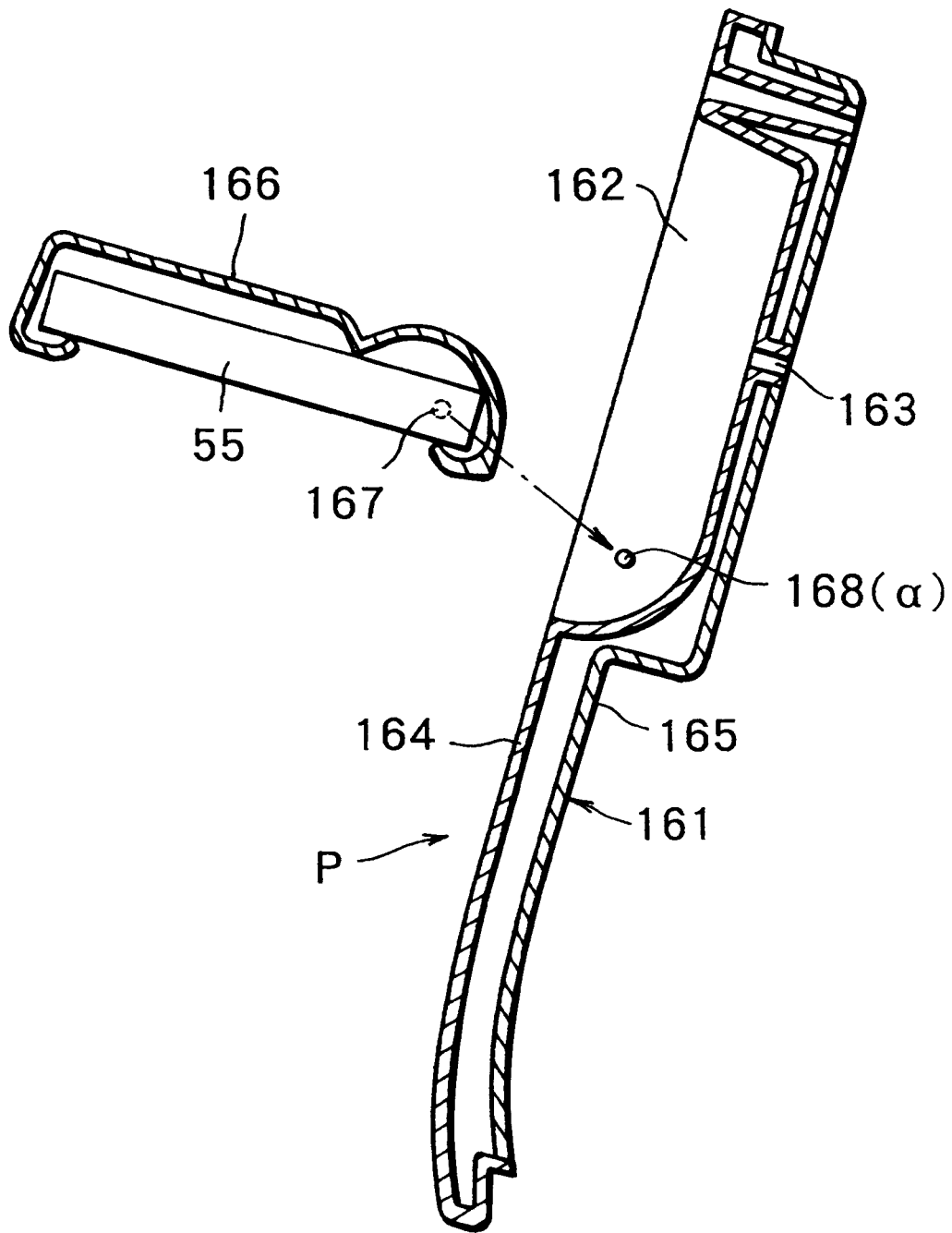
FIG. 13 is an enlarged sectional view showing principal part of FIG. 12.

[Description of FIGS. 11 to 13]

FIGS. 11 to 13 show the fourth embodiment of the present invention, and the navigation unit U4 is used in addition to the AM/FM radio unit U1 and CD unit U5 as in FIGS. 7 and 8, as the electric device units. An automatic air conditioner is used, and its electric device unit is provided at a position separated from the panel body P.

The characteristic feature of this embodiment resides in the use of a large-size display 55 which is retractable from a main body portion 161 of the panel body P. More specifically, a recess portion 162 is partially formed in the storage portion of the display 55, and the display 55 is located within this recess portion 162. The display 55 is swingable at its lower end portion about an axis α that extends nearly horizontally. At the upright position indicated by the one-dashed chain line in FIGS. 11 and 12, the display surface of the display 55 is flush with the main body portion 161, and can be used (closed position). Since the pivot axis is set at the lower end portion of the display 55, no hinge holding mechanism is required in its face-down state, and the hinge arrangement can be simplified. Also, when the display 55 is pivoted toward the passenger room until it faces down, as indicated by the solid line in FIG. 12, it is set at the open position, so that the recess portion 162 is accessible from the passenger room.

The recess portion 162 is formed with an opening 163 corresponding to the disk loading/unloading port of the unit U4, and the disk 91 can be loaded/unloaded into/from the unit U4 by setting the display 55 at the face-down position, i.e., the open position while the panel body P is fixed to the instrumental panel 51.

FIG. 13 shows the main body portion 161 and the display 55 portion in more detail. More specifically, the main body portion 161 has a low-profile structure as a whole to form a closed section therein by a front plate 164 and back plate 165. The front plate 164 is deformed toward the back plate 165 to form the recess portion 162. The opening 163 is formed at a predetermined position of the recess portion 162.

The display 55 is integrally held by a holding plate 166. By pivotally fitting a pair of right and left short-projection-like pivot shafts 167 formed on the side surfaces of the holding plate 166 into holding holes 168 formed on the right and left side surfaces of the recess portion 162, the display 55 is set to be retractable together with the holding plate 166, as described above. Of course, the pivot shafts 167 and holding holes 168 define the above-mentioned swing axis α. Note that the panel body P described so far and a panel body P to be described below are formed into a low-profile planar shape as a whole to define a closed section by the front and back plates 164 and 165, as in FIG. 13.

Figure 14:
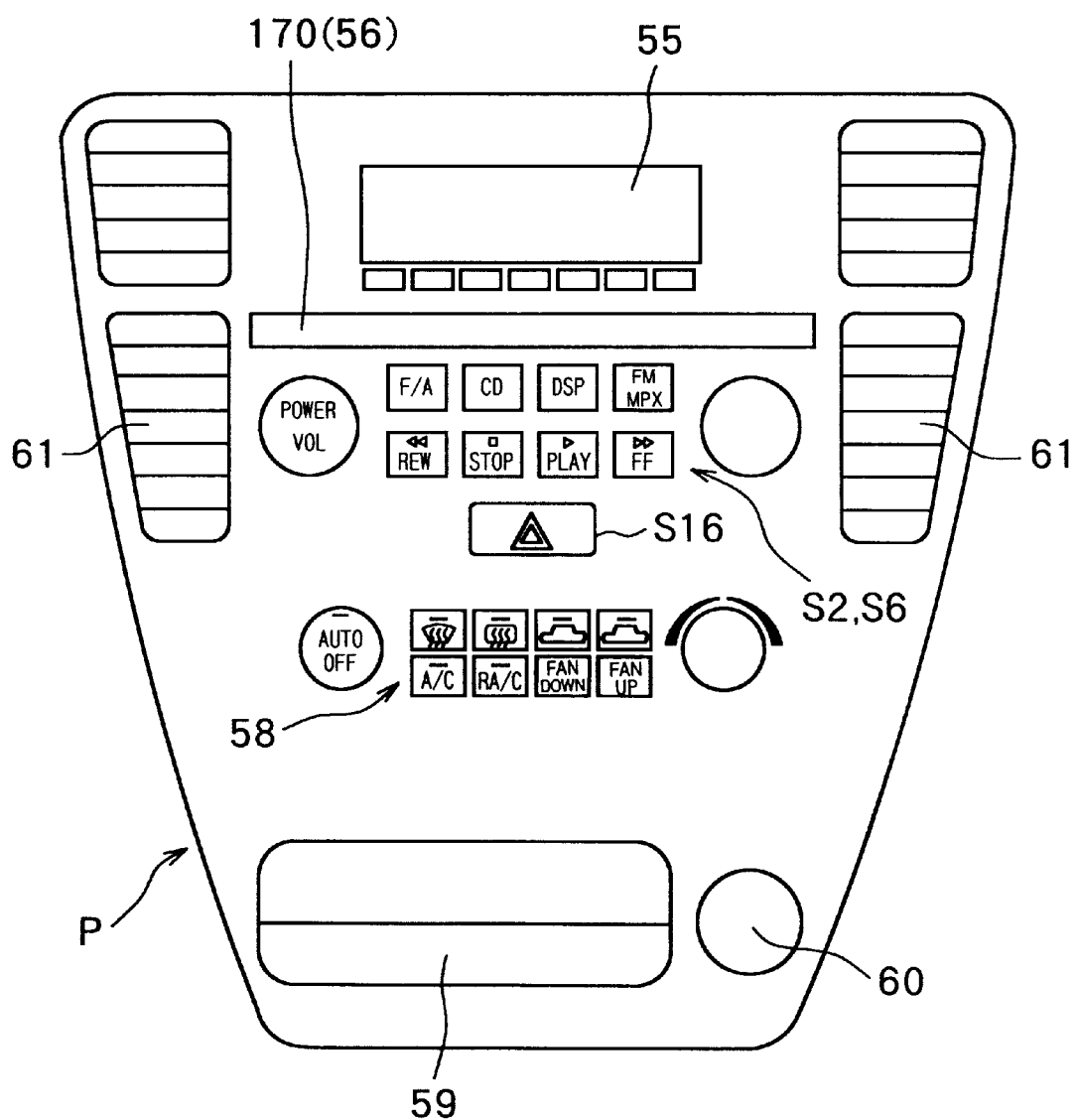
FIG. 14 is a front view showing the fifth embodiment of the panel body.

[Description of FIG. 14]

FIG. 14 shows the fifth embodiment of the present invention, and the AM/FM radio unit U1 alone is used as the electric device unit. The appearance of this embodiment resembles to that shown in FIGS. 7 and 8 as a whole. However, since this embodiment has no CD player, the opening 56 for the CD 91 shown in FIGS. 7 and 8 is formed but is closed by a blank cover.

Figure 15:
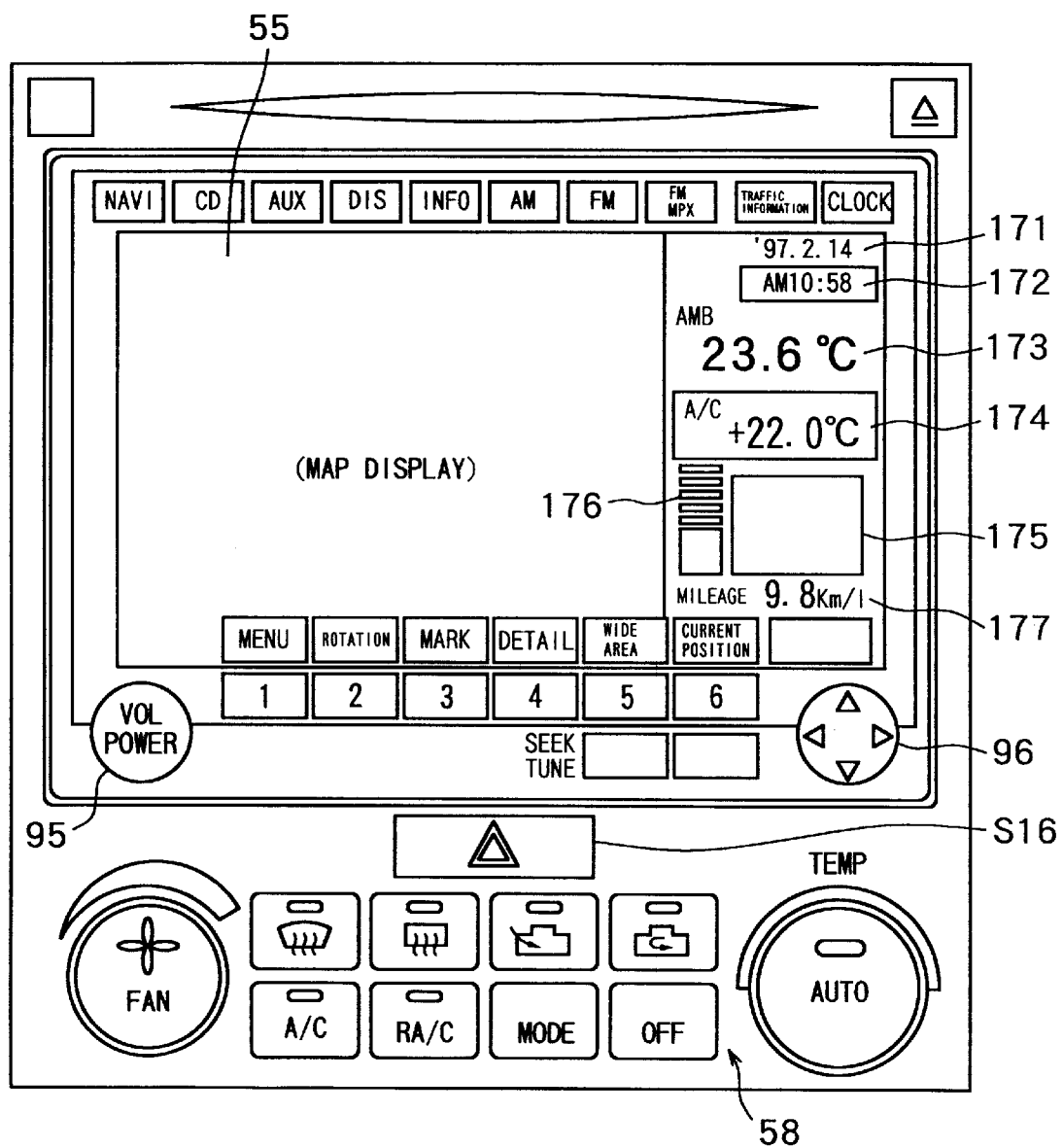
FIG. 15 is a front view showing an example of the display contents displayed on a large-size display.

[Description of FIG. 15]

FIG. 15 shows an embodiment wherein a large-size display is used as the display 55 to be able to display a map for navigation, and the display 55 can display other kinds of information in addition to the map. That is, the display 55 can display the current date (171), current time (172), outer temperature (173), room temperature (174), an icon (175) indicating internal or external circulation of air-conditioning air, air-conditioning air outlet amount (176), and current vehicle velocity (177). Of course, FIG. 15 shows an example of display, and desired information can be displayed on the display 55. Also, the display contents (kinds of information) may be selected using switches.

[Description of FIGS. 16 to 23]

The coupling method and connection method between the panel body P and electric device units will be explained below with reference to FIGS. 16 to 23. The following description exemplifies a case wherein the number of electric device units coupled and connected to the panel body P is 3. These units are identified from each other using reference symbols UA, UB, and UC, and are also denoted by reference symbol U if they need not be identified from each other.

Figure 16:
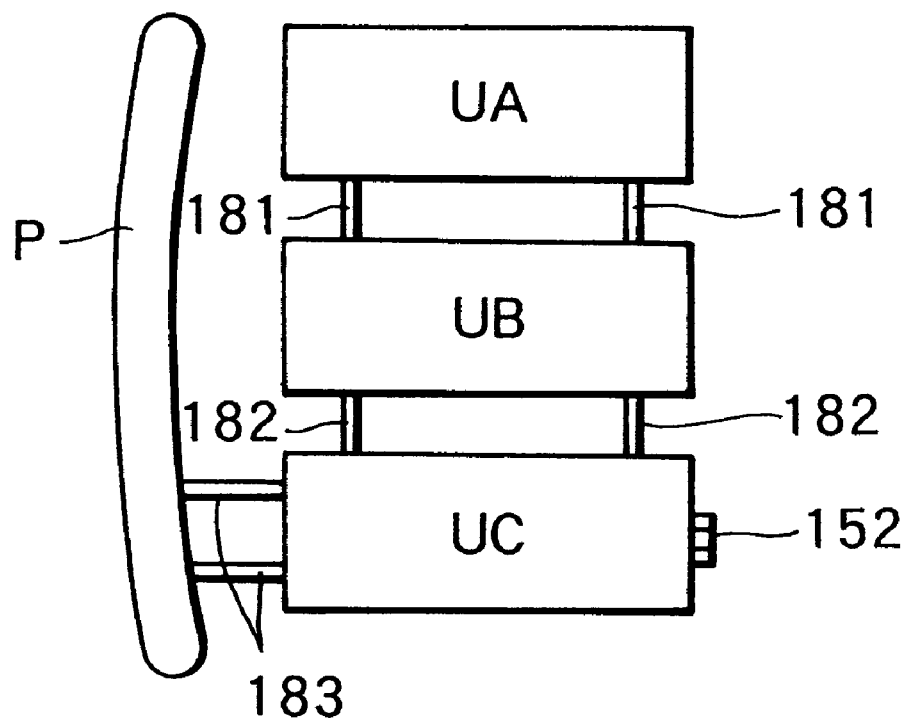
FIG. 16 is a schematic side view showing the first example of the connection structure between a plurality of units and panel body.

FIG. 16 shows an example of the connection method between the panel body P and units UA, UB, and UC. More specifically, the units UA and UB are connected to each other via bus circuits 181, the units UB and UC via bus circuits 182, and the unit UC and panel body P via bus circuits 183. That is, the unit UB is connected to the panel body P via the unit UC, and the unit UA is connected thereto via the units UC and UB. Only the unit UC has the connector 152 for the connector 163 (see FIGS. 6, 8, 10, and 12) on the vehicle body side.

The above-mentioned connection method is preferable reduce the number of units to be connected to the panel body P to only one. When the units UA, UB, and UC are coupled to each other in a vertically stacked state, such connection method is advantageous for obtaining a connection in correspondence with the units to be coupled (see also the description of the coupling and connection methods in FIGS. 20 to 22 later).

Figure 17:
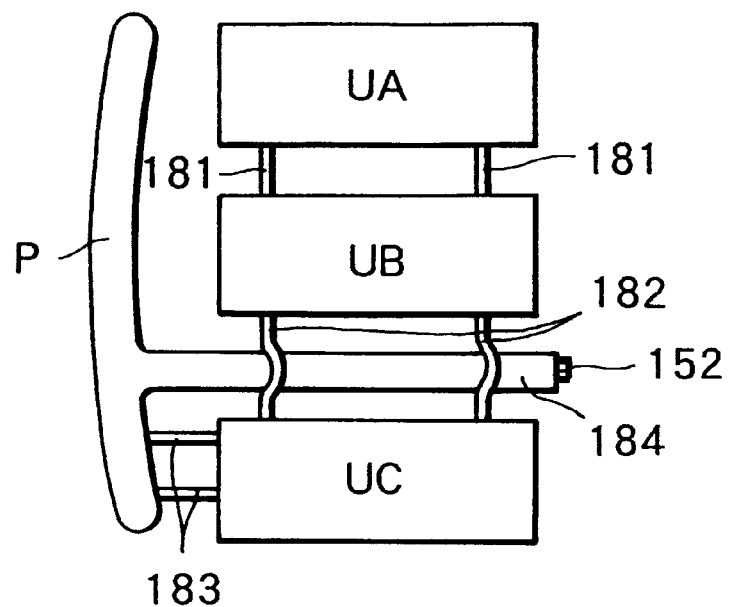
FIG. 17 is a schematic side view showing the second example of the connection structure between a plurality of units and panel body.

In FIG. 17, an extending portion 184 which extends from the panel body P toward the units UA, UB, and UC is formed in addition to FIG. 16, and the connector 152 is arranged on the distal end of the extending portion 184. In this case, the connector 152 can always be arranged on the panel body P.

Figure 18:
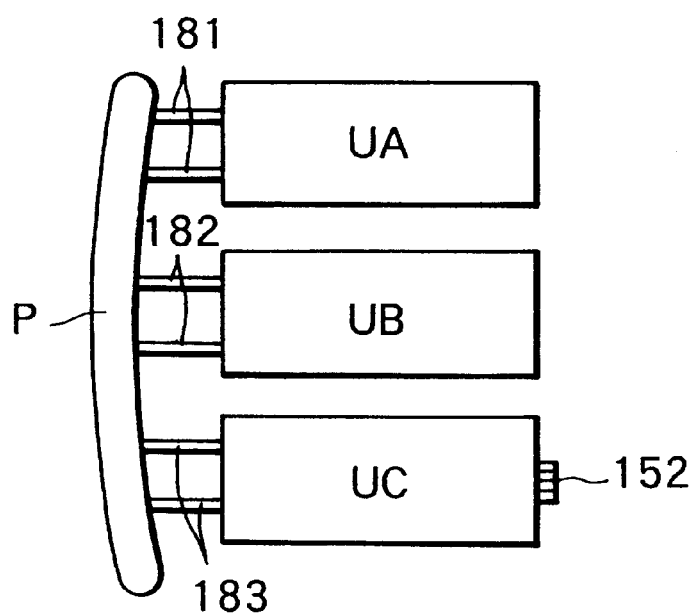
FIG. 18 is a schematic side view showing the third example of the connection structure between a plurality of units and panel body.

In FIG. 18, the units UA, UB, and UC are independently connected to the panel body P. The connector 152 is disposed on the lowermost unit UC. Since the individual units can be reliably connected to the panel body, this method is preferable in terms of connection reliability as compared to the case wherein the units are connected to the panel body P via other units.

Figure 19:
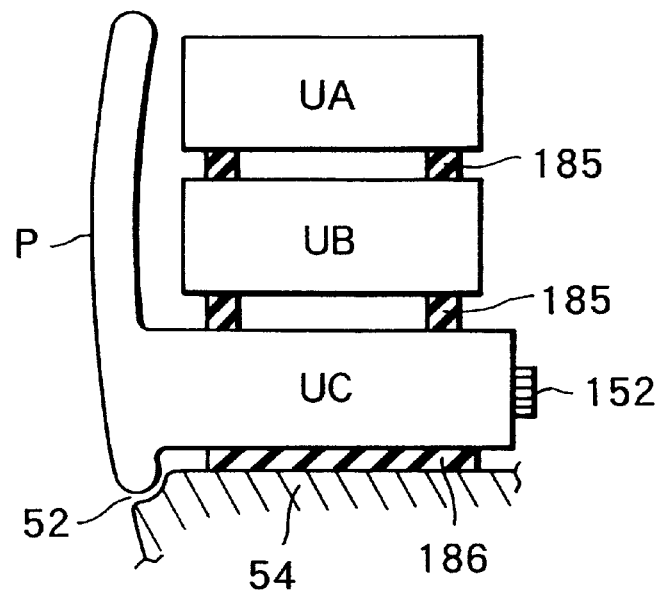
FIG. 19 is a schematic side view showing the fourth example of the connection structure between a plurality of units and panel body.

In FIG. 19, shock absorbers 185 consisting of an elastic member such a rubber mat are interposed between adjacent units when the units are coupled in the vertically stacked state. Also, shock absorbers 186 consisting of an elastic member such as rubber are interposed between the lowermost unit UC and the partition wall 54 in the opening portion 2 on which the unit UC is placed. FIG. 19 illustrates the shock absorbers 185 and 186 thick to clearly show them, but these shock absorbers 185 and 186 are very thin in practice and can also be used when the following coupling methods for the units in a vertically stacked state are used.

Furthermore, in FIG. 19, the lowermost unit UC is formed integrally with the panel body P. In other words, as the unit UC, a unit having a function that must always be used together with a predetermined panel body P is selected. The connector 152 is mounted on the unit UC.

Figure 20:
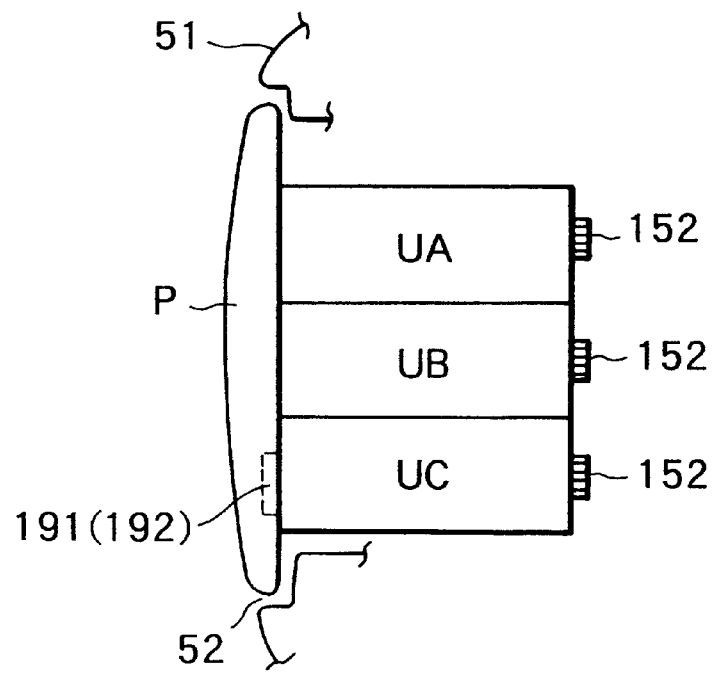
FIG. 20 is a schematic side view showing the fifth example of the connection structure between a plurality of units and panel body.
Figure 21:
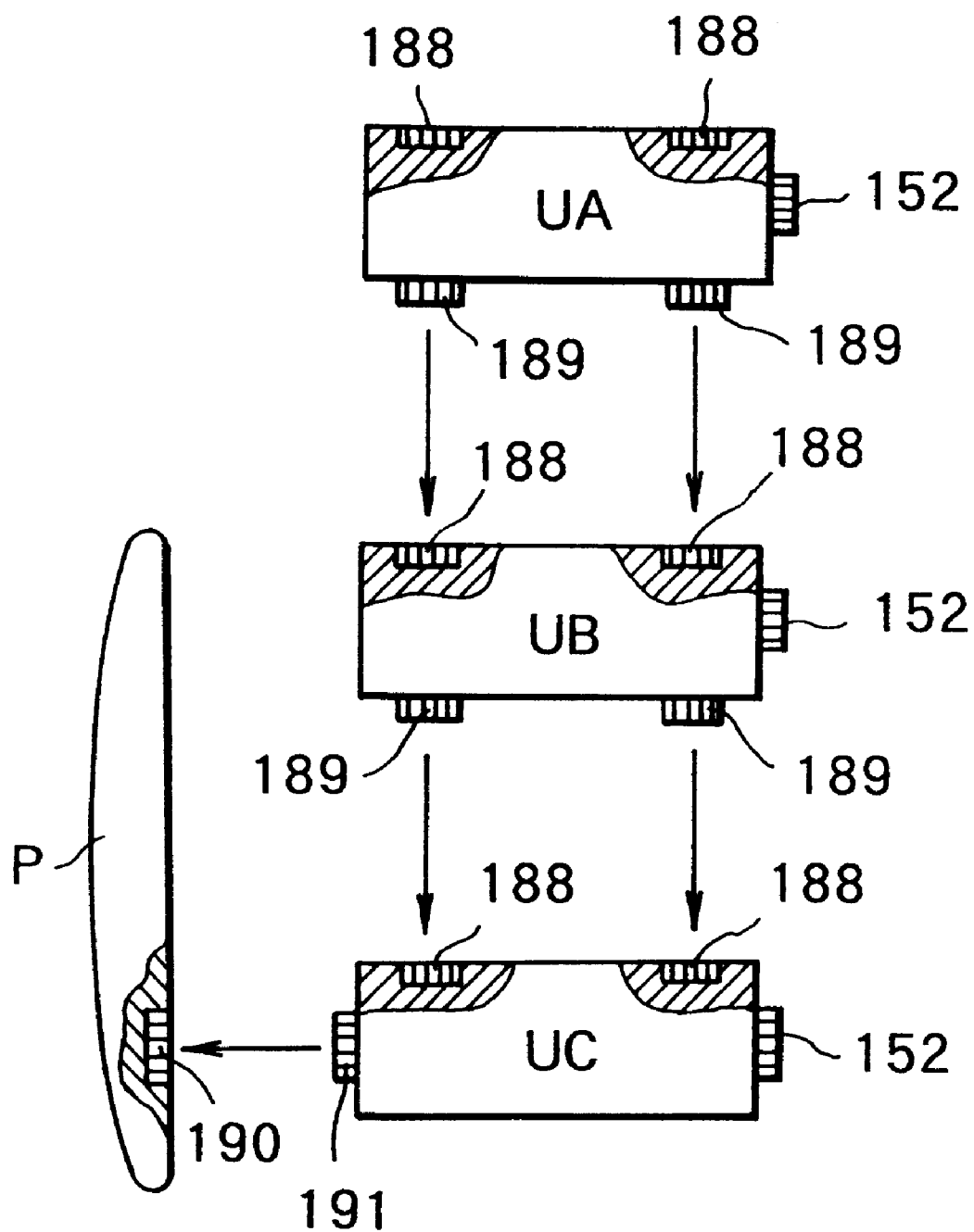
FIG. 21 is a partially cutaway, exploded side view of FIG. 20.
Figure 22:
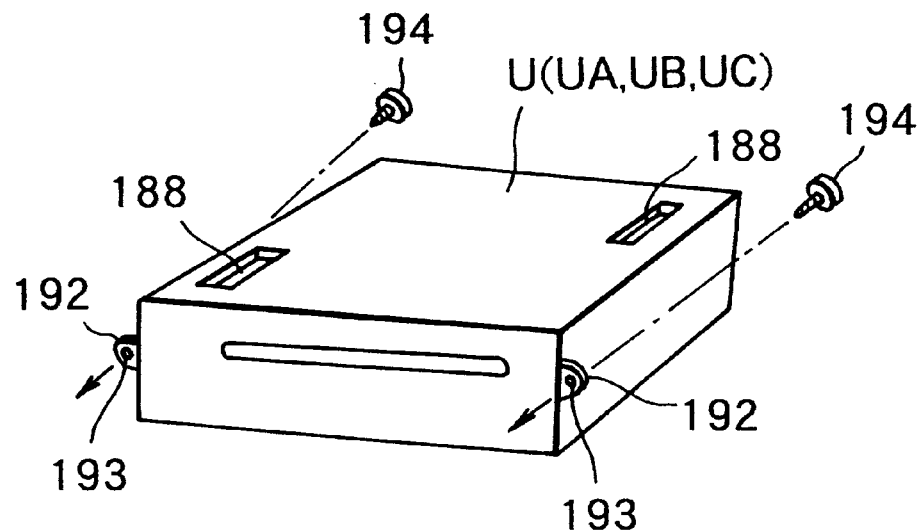
FIG. 22 is a perspective view showing each of the units shown in FIGS. 20 and 21 in detail.

FIGS. 20 to 22 show an example of the coupling method between the panel body P and units UA, UB, and UC. More specifically, each of the units UA, UB, and UC has a vertically low-profile box shape, and a plurality of (two in this embodiment) coupling recesses 188 and a plurality of (two in this embodiment) coupling projections 189 are respectively formed on the upper and lower surfaces of each unit. When the units UA, UB, and UC are vertically stacked (the vertical positions of the units UA, UB, and UC are not limited to the illustrated ones but may be arbitrarily selected), the projections 189 are tightly fitted into the recesses 188 to couple these units to each other. These recesses 188 and projections 189 also serve as connectors for connecting the bus circuits shown in FIG. 16 and the like, and connections are attained simultaneously with coupling.

A coupling recess 190 is formed on the back surface of the panel body P, and a coupling projection 191 is formed on the attachment surface of, e.g., the lowermost unit UC on the panel body P side. When these recess 190 and projection 191 tightly engage with each other, the panel P and unit UC (hence, units UB and UA) are coupled to each other. These recess 190 and projection 191 also serve as connectors for connecting the bus circuits. The connectors 152 to be connected to the connector 153 on the vehicle body side are arranged on those surfaces of the units UA, UB, and UC, that are opposite to the panel body P.

In the coupling and connection methods shown in FIGS. 20 and 21, independently of the units selected in correspondence with the panel body P (in correspondence with the type or grade of vehicle), coupling and connections among the units, and between the units and panel body P can be easily obtained. Furthermore, the units can be easily connected to the connector 153 on the vehicle body side independently of their vertical positions.

For example, when the connector 153 on the vehicle body side is arranged at the level of the lowermost unit UC, and no unit is required at the level of the lowermost unit UC, a dummy unit (having a frame that defines its outer shape, the recesses and projections 188, 189, and 191 for coupling and connection, and the connector 152) may be used, so that the connector 152 always comes to the position corresponding to the connector 153 on the vehicle body side. The projections 191 for coupling and connection to the panel body P may be arranged on all the units UA to UC. Of course, the recesses and projections may be formed at positions opposite to the illustrated ones.

Figure 33:
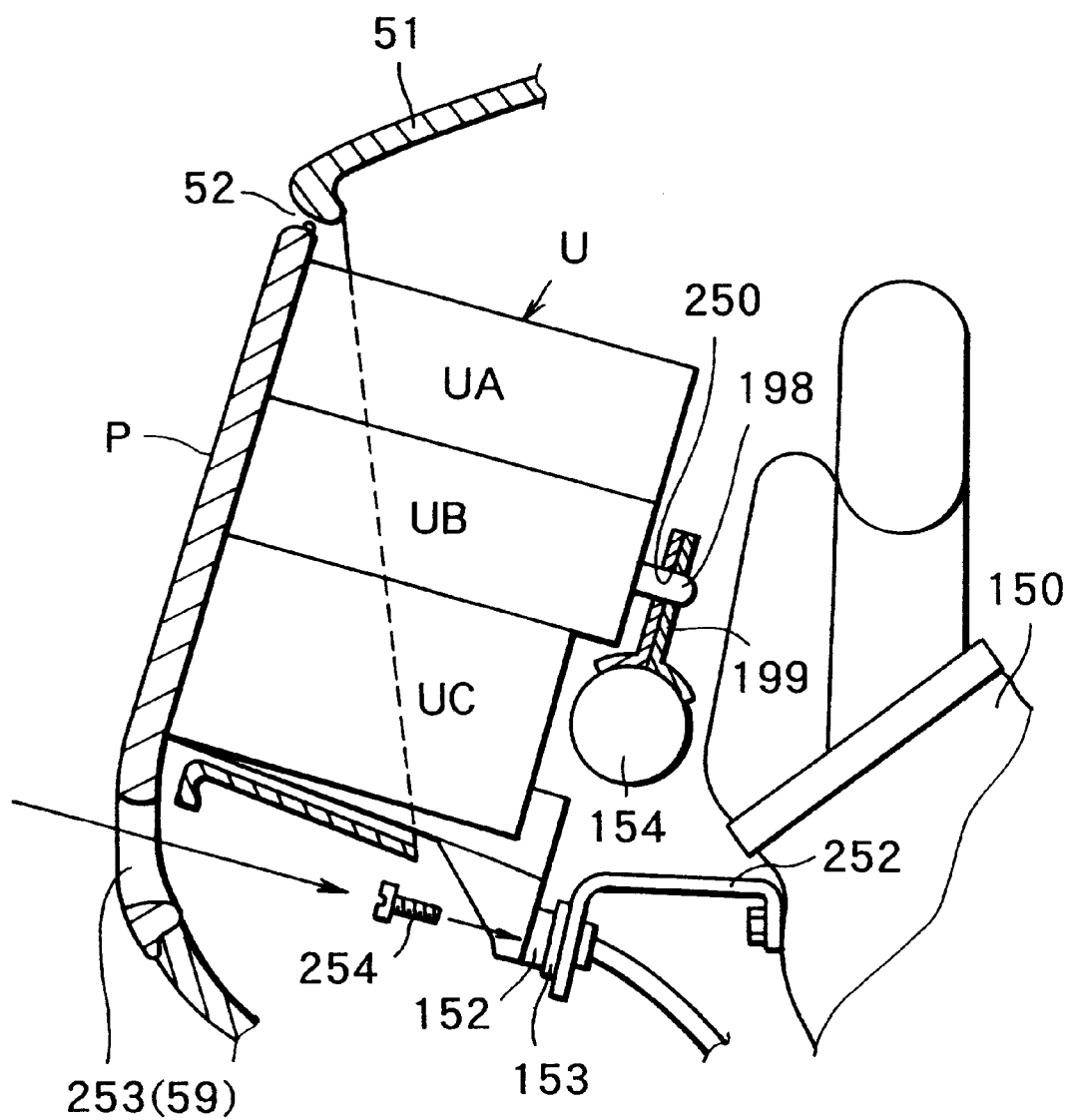
FIG. 33 is a partial side sectional view showing still another example when the assembly of the units and panel body is mounted on a vehicle.

In order to strengthen coupling of units to the panel body P, fixing members such as screws may be additionally used. More specifically, as shown in FIG. 33, short attachment brackets 192 extending to the right and left may project from the attachment surface of each unit on the panel body P side, and screw holes 193 may be open to these brackets 192. After screw portions of screws 194 are inserted into the screw holes 193, they are screwed into the screw holes 99 (see FIG. 5) formed on the back surface of the panel body P.

Figure 23:
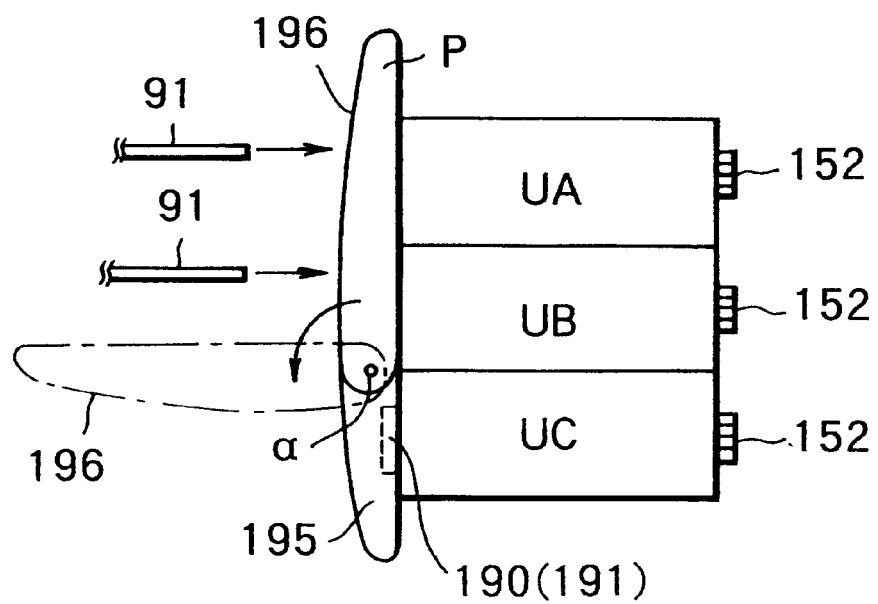
FIG. 23 is a schematic side view showing an example in which a portion of the panel body is free to open/close.

In FIG. 23, a portion of the panel body P is free to be open/close. In case of FIG. 23, the panel body P is divided into a main body portion 195 which is always fixed to the instrumental panel, and a lid member 196, and the lid member 196 can be selectively set at the open position where it falls down toward the passenger room, or the closed position where it stands upright. Unlike the structure shown in FIGS. 11 to 13, when the lid member 196 is set at the open position, as indicated by the one-dashed chain line in FIG. 23, those surfaces of the units (the units UA and UB in FIG. 23) covered by the lid member 196 located at the closed position indicated by the solid line, which surfaces are being on the panel body P side, are fully released (exposed) toward the passenger room side. Also, the structure shown in FIG. 23 is preferable in terms of maintenance of units. Furthermore, if the unit UA or UB which is fully exposed to the passenger room side stores a cassette that stores a plurality of CDs as information storage media, the structure shown in FIG. 23 is convenient to exchange this cassette.

[Description of FIGS. 24 to 33]

FIGS. 24 to 33 show a plurality of examples wherein upon inserting an assembly of the panel body P and units U (UA, UB, and UC) from the unit U side into the opening portion 52 of the instrumental panel 51, the connector 152 on the assembly side is automatically connected to the connector 153 on the vehicle body side, and the assembly can be firmly held (supported) by the vehicle body.

Figure 24:
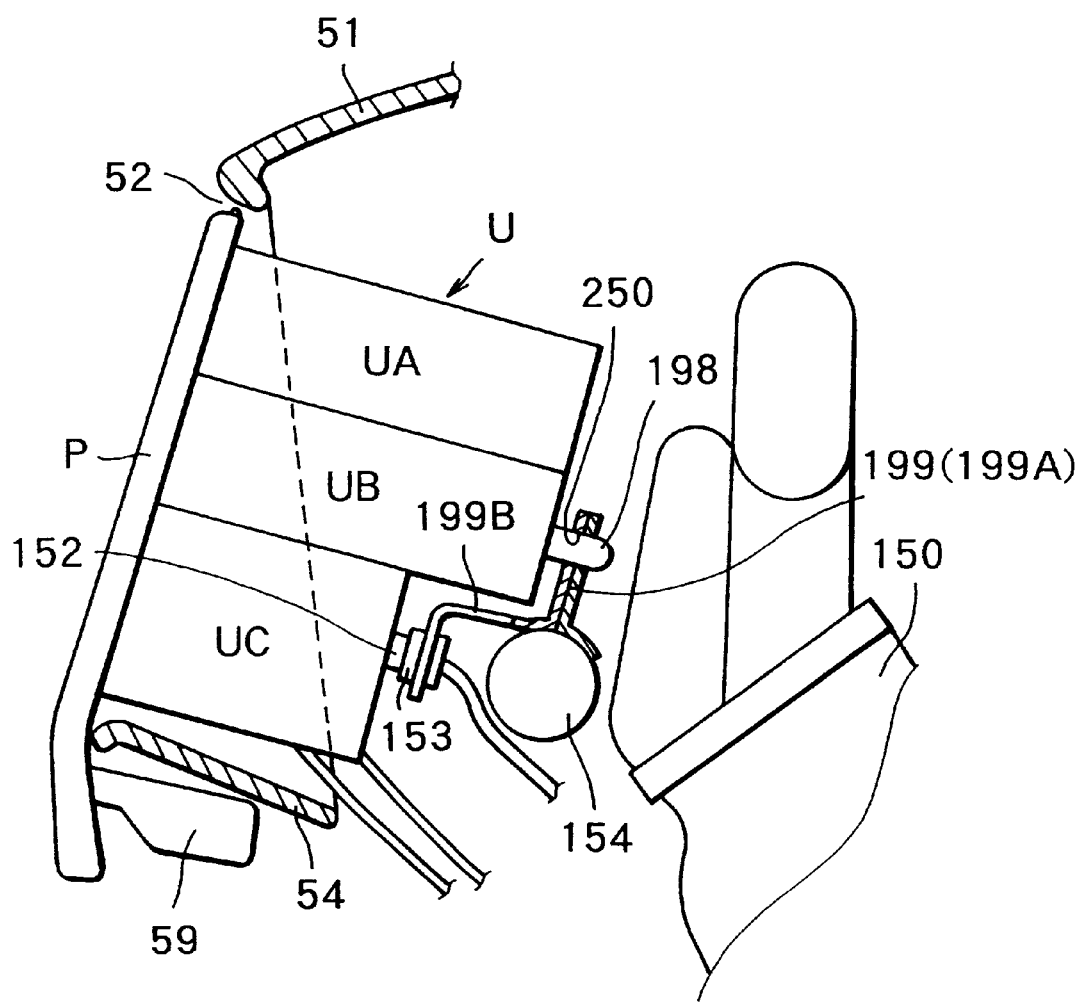
FIG. 24 is a partial side sectional view showing an example when the assembly of the units and panel body is mounted on a vehicle.

In the example shown in FIG. 24, a short, support projection 198 is formed on that surface of some units U (the middle unit UB in the vertical direction in this embodiment), which is opposite to the panel body P, and a bracket 199 is fixed to the steering support member 154. The bracket 199 has a first portion 199A which extends upward, and a second portion 199B which is located in front of the steering support member 154. The first portion 199A is formed with a support fitting hole 250 which can receive the above-mentioned projection 198 without any cluttering. The second portion 199B holds the connector 153 on the vehicle body side. The fitting hole 250 and connector 153 point in the direction of the opening portion 52, i.e., their extending direction substantially agrees with the insertion direction of the assembly of the panel body P and units U into the opening portion 52 (corresponding to FIG. 2).

When the assembly is inserted while the units U face the opening portion 52, the projection 198 is fitted into the fitting hole 250 as the insertion progresses, and the connector 152 on the assembly side is connected to the connector 153 on the vehicle body side at substantially the same time with fitting.

Figure 25:
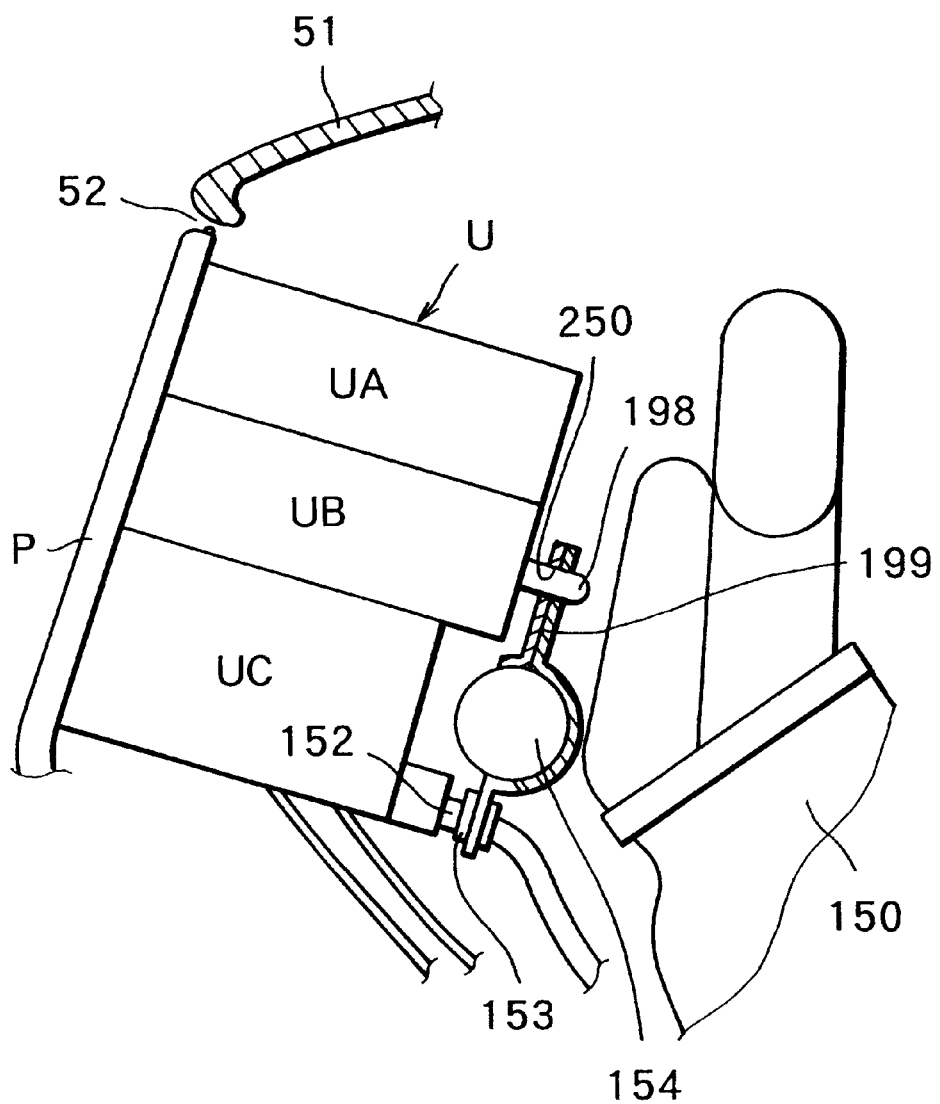
FIG. 25 is a partial side sectional view showing another example when the assembly of the units and panel body is mounted on a vehicle.
Figure 26:
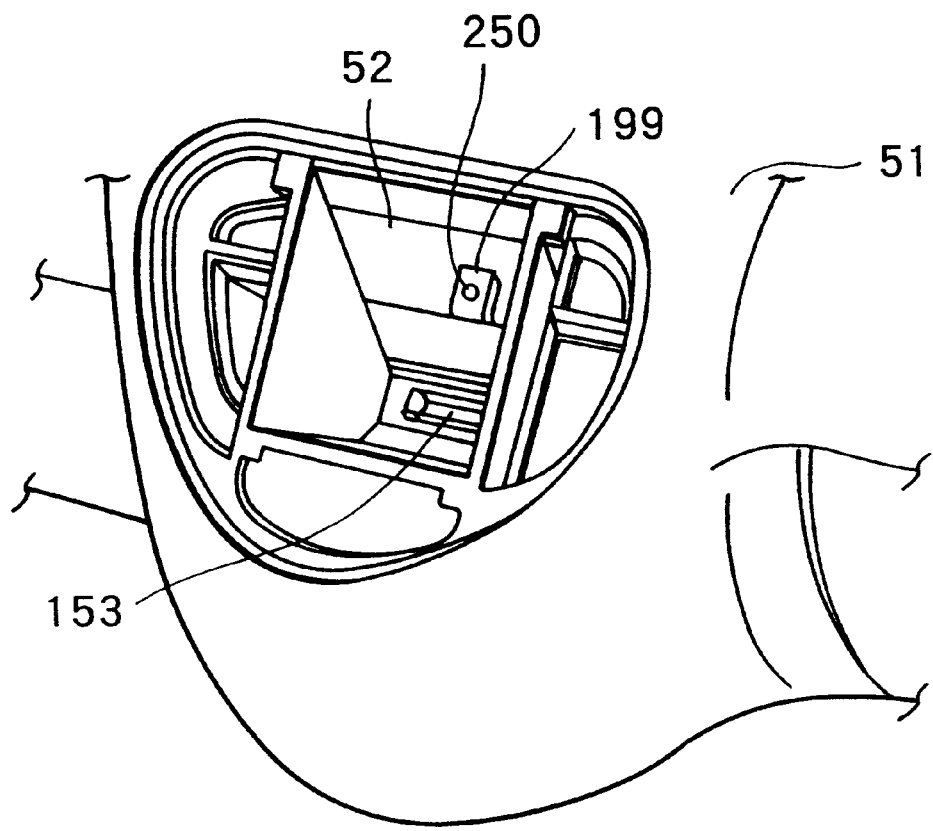
FIG. 26 is a perspective view showing the state of an opening portion in the example shown in FIG. 25.

FIGS. 25 and 26 show another example, which is substantially the same as that shown in FIG. 24, except that the connector 153 on the vehicle body side is located immediately below the steering support member 154.

Figure 27:
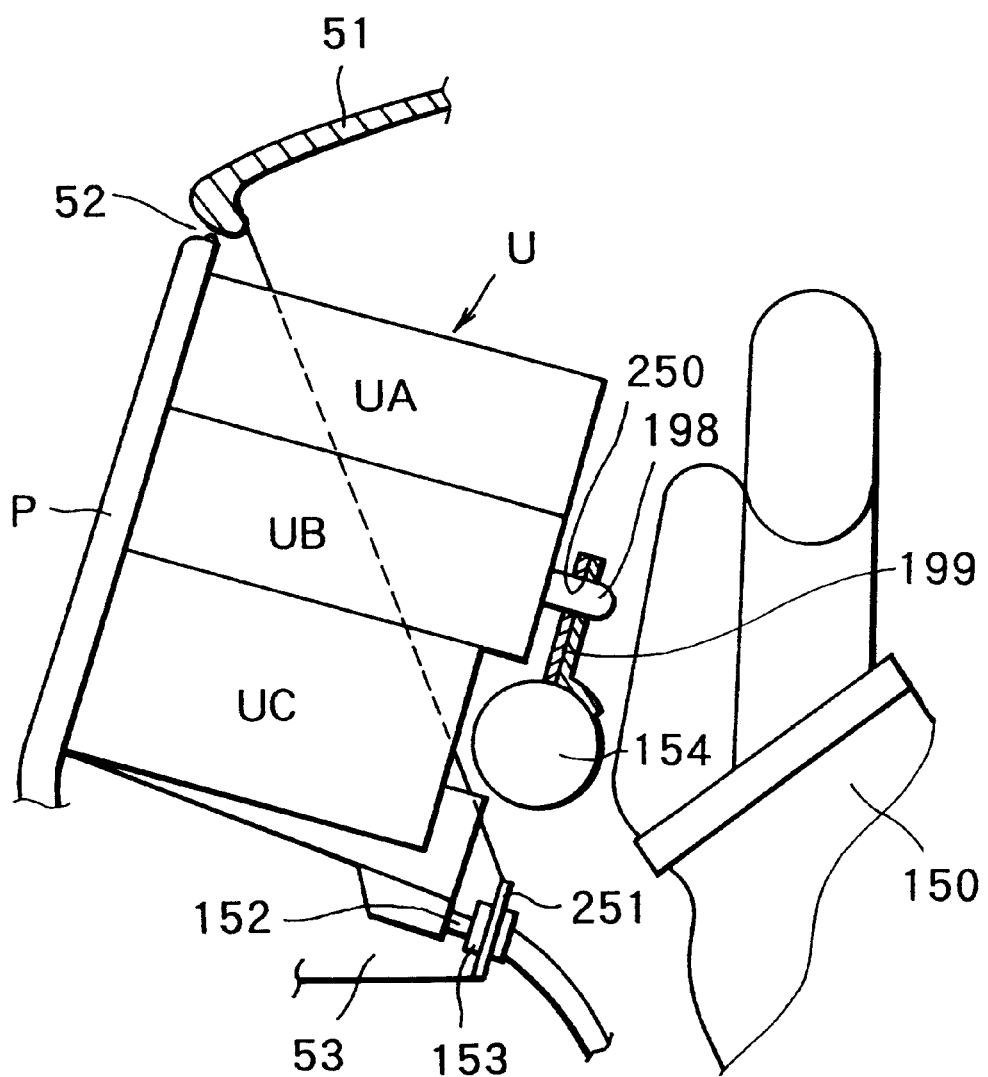
FIG. 27 is a partial side sectional view showing still another example when the assembly of the units and panel body is mounted on a vehicle.
Figure 28:
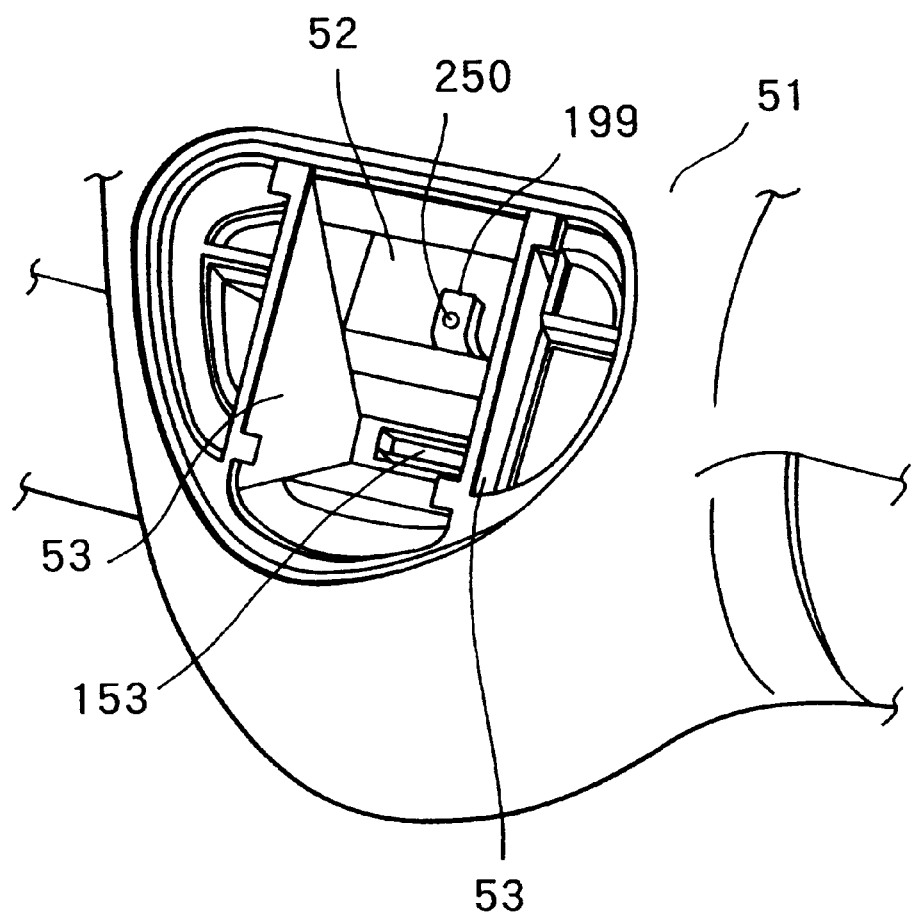
FIG. 28 is a perspective view showing the state of an opening portion in the example shown in FIG. 27.

FIGS. 27 and 28 show an example wherein the connector 153 on the vehicle body side is held by a bracket 251 arranged on the partition wall 53 at a position slightly below the steering support member 154.

Figure 29:
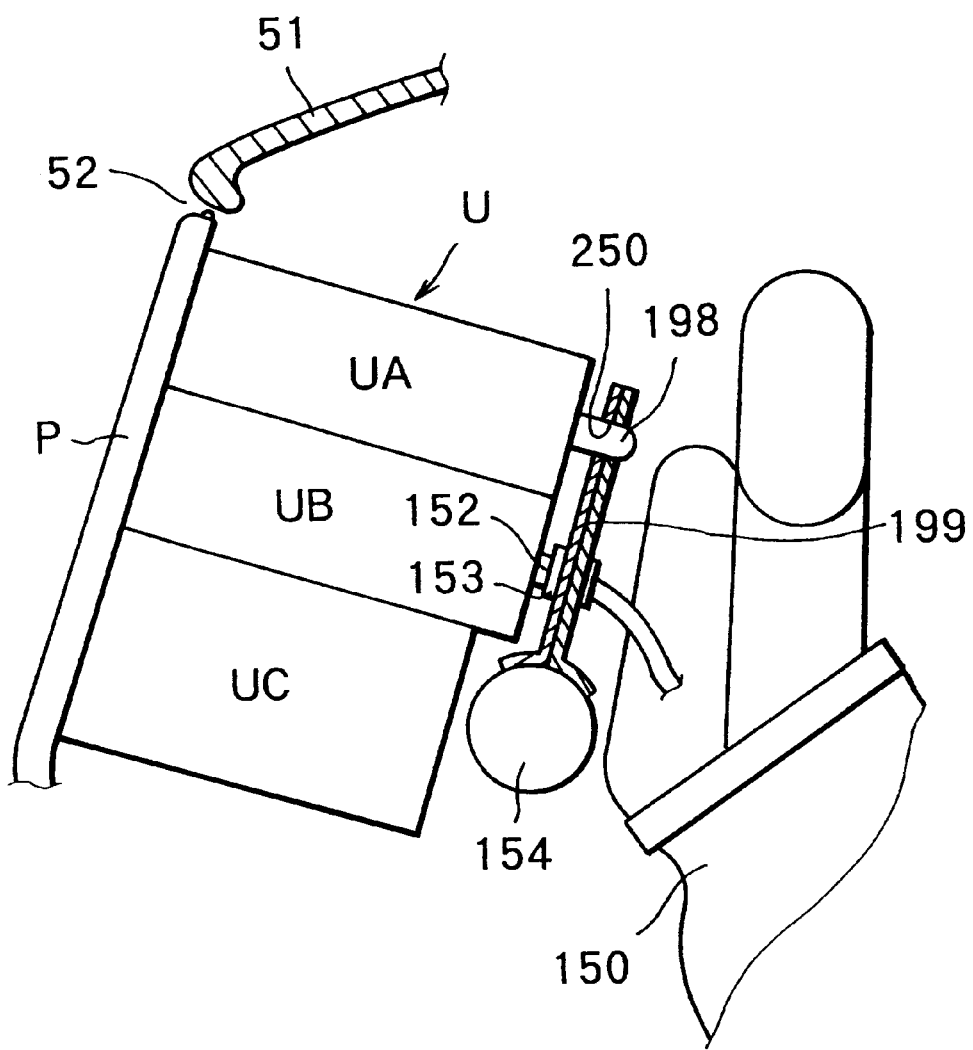
FIG. 29 is a partial side sectional view showing still another example when the assembly of the units and panel body is mounted on a vehicle.
Figure 30:
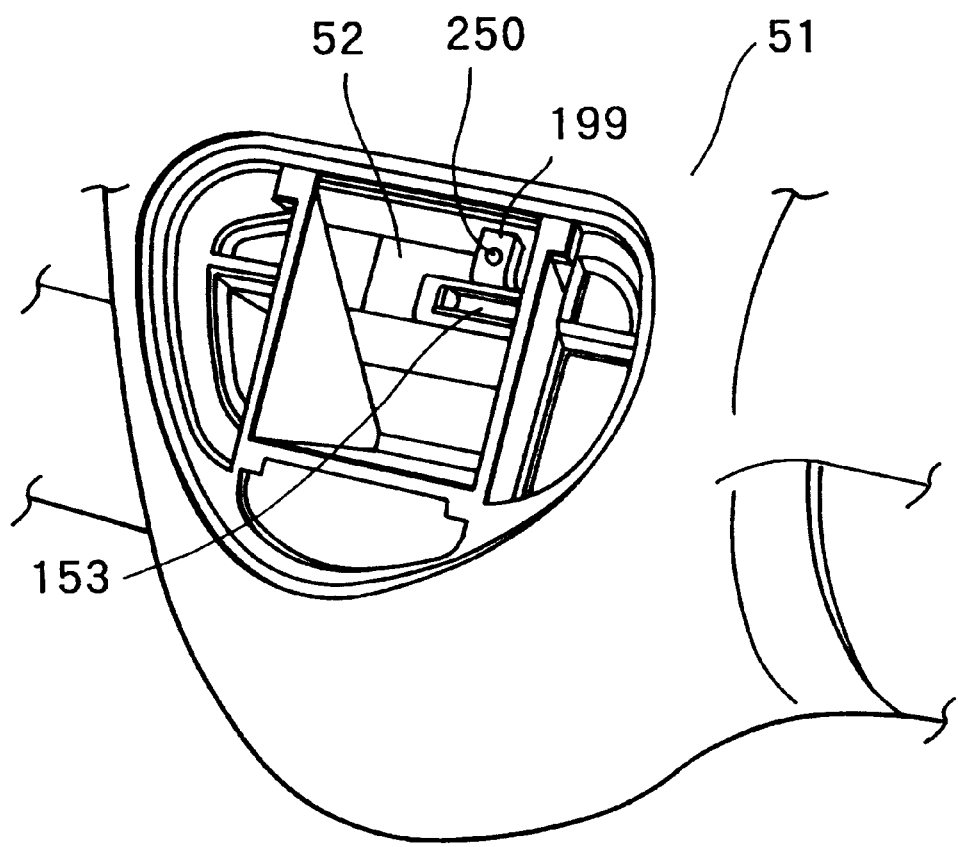
FIG. 30 is a perspective view showing the state of an opening portion in the example shown in FIG. 29.

FIGS. 29 and 30 show an example wherein the bracket 199 fixed to the steering support member 154 is prolonged upward, is formed with the fitting hole 250 at its upper position, and holds the connector 153 on the vehicle body side at its lower position. By contrast, the projection 198 is formed on the uppermost unit UA, and the connector 152 on the assembly side is arranged on the middle unit UB.

Figure 31:
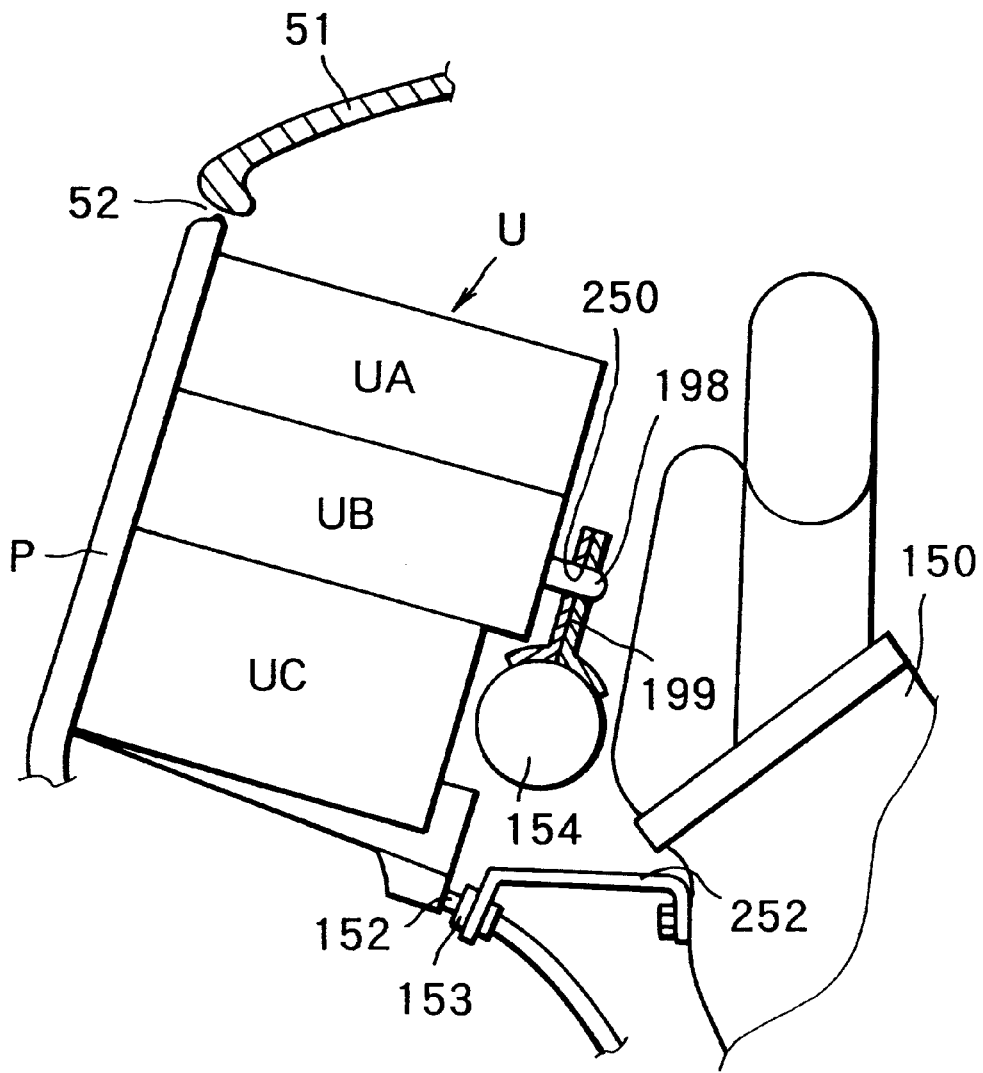
FIG. 31 is a partial side sectional view showing still another example when the assembly of the units and panel body is mounted on a vehicle.
Figure 32:
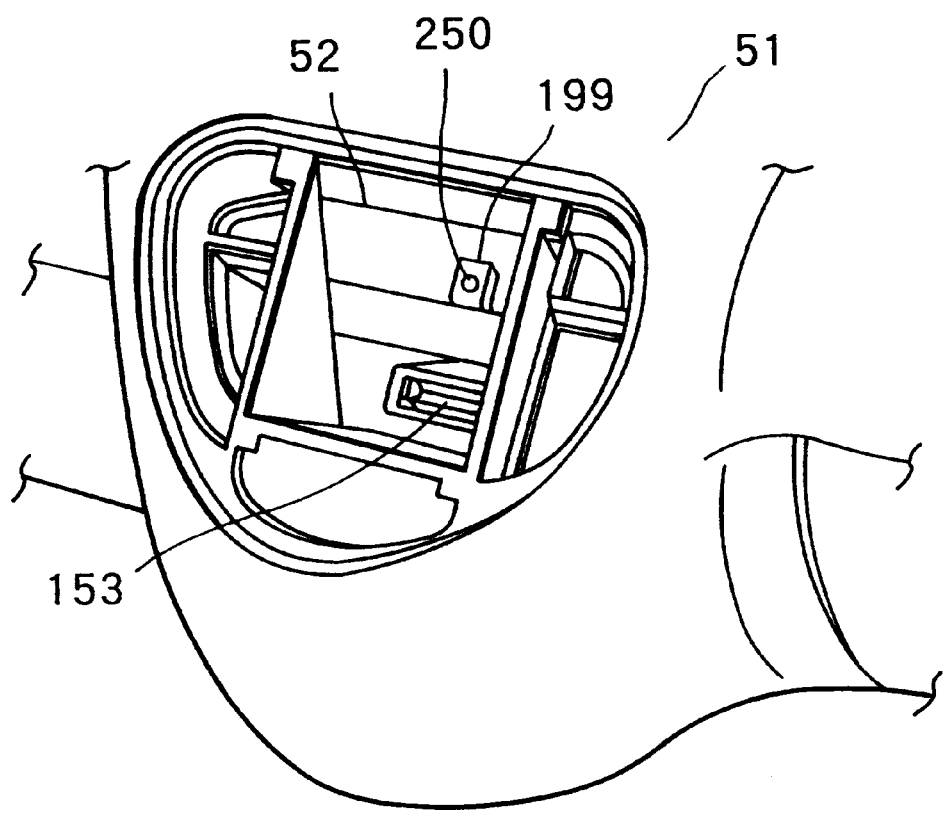
FIG. 32 is a perspective view showing the state of an opening portion in the example shown in FIG. 31.

FIGS. 31 and 32 show a case wherein the connector 153 on the vehicle body side is held by a bracket 252 fixed to the air-conditioner duct 150 at a position way below the steering support member 154.

FIG. 33 shows a case wherein the connector 153 on the vehicle body side is held by the bracket 252 fixed to the air-conditioner duct 150 as in FIGS. 30 and 31, and also opposes the position of the ashtray 59 formed on the panel body P. With this structure, the connectors 152 and 153 can be firmly coupled using a screw 254 via an opening 253 formed on the panel body P after the ashtray 59 is removed. More specifically, the screw 254 can be rotated by a rotation tool such as a screwdriver via the opening 253.

[Description of FIGS. 34 to 43]

Figure 34:
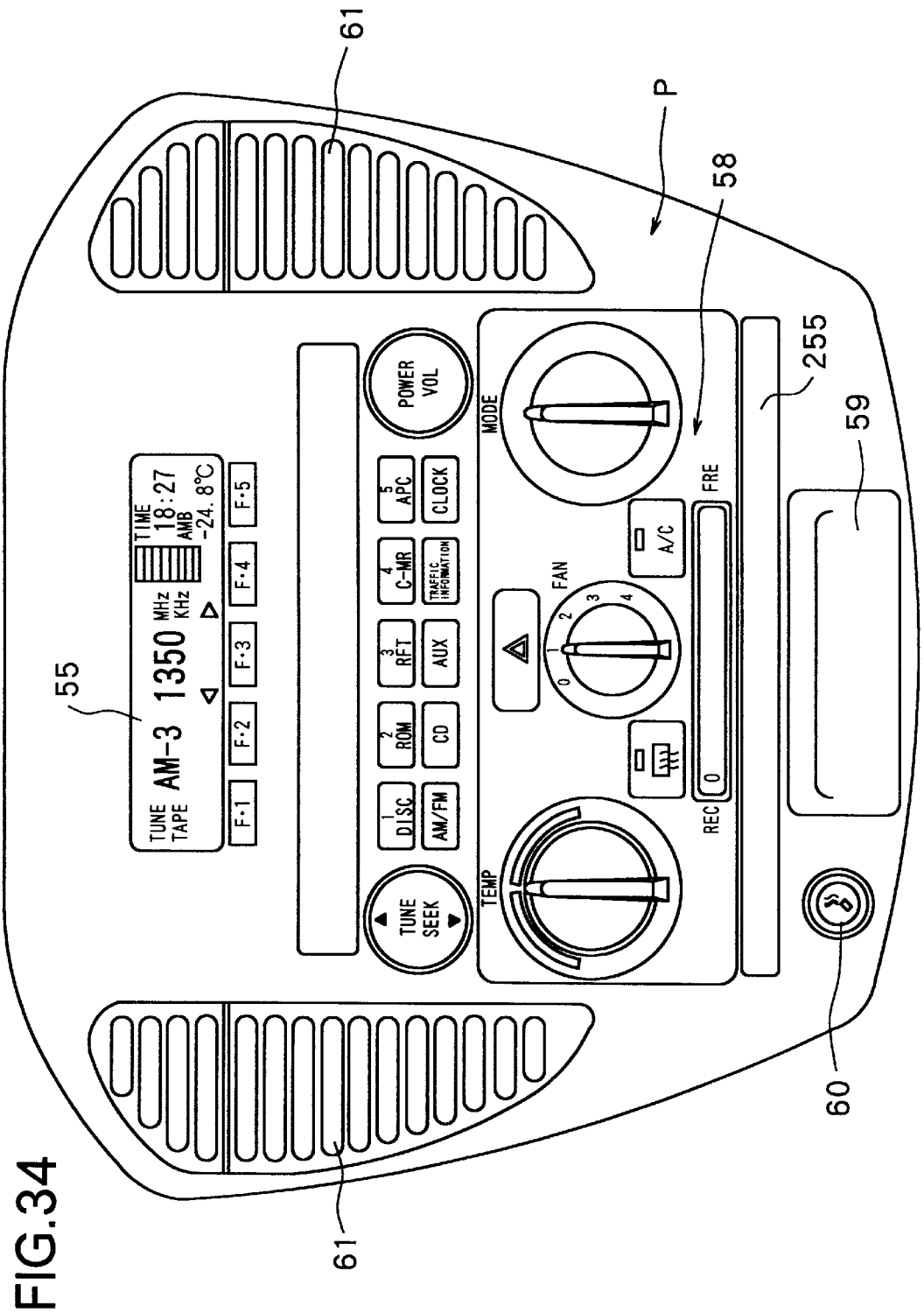
FIGS. 34 to 43 are front views showing other examples of the panel body.
Figure 35:
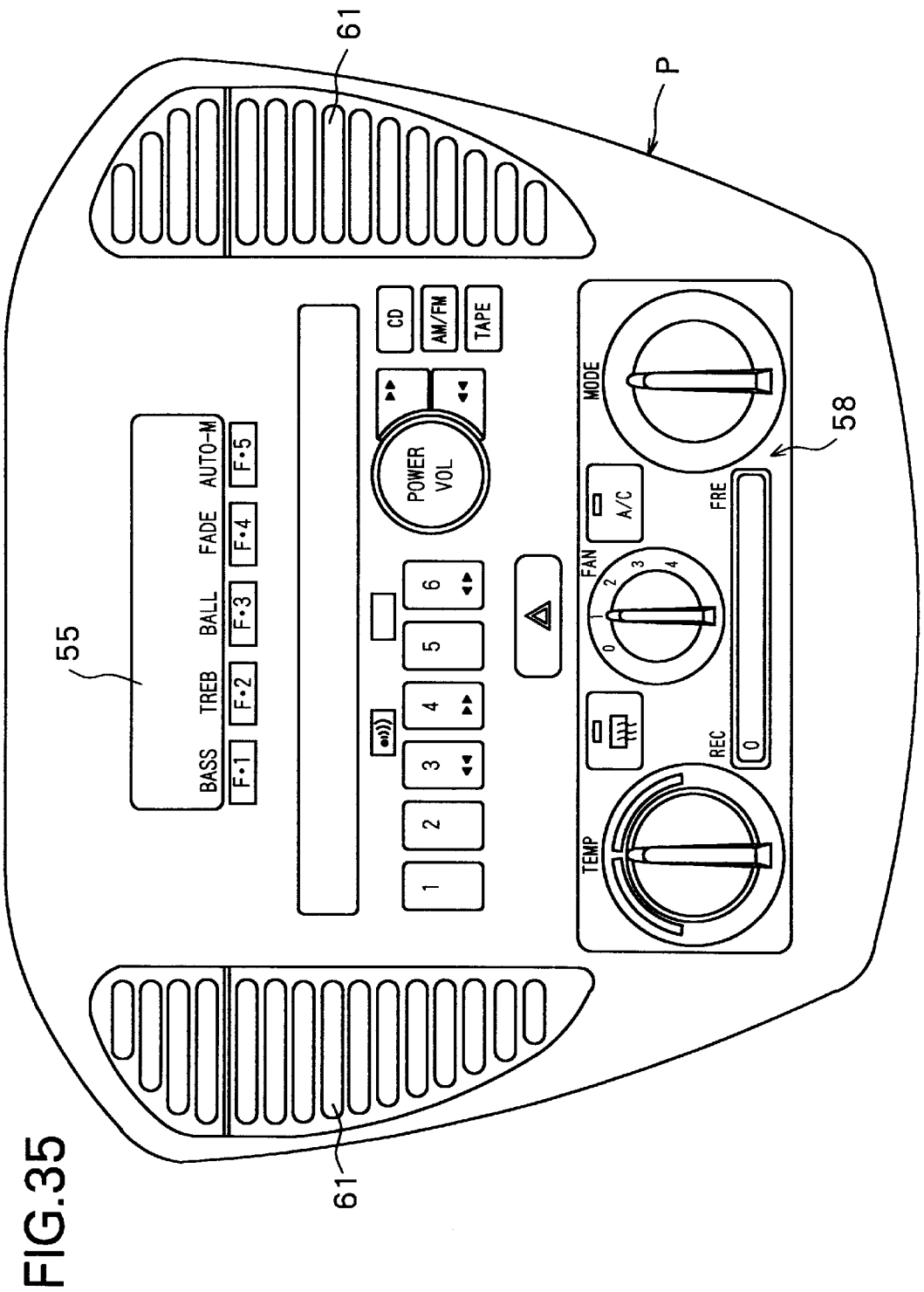
Figure 36:
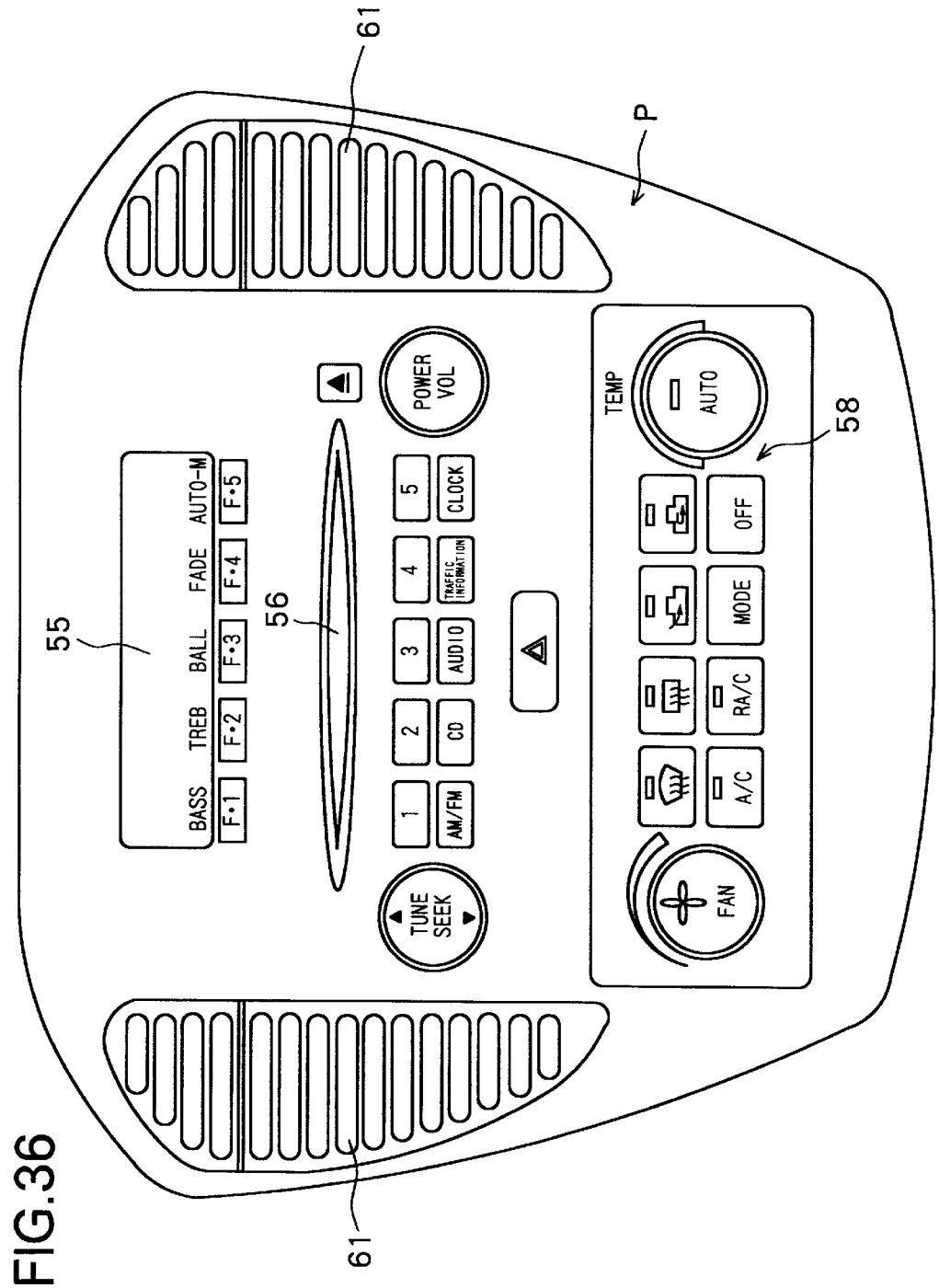
Figure 37:
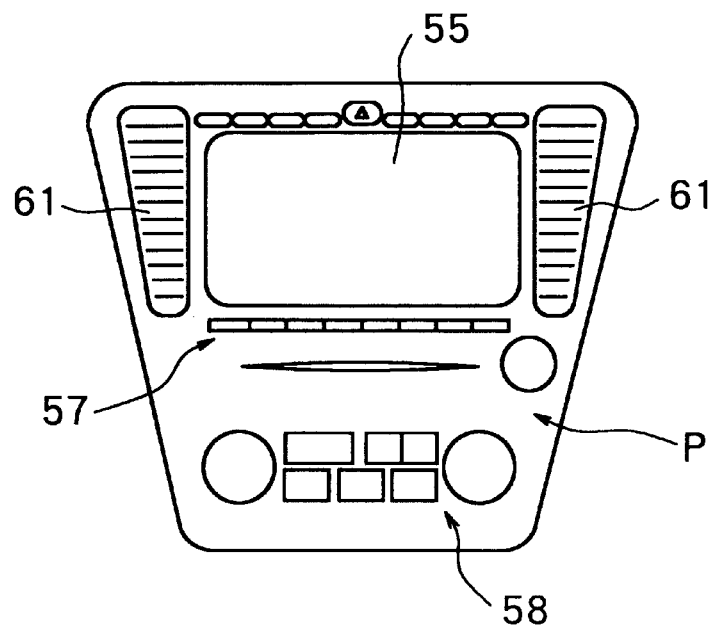
Figure 38:
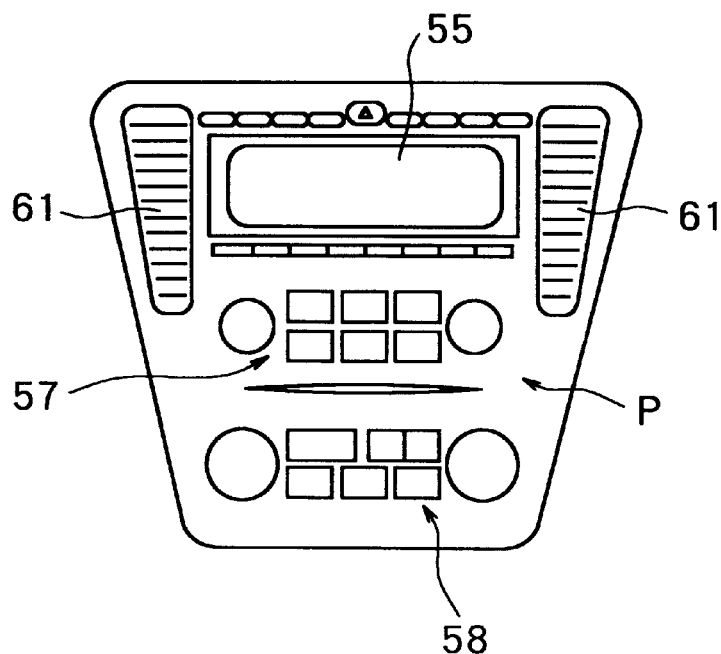
Figure 39:
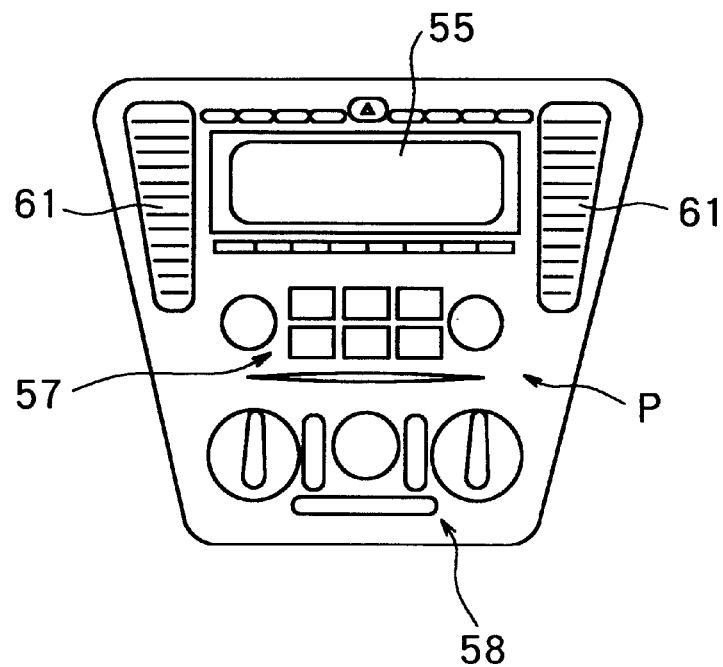
Figure 40:
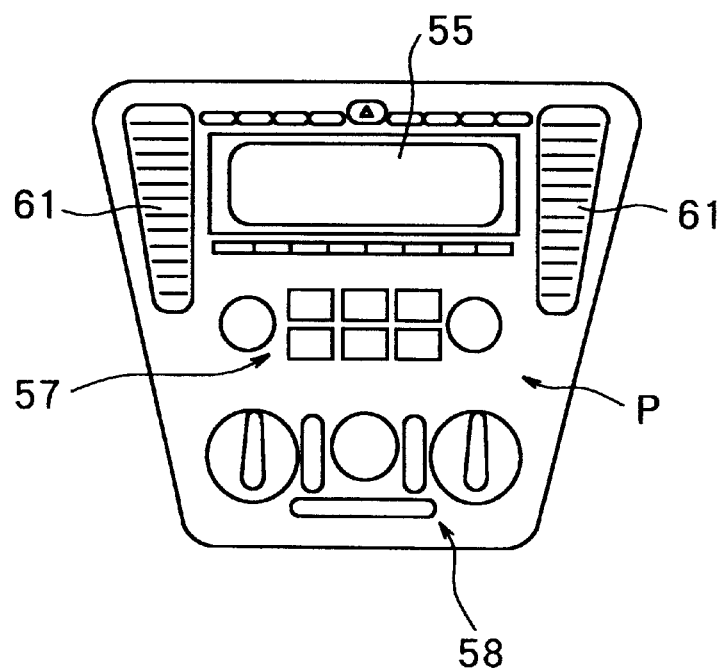
Figure 41:
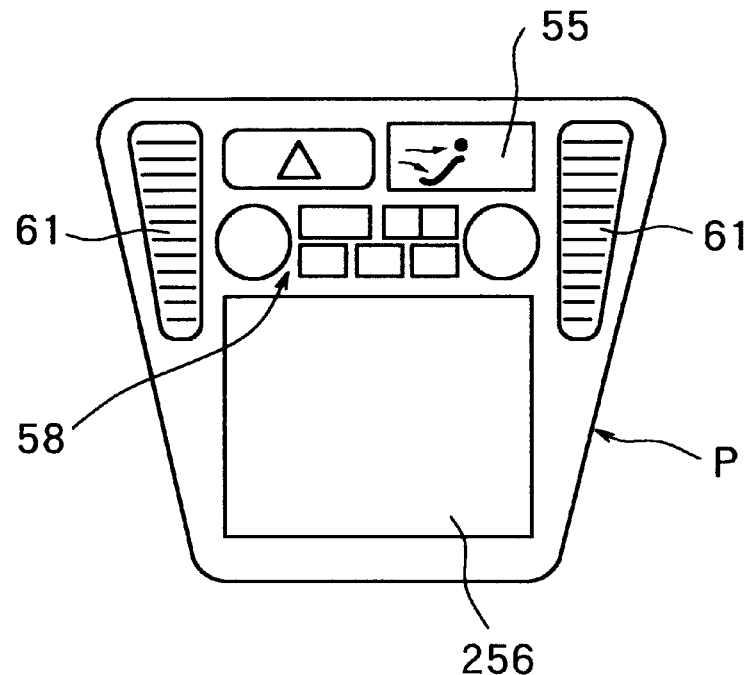
Figure 42:
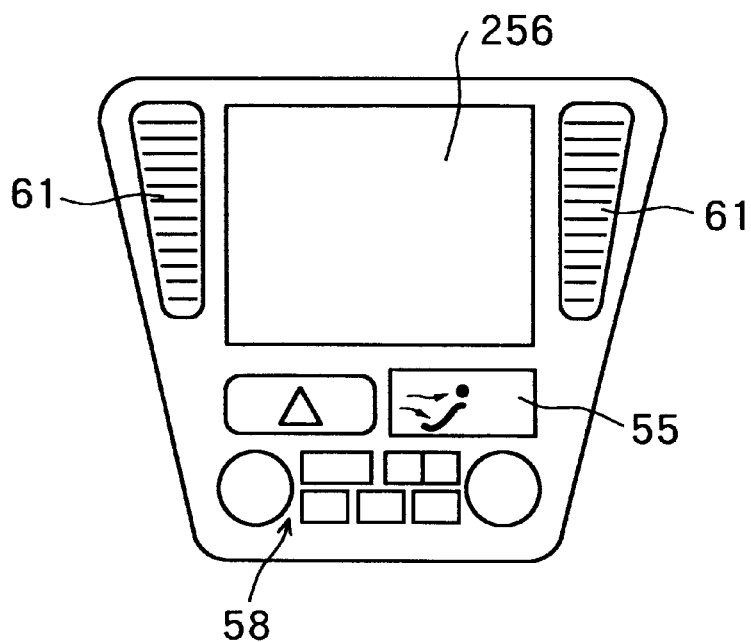
Figure 43:
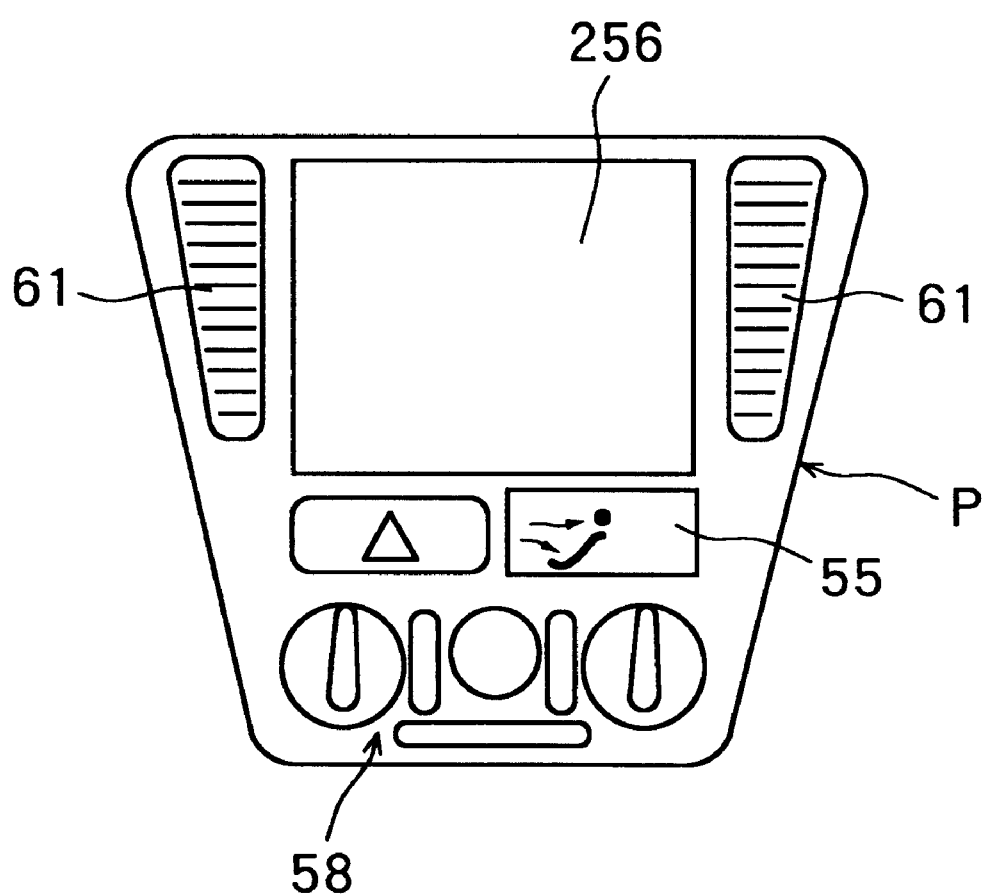

FIGS. 34 to 43 show various setting examples of the panel body P. Although these panel bodies P have designs slightly different from that described so far but have the same functions, a detailed description thereof will be omitted. In FIG. 34, however, a cup holder 255 is included, and in examples shown in FIGS. 41 to 43, an opening 256 as large as a 2-DIN space is formed on the panel body P.

Figure 44:
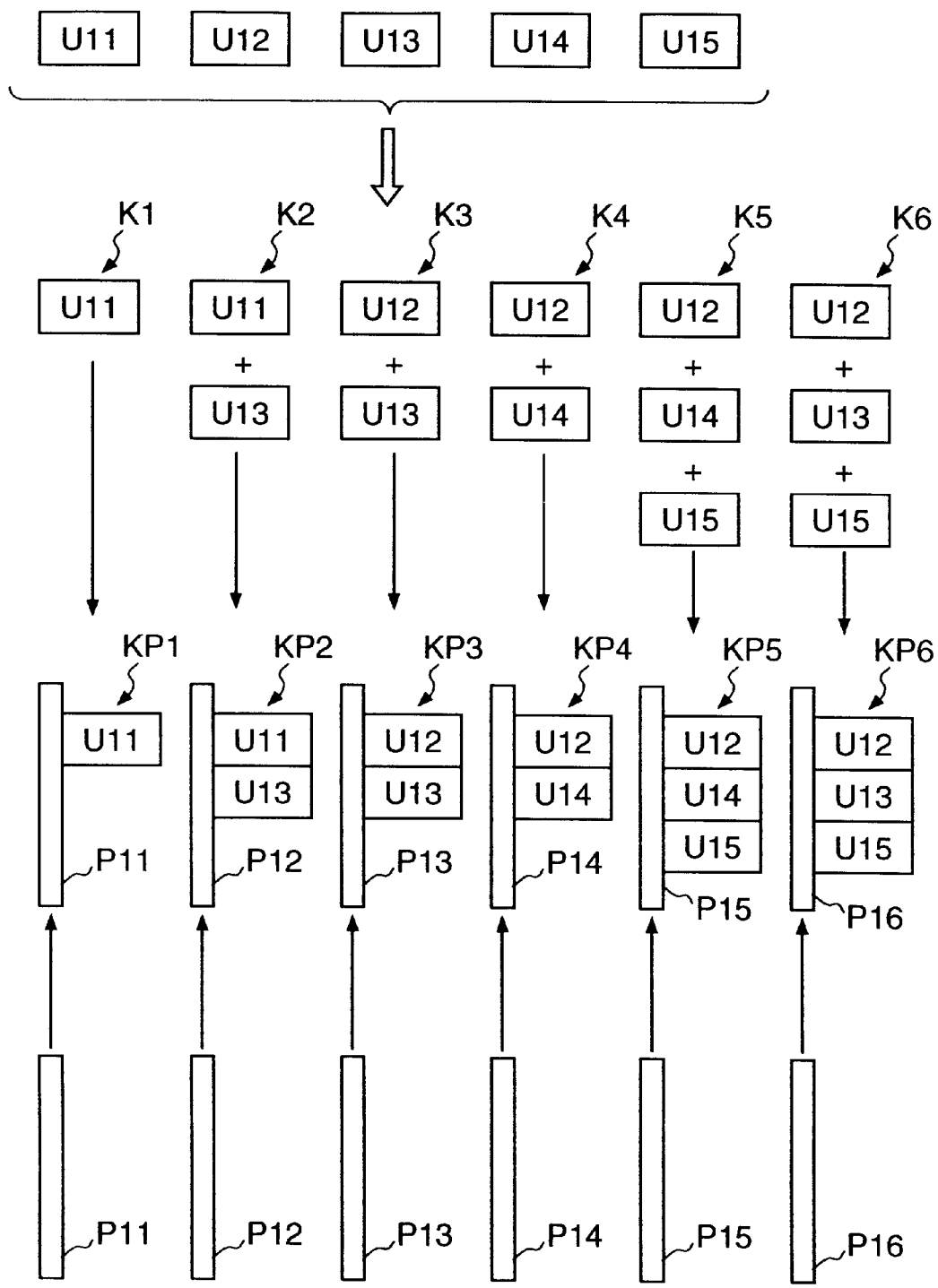
FIG. 44 is an explanatory view of processes upon obtaining required assemblies from a plurality of control units and a plurality of panel bodies.

[Description of FIG. 44]

FIG. 44 schematically shows the processes upon obtaining an assembly of the units and panel body corresponding to the grade of a vehicle from a plurality of electric device units and a plurality of panel bodies, which are prepared in advance. In FIG. 44, five different electric device units U11 to U15 are prepared. A total of six different combinations K1 to K6 of units can be selected from these units U11 to U15. A total of six different panel bodies P11 to P16 are prepared in correspondence with these combinations K1 to K6.

One of the combinations K1 to K6 of units is selected according to the grade of a vehicle. Similarly, one of the panel bodies P11 to P16 is selected according to the grade. When the selected one of the combinations K1 to K5 is coupled and connected to the selected one of the panel bodies P11 to P16, one of assemblies KP1 to KP6 is obtained, and is mounted on the vehicle.

The assemblies KP1 to KP6 can be prepared in advance. Based on the grade, the combination of units (one of K1 to K6) and the panel body (one of P11 to P16) are selected according to the grade, and the selected combination of units is coupled and connected to the selected panel body to obtain one of the assemblies KP11 to KP16.

Based on the combinations K1 to K6, the required panel body (one of P11 to P16) is selected in accordance with one of these combinations, and the assembly (one of KP11 to KP16) is obtained in correspondence with the combination of units. Based on the panel bodies P11 to P16, the combination of units (one of K1 to K5) corresponding to the panel body used is selected, thus obtaining one of the assemblies KP11 to KP16 corresponding to the panel body.

The number of combinations corresponding to the number (variety) of units may be equal to, smaller than, or larger than the number of units. The panel bodies are prepared in correspondence with the number (variety) of combinations. For example, when a high-grade panel body is commonly used for some grades, the number of panel bodies may be smaller than that of combinations (an unnecessary opening may be covered by a blank cover, or some dummy switches are used). Of course, the numbers (variety) of units, combinations, and panel bodies are not limited to those shown in FIG. 44, but may be appropriately determined. As the numbers of units and combinations increases, the advantages of the present invention is enhanced.

The embodiments of the present invention have been described. However, the present invention is not limited to such specific embodiments, and includes, e.g., the following cases. The assembly of the panel body P and units U need not always be mounted on the instrumental panel 51, but may be mounted on a proper panel member that forms the wall surface in the passenger room, e.g., a panel member that forms the side surface in the passenger room.

The units coupled and connected to the panel body P are not limited to the illustrated ones. In addition, a vehicle control unit, engine control unit, automatic transmission control unit, ABS control unit, auto-cruising control unit, steering control unit, antitheft control unit, vehicle height adjustment control unit, driver identification control unit (e.g., identification using an ID card), ON/OFF-control unit for lamps of a vehicle, and the like may be used. In this case, the control unit may be arranged at a position separated from the panel body P while at least one of its display and console is arranged on the panel body P (such control unit is not coupled to the panel body P). Especially, a control unit with a small number of operation members such as switches to be operated by the passenger is preferably not coupled to the panel body P.

The panel body P may be formed with an operation member, e.g., a lid opener or the like, which is not associated with the control units. The objectives of the present invention include not only the illustrated members but also tacitly include members described practically preferable or merits.

As described above, according to the above embodiments, since the display and console of the units are mounted on the panel body formed independently of the units, the degree of freedom in layout of the console and display can be remarkably improved, and is preferable in terms of improvement of operability and visibility.

Since the panel body is formed independently of the units, the panel body, especially, its surface facing the passenger room, is designed to be suitable for the wall surface in the vehicle body, thus improving its appearance.

Furthermore, units having different functions can be used by exchanging the panel body alone. That is, when the panel body is exchanged in correspondence with the number of units or their combination, the same effect as that obtained by a set of a plurality of units having different functions can be obtained. Various combinations of a plurality of units having different functions can be flexibly obtained, and the number of combinations can be increased without increasing cost.

The layout position of each unit is not so strictly limited since its operability and visibility need not be taken into consideration unlike the units which have their own displays and consoles, and the space inside the wall surface in the passenger room can be effectively used.

For the plurality of units are juxtaposed along the panel body, the space available can be effectively used, and signal transmission between the units and panel body can be efficiently attained.

The above embodiments are preferred to effectively use the space, and to effectively use units which are normally used in a vertically stacked state without changing their outer shapes.

Since the panel body serves as a lid member for the units, it is preferable to access the units in, e.g., maintenance using the opening portion formed on the wall surface in the passenger room.

As the panel body is arranged at substantially the central portion of the instrumental panel in the widthwise direction of the vehicle, it can be accessible from both the driver seat and front passenger seat. Hence, the units can receive information from a plurality of passengers, thus improving the function of unit control.

The panel body can be further efficiently used, and another console can be arranged by effectively using a wide-area portion of the panel body.

The above embodiments can cope with a case wherein the unit requires an information storage medium and, especially, the information storage medium is exchanged.

The above embodiments can provide a more practical setting method of the console.

The panel body can be used more efficiently, and a sensor, microphone, or receiving unit can be arranged using a wide area portion of the panel body.

A more practical display can be provided, and is suitable for visual information transmission.

Also, a more practical display can be provided, and is suitable for audible information transmission.

The panel body can be efficiently used, and a lamp ON/OFF-control, lid-open, vehicle-height adjustment, or antitheft console can be mounted by effectively using a wide-area panel body portion.

The panel body can be efficiently used, and air-conditioning outlets can be mounted by effectively using a wide-area panel body portion. Also, high-temperature air can be prevented from staying around the units that serve as heat sources, using the air-conditioning air flow.

The panel body can be efficiently used, and an ashtray can be mounted by effectively using a wide-area panel body portion.

The panel body can be efficiently used, and a cigarette lighter can be mounted by effectively using a wide-area panel body portion.

The panel body can be efficiently used, and a cup holder can be mounted by effectively using a wide-area panel body portion.

The above embodiments can cope with units that require display and many operation members.

The above embodiments are suitable for audio and air-conditioner systems which are normally mounted in recent vehicles, and have a large number of combinations due to different required functional contents depending on the grades of vehicles.

The above embodiments are suitable for assuring high visibility of an information display by setting the information display that requires high visibility at an upper position which can meet such requirement. Also, the above embodiments are also suitable for assuring high operability of operation members for an audio unit by setting the console for the audio unit that requires high operability at an upper position that can meet such requirement, since they are operated more frequently than operation members for the air conditioner.

Because the information display is commonly used by the audio unit and air-conditioner unit, the space can be effectively used, and cost can be reduced as compared to independent information displays for these units.

The above embodiments can protect the console and display from dirt from the ashtray and cup holder.

The air-conditioning air outlet positions can be set at preferred positions.

The units can be accessed while holding the panel body mounted onto the wall surface in the passenger room.

The above embodiments are suitable for performing complicated signal control in the panel body.

Since a combination of vehicle equipment components which differ depending on the type and grade of vehicle can be obtained as an assembly by selecting a panel body having a predetermined shape and a combination of a plurality of units, units having identical functions can be commonly used among different types and grades of vehicles, and a common panel body can also be used among different types and grades of vehicles since it has a predetermined shape.

As vertically low-profile box-shaped units are coupled to the panel body while they are stacked vertically, the assembly as a whole can be made compact, and these units can be stably mounted on the vehicle.

The above embodiments are suitable for performing complicated signal control in the panel body.

Since the panel body and units are coupled to each other before they are mounted on the vehicle, their mounting operations on the vehicle can be facilitated.

The units can be inserted into a panel member by effectively using an opening portion formed on the panel member that defines the wall surface in the passenger room, and the panel body can directly serve as a portion of the wall surface in the passenger room upon completion of insertion of the units.

[Description of FIGS. 45 to 51]

Figure 45:
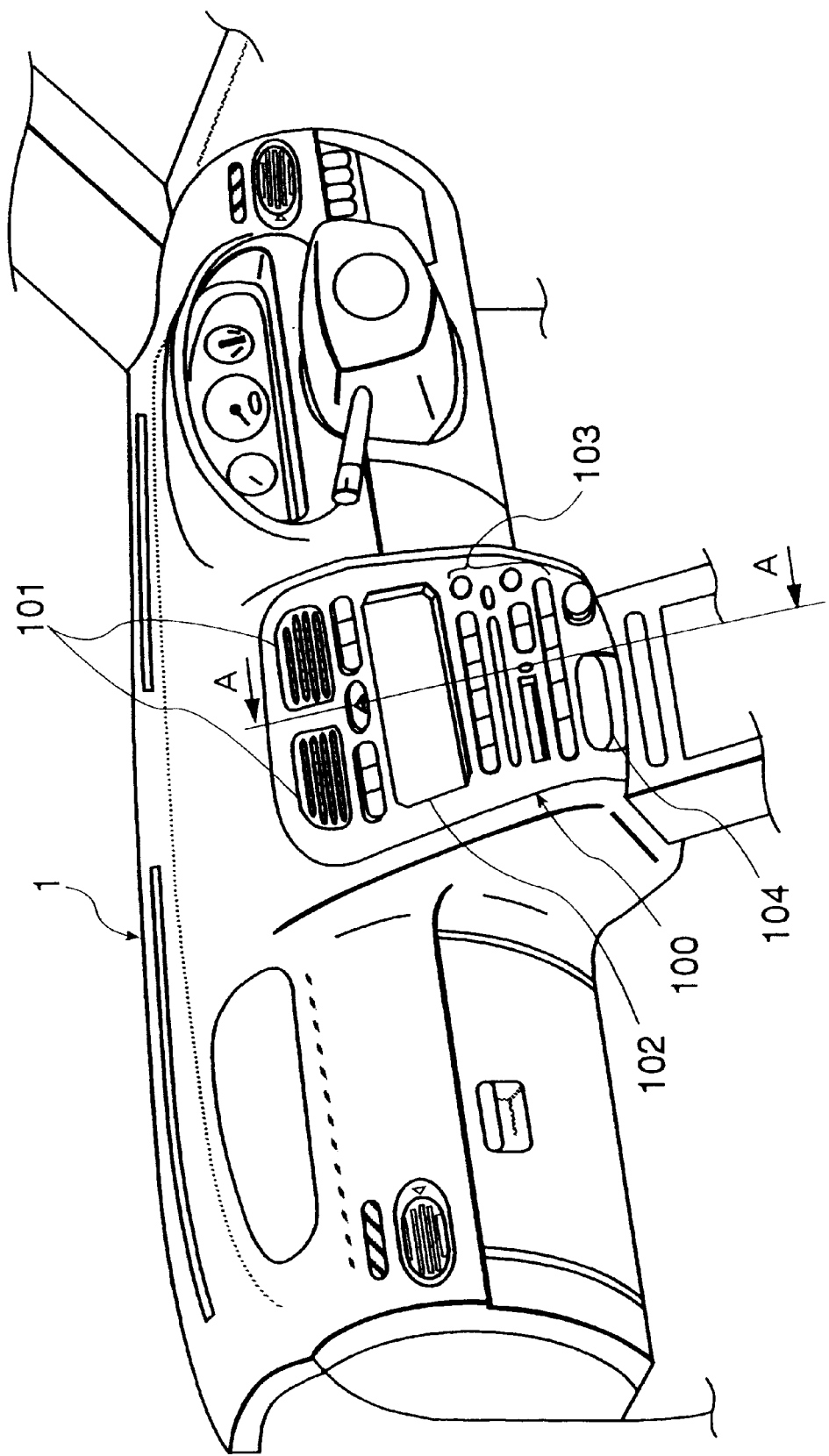
FIG. 45 is a perspective view showing the outer appearance of a center module according to the sixth embodiment of the present invention.
Figure 46:
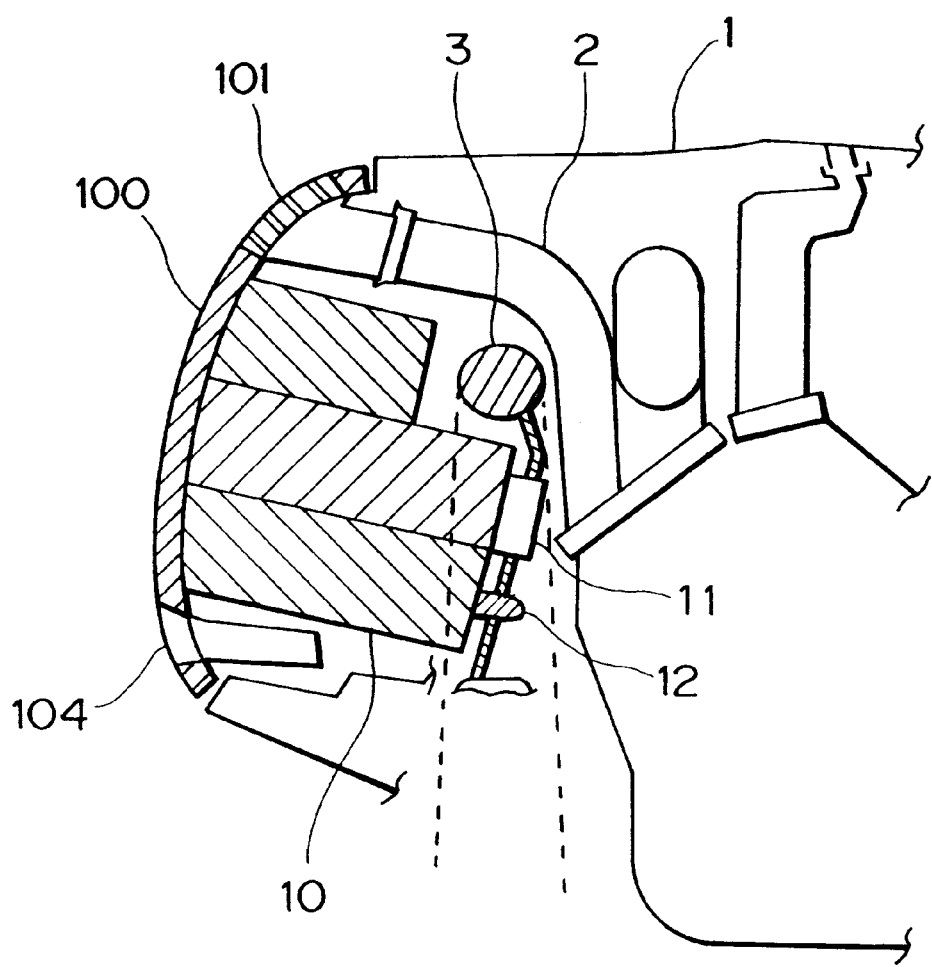
FIG. 46 is a sectional view taken along a line A—A in FIG. 45.
Figure 47:
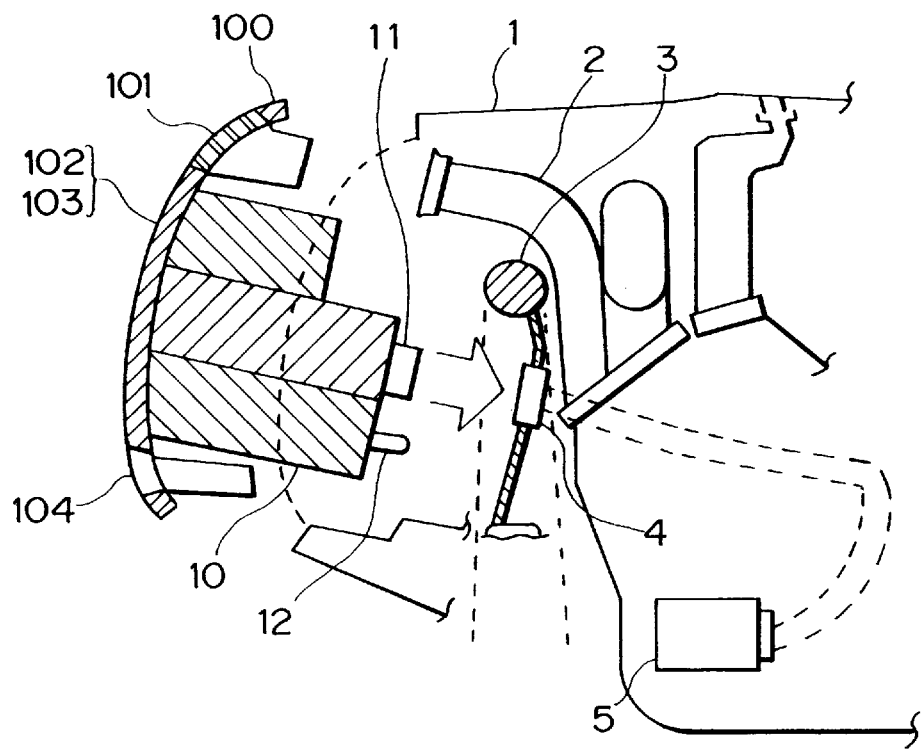
FIG. 47 is a sectional view showing the case wherein the center module shown in FIG. 45 is attached in the passenger room.
Figure 48:
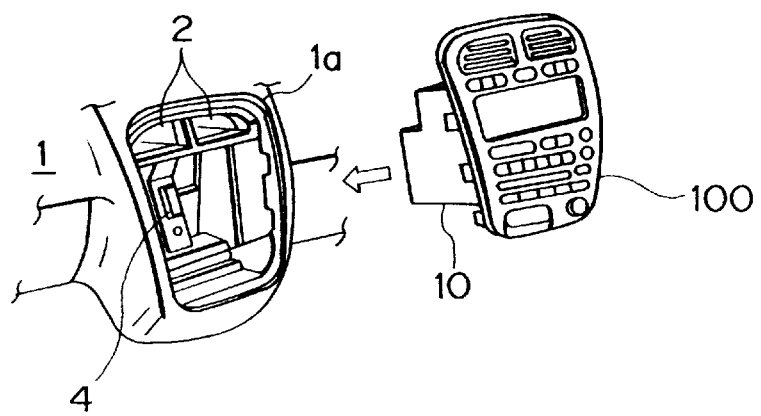
FIG. 48 is a perspective view showing the case wherein the center module shown in FIG. 45 is attached in the passenger room.

FIG. 45 is a perspective view showing the outer appearance of a center module according to the sixth embodiment of the present invention. FIG. 46 is a sectional view taken along a line A—A in FIG. 45, and FIG. 47 is a sectional view when the center module shown in FIG. 45 is attached in the passenger room. FIG. 48 is a perspective view upon attaching the center module shown in FIG. 45 in the passenger room.

As shown in FIG. 45, a center module 100 of the sixth embodiment is arranged on the upper portion of a center console which is located near the center of a dashboard 1 between the driver seat and front passenger seat, as a conventional location of an audio system and the like.

The center module 100 has air outlets 101 for a car air conditioner, a display 102 comprising, e.g., an LCD panel, a switch control panel 103 including various switches, an ashtray 104, and the like on a module main body formed into a vertically elongated rectangular shape.

As shown in FIG. 46, the air outlets 101 of the center module 100 are connected to an air-conditioning duct 2 arranged inside the dashboard. A compound equipment 10 including an audio equipment, car navigation apparatus, and the like as an integral unit is mechanically and electrically connected to the back surface of the center module 100. The compound equipment 10 will be explained in detail later. A connector 11 and fixing pin 12 are disposed on the back surface of the compound equipment 10. As shown in FIG. 47, the connector 11 on the module side is connected to a plug-in connector 4 that accommodates a wire harness connected to an air conditioner apparatus 5 and the like, and a multiplex communication LAN harness. The fixing pin 12 is fixed to a stay mounted on a reinforcement member 3 which supports the dashboard 1 and extends in the widthwise direction of the vehicle using a bolt, nut, and the like.

As shown in FIG. 48, the center module 100 and the compound equipment are attached to a central opening portion 1a formed on the dashboard 1.

[Type of Center Module]

The types of center module of the sixth embodiment will be explained below.

The center module 100 of the sixth embodiment can change its functions and equipment in correspondence with the grade, interior design, and the like of a vehicle that mounts the center module.

Figure 49:
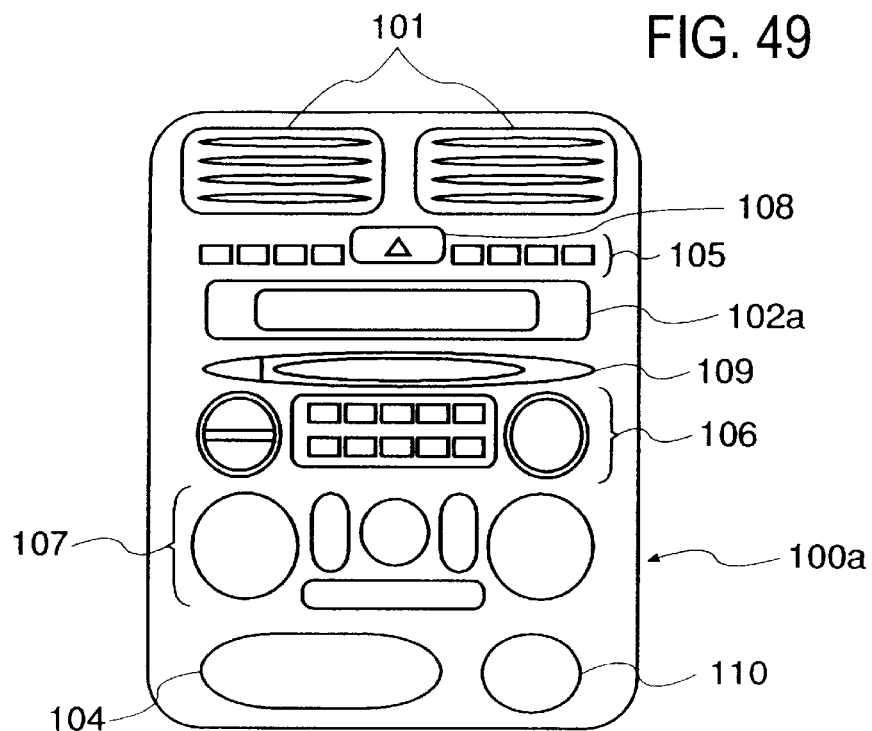
FIG. 49 is a front view of a center module having a minimum number of functions.
Figure 50:
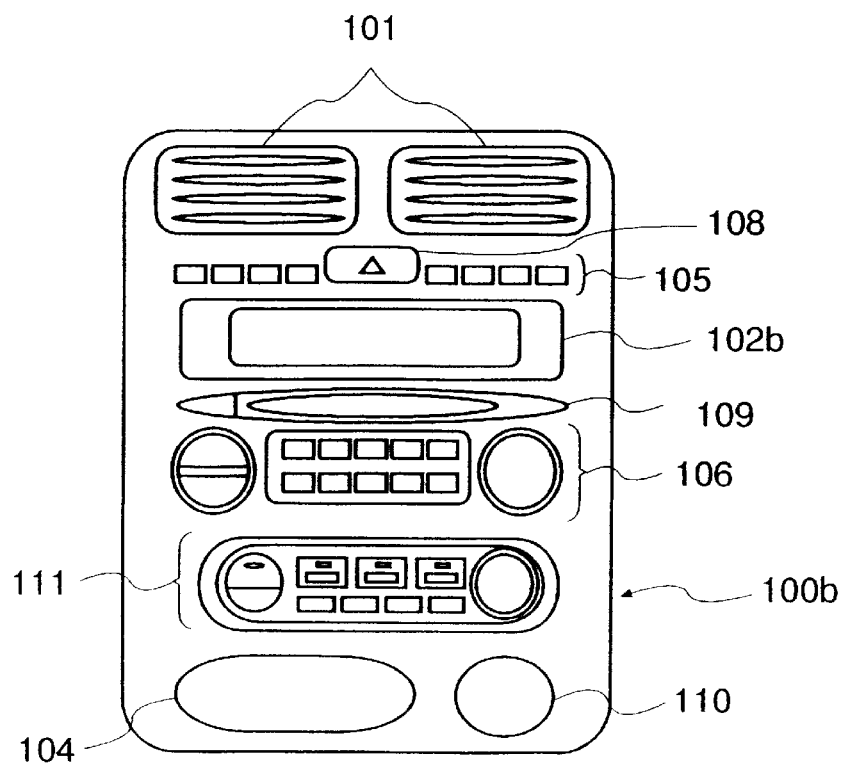
FIG. 50 is a front view of a center module having an intermediate number of functions.
Figure 51:
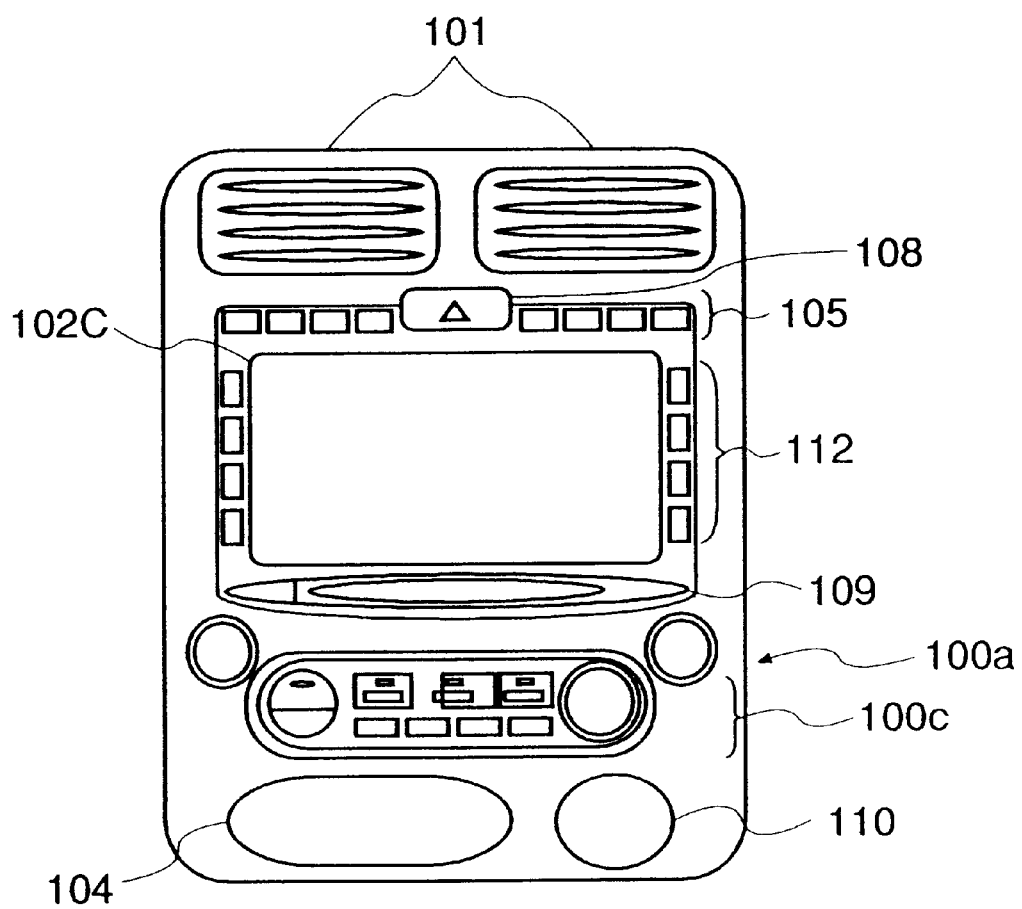
FIG. 51 is a front view of a center module having a maximum number of functions.

FIG. 49 is a front view of a center module having a minimum number of functions. FIG. 50 is a front view of a center module having an intermediate number of functions. FIG. 51 is a front view of a center module having a maximum number of functions.

<Type >

As shown in FIG. 49, a center module 100a of Type mainly has an audio equipment as the compound equipment 10, and also has a display 102a having a 1-DIN (German Institute for Standardization) size. The display 102a comprises a monochrome dot-matrix display or segment display. A hazard lamp switch 108 and function keys 105 are arranged between the air outlets 101 and the display 102a. These function keys 105 are mainly used as selection buttons for audio mode and time displays.

A CD tray cover 109 is set below the display 102a. The CD tray cover 109 is located at the position of a CD player in the compound equipment 10, and is opened/closed in accordance with open/close of a CD tray of the CD player. Audio operation buttons 106 are underneath the CD tray cover 109. These audio operation buttons 106 include a tuning button, volume control button, and the like for a radio receiver. Air-conditioner operation buttons 107 are beneath the audio operation buttons 106. These air-conditioner operation buttons 107 include a temperature control button, air outlet control button, and the like of an air-conditioner apparatus.

A cigarette lighter 110 is arranged at the neighboring position of an ashtray 104.

<Type >

As shown in FIG. 50, a center module 100b has an audio apparatus and DIS (DRIVE INFORMATION SYSTEM) apparatus as the compound equipment 10, and also has a display 102b having a 1-DIN size. The display 102b comprises a color dot-matrix display. The function keys are mainly used as selection buttons for audio mode, time, FM multiplex, and DIS displays. The DIS apparatus calculates the average mileage of a vehicle, the time the vehicle has traveled, and the like, and informs the passenger of these calculation results. Air-conditioner operation buttons 111 include an auto/manual selection button in addition to the temperature control button and air outlet control button for the air-conditioner apparatus.

As for other arrangements, the same reference numerals denote the same parts as in Type shown in FIG. 49, and a detailed description thereof will be omitted.

<Type >

As shown in FIG. 51, a center module 100c has an audio apparatus, DIS apparatus, and car navigation apparatus as the compound equipment 10, and also has a 7" wide display 102c. The display 102c comprises a color dot-matrix display. Operation buttons 112 for the car navigation apparatus are distributed on the two sides of the display 102c.

As for other arrangements, the same reference numerals denote the same parts as in Type shown in FIG. 50, and a detailed description thereof will be omitted.

[Description of FIGS. 52 to 55]

Figure 52:
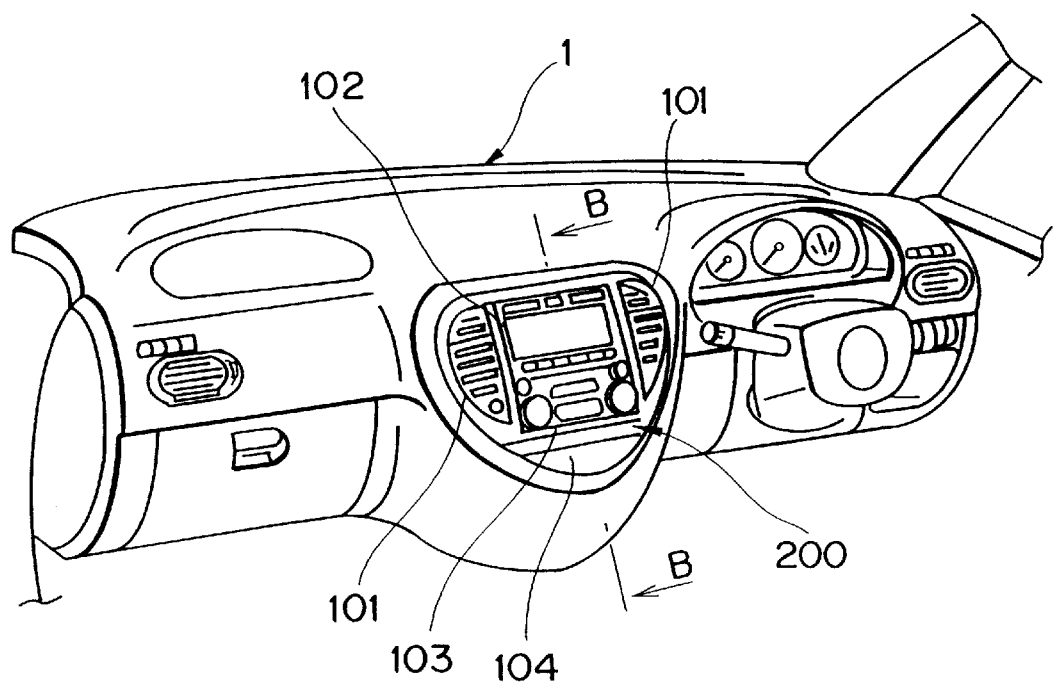
FIG. 52 is a perspective view showing the outer appearance of a center module according to the seventh embodiment of the present invention.
Figure 53:
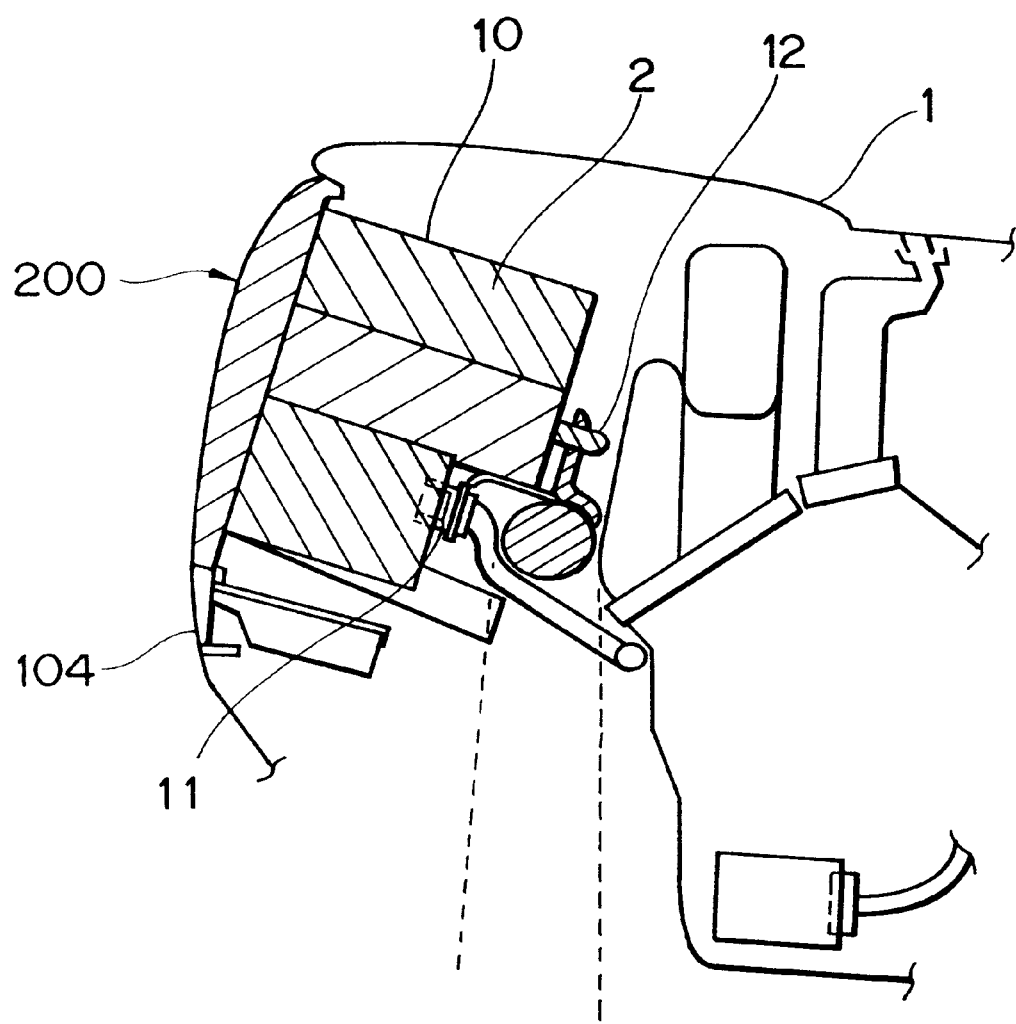
FIG. 53 is a sectional view taken along a line A—A in FIG. 52.
Figure 54:
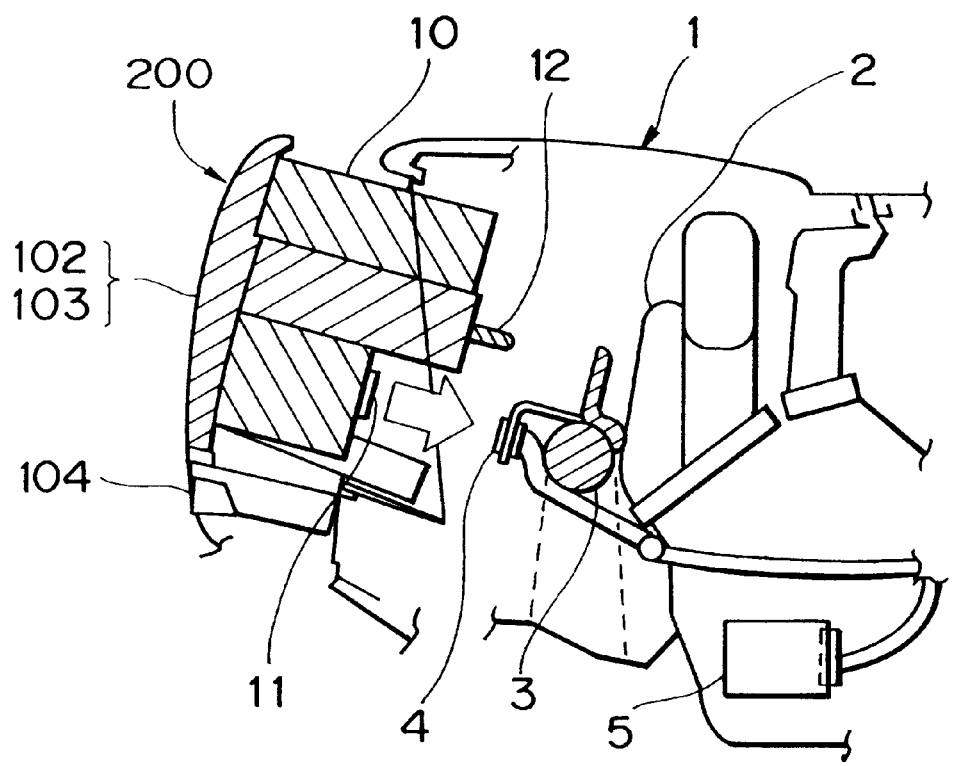
FIG. 54 is a perspective view showing the case wherein the center module shown in FIG. 52 is attached in the passenger room.
Figure 55:
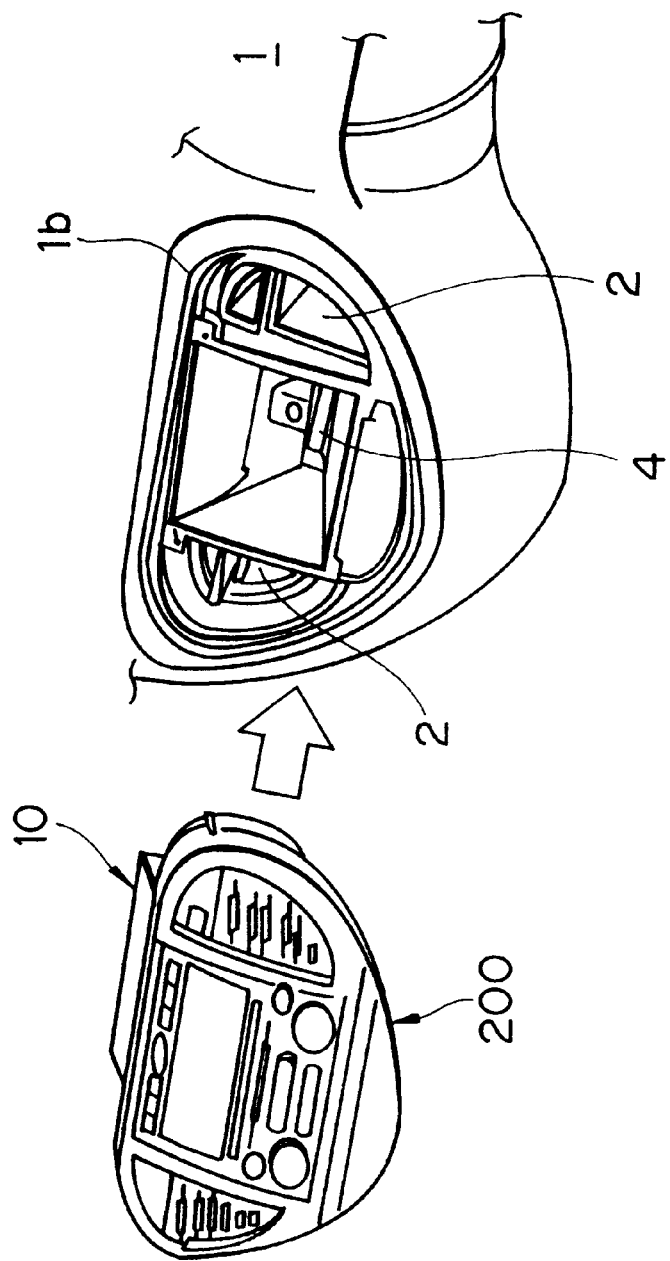
FIG. 55 is a perspective view showing the case wherein the center module shown in FIG. 52 is attached in the passenger room.

FIG. 52 is a perspective view showing the outer appearance of a center module according to the seventh embodiment of the present invention. FIG. 53 is a sectional view taken along a line A—A in FIG. 52. FIG. 54 is a sectional view when the center module shown in FIG. 52 is attached in the passenger room. FIG. 55 is a perspective view when the center module shown in FIG. 52 is attached in the passenger room.

As shown in FIG. 52, a center module 200 of the seventh embodiment is arranged on the upper portion of a center console which is located near the center of a dashboard 1 between the driver seat and front passenger seat, as a conventional location of an audio system and the like.

The center module 200 has air outlets 101 for a car air conditioner, a display 102 comprising an LCD panel or the like, a switch control panel 103 including various switches, an ashtray 104, and the like on an inverted triangular module main body.

As shown in FIG. 53, the air outlets 101 of the center module 200 are connected to an air-conditioning duct 2 inside the dashboard. A compound equipment 10 including an audio equipment, car navigation apparatus, and the like as an integral unit is mechanically and electrically connected to the back surface of the center module 200. The compound equipment 10 will be explained in detail later. A connector 11 and fixing pin 12 are mounted on the back surface of the compound equipment 10. As shown in FIG. 54, the connector 11 on the module side is connected to a plug-in connector 4 that accommodates a wire harness connected to an air conditioner apparatus 5 and the like, and a multiplex communication LAN harness.

As shown in FIG. 55, the center module and compound equipment 10 are attached to a central opening portion 1b formed on the dashboard 1.

[Type of Center Module]

The types of center module of the seventh embodiment will be explained below. The center module 200 of the seventh embodiment can change its functions and equipment in correspondence with the grade, interior design, and the like of a vehicle that mounts the center module.

Figure 56:
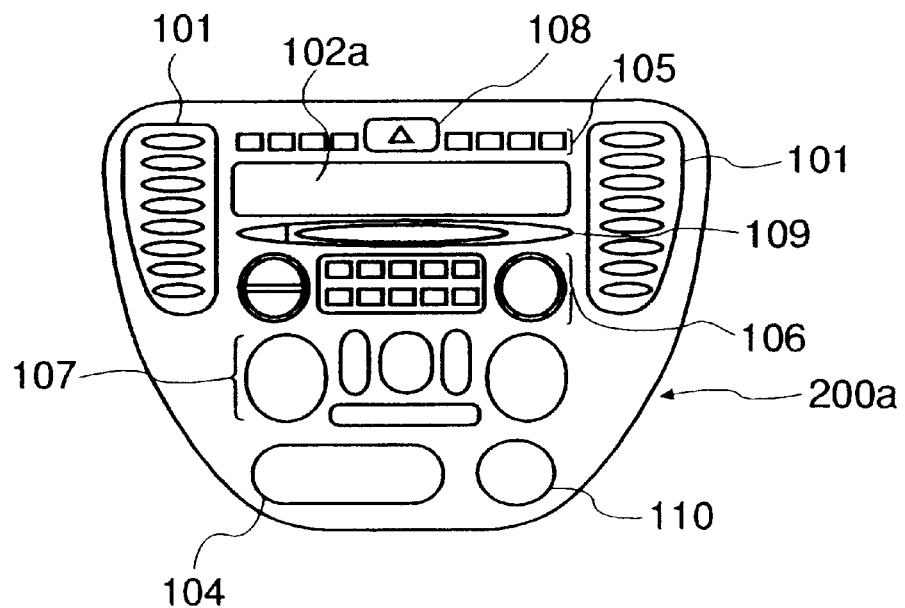
FIG. 56 is a front view of a center module having a minimum number of functions.
Figure 57:
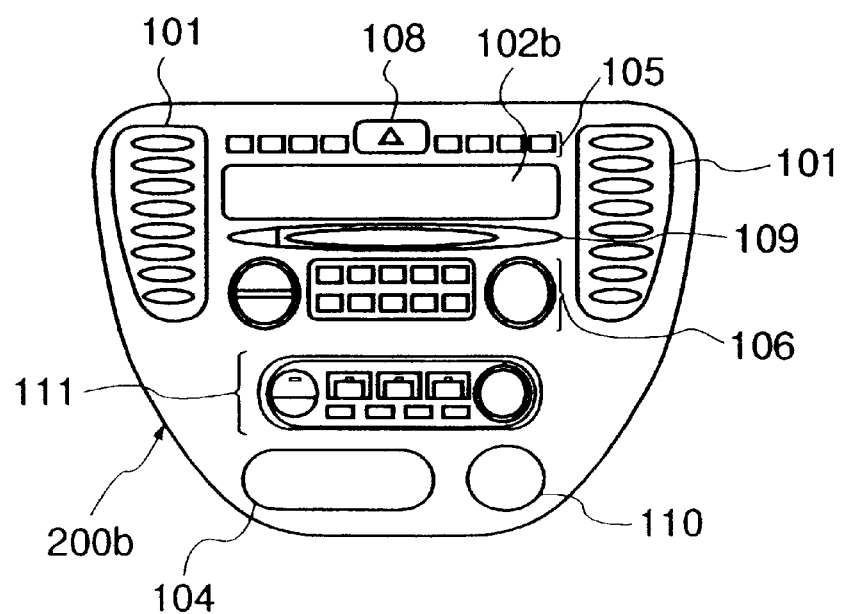
FIG. 57 is a front view of a center module having an intermediate number of functions.
Figure 58:
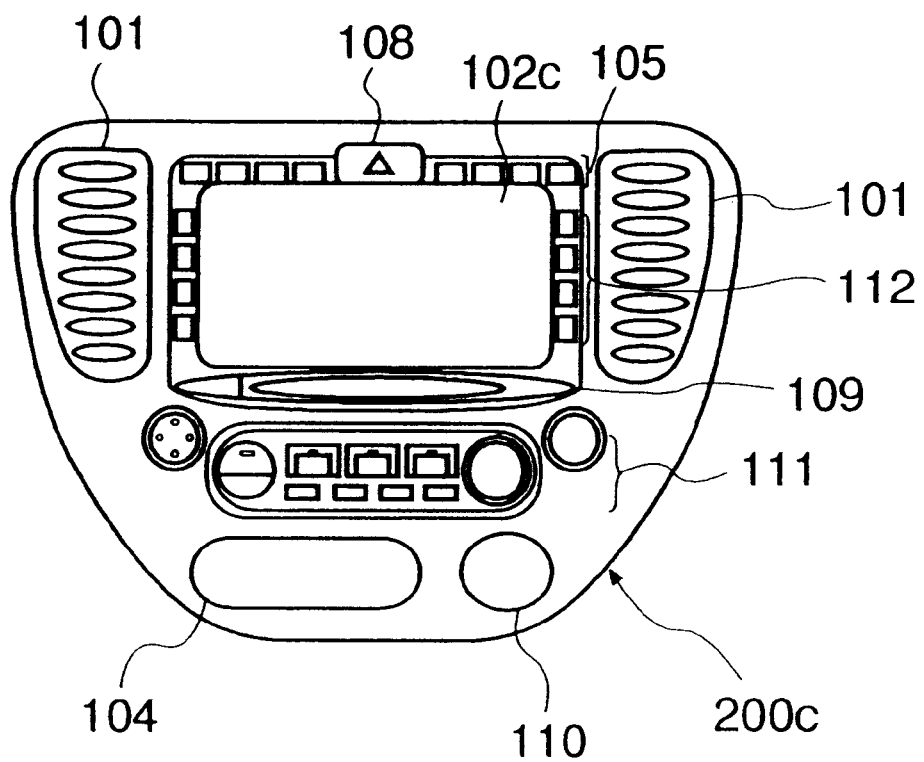
FIG. 58 is a front view of a center module having a maximum number of functions.

FIG. 56 is a front view of a center module having a minimum number of functions. FIG. 57 is a front view of a center module having an intermediate number of functions. FIG. 58 is a front view of a center module having a maximum number of functions.

<Type >

As shown in FIG. 56, a center module 200a of Type has substantially the same functions as those of the center module 100a of Type, except for the positions of the air outlets 101. As for other arrangements, the same reference numerals denote the same parts as those in Type shown in FIG. 49, and a detailed description thereof will be omitted.

<Type >

As shown in FIG. 57, a center module 200b has substantially the same functions as those of the center module 100b of Type, except for the positions of the air outlets 101. As for other arrangements, the same reference numerals denote the same parts as those in Type shown in FIG. 50, and a detailed description thereof will be omitted.

<Type >

As shown in FIG. 58, a center module 200c has substantially the same functions as those of the center module 100c of Type, except for the positions of the air outlets 101. As for other arrangements, the same reference numerals denote the same parts as those in Type shown in FIG. 51, and a detailed description thereof will be omitted.

[Display Example on Display]

Display examples of the displays 102a to 102c mounted on the center modules of Types to or Types to will be explained below.

Figure 59:
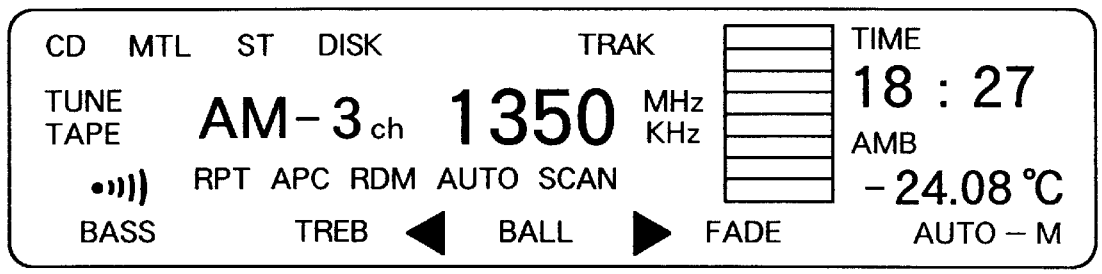
FIGS. 59 to 61 show display examples of a display.

FIG. 59 shows a display example on the display 102a. FIGS. 60A to 60D show a display example on the display 102b. FIG. 61 shows a display example on the display 102c.

As shown in FIG. 59, the display 102a displays the tuned channel of the audio unit, time, temperature, and the like.

Figure 60A:
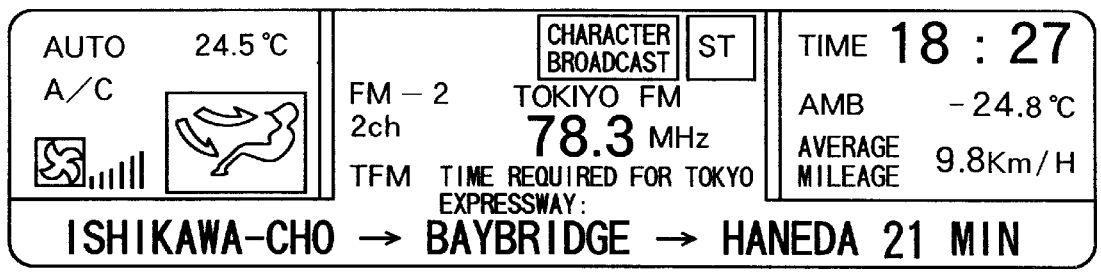
Figure 60B:
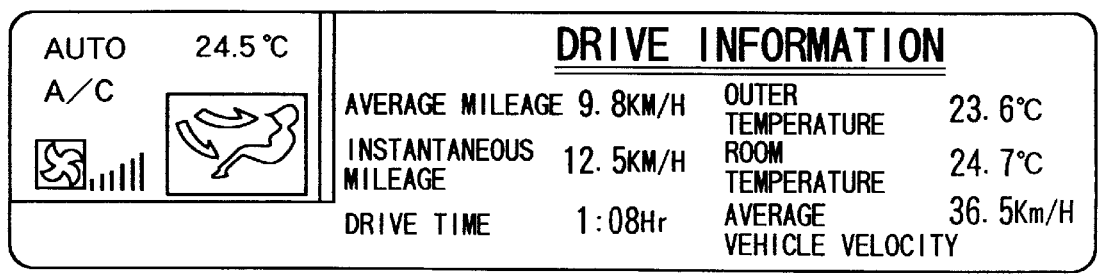
Figure 60C:
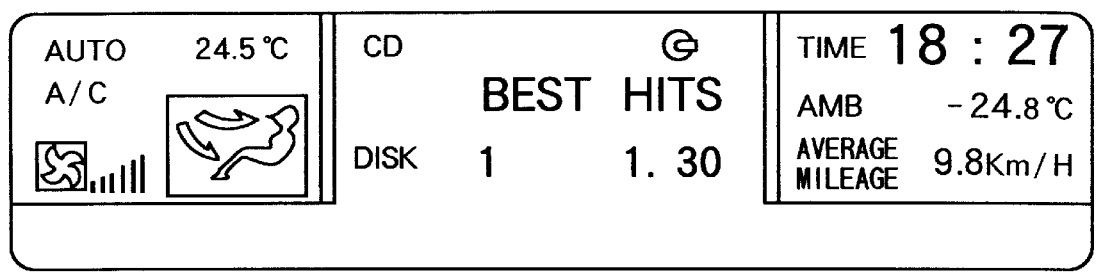
Figure 61:
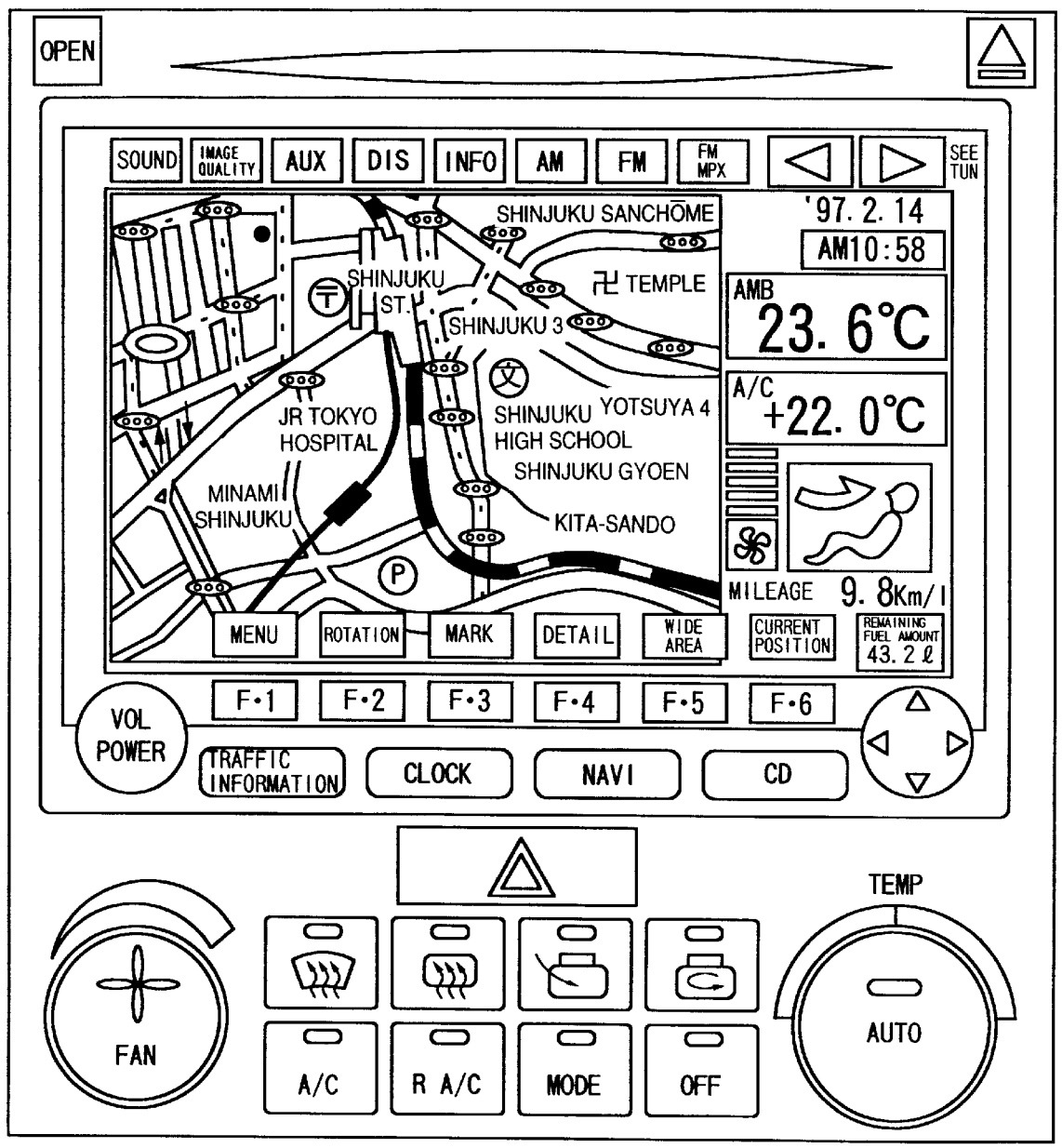

As shown in FIG. 60A, the display 102b displays the operation mode, setting temperature, and air outlet amount of the air-conditioner apparatus, the tuned channel of the audio unit, time, temperature, VICS information, and the like.

Figure 60D:

Also, the display contents on the display 102b can be switched to those of DIS information (FIG. 60B) or CD player information (FIG. 60C) using a corresponding one of the function keys 105. Furthermore, the display 102b displays a warning message upon detecting any failure of the vehicle, as shown in FIG. 60D.

As shown in FIG. 61, the display 102c displays map information of the car navigation apparatus in addition to the information contents displayed on Types and.

[Attachment Structure of Center Module]

The attachment structure of the center module to the dashboard will be described below.

Note that attachment of the center module 200 of the seventh embodiment will be exemplified below, and the same applies to the attachment structures of the center modules of the first to sixth embodiments.

<First Attachment Structure>

FIGS. 62A and 62B are respectively a sectional view and perspective view showing the first attachment structure of the center module and compound equipment.

As shown in FIGS. 62A and 62B, in the first attachment structure, a stay 3a formed with a fitting hole 3c that receives the fixing pin 12 is arranged on the upper surface of the reinforcement member 3 with high rigidity, and an arm 3b for supporting the plug-in connector 4 and a harness 4a is arranged. The fixing pin 12 is formed on the back side of the audio or navigation apparatus located at the central portion of the compound equipment 10, and the connector 11 on the module side is mounted below the fixing pin 12. More specifically, the connector 11 on the module side is mounted on the DIS apparatus or air-conditioner control unit located at the lowermost position of the compound equipment 10.

The engaging direction of the compound equipment 10 with respect to the fixing pin 12 substantially agrees with the coupling direction of the connector on the module side with respect to the plug-in connector 4.

Upon attaching the center module to the dashboard, the assembly of the center module 200 and compound equipment 10 is inserted into the opening portion 1b of the dashboard, whereby the connector 11 on the module side is fitted into the plug-in connector 4, and the fixing pin 12 is inserted into the fitting hole 3c of the stay 3a. In this state, the fixing pin is fixed to the stay 3a using a bolt, nut, and the like, thereby fixing the assembly of the center module 200 and compound equipment 10 to the opening portion 1b of the dashboard.

<Second Attachment Structure>

Figures 63A, 63B:
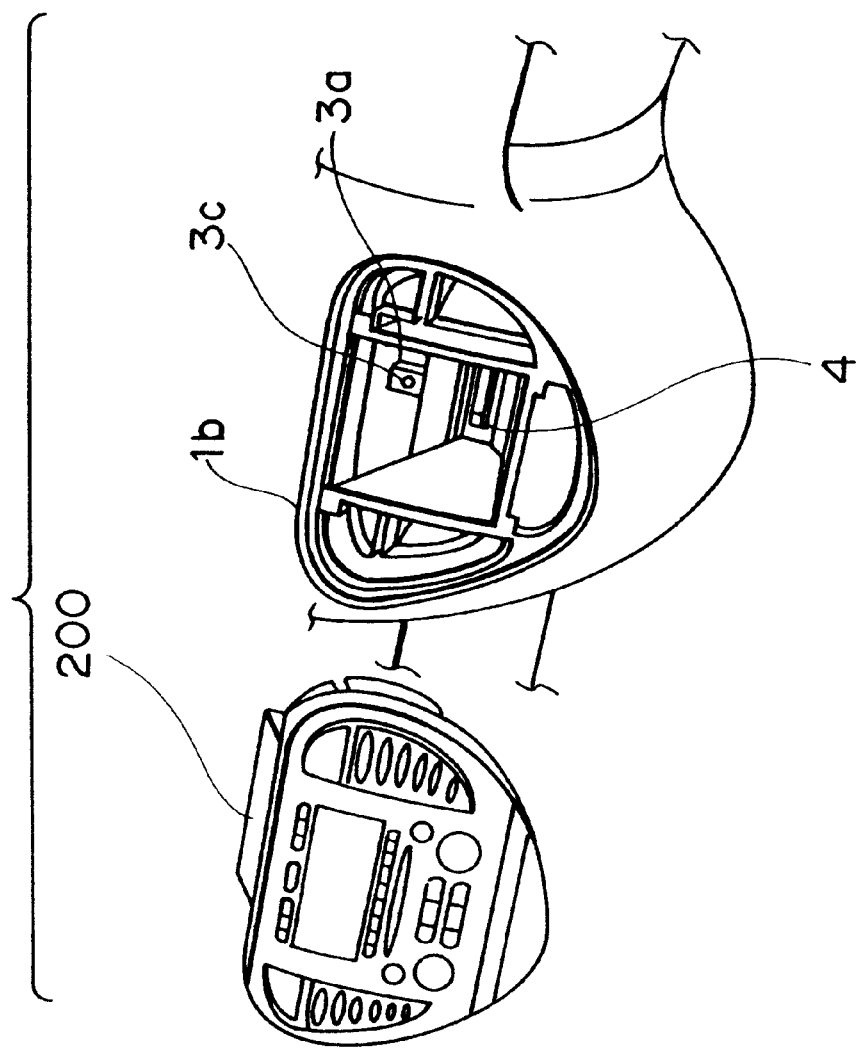
FIG. 63A is a sectional view showing the second attachment structure of a center module and compound equipment.
FIG. 63B is a perspective view showing the second attachment structure of a center module and compound equipment.

FIGS. 63A and 63B are respectively a sectional view and perspective view showing the second attachment structure of the center module and compound equipment.

As shown in FIGS. 63A and 63B, in the second attachment structure, a stay 3a formed with a fitting hole 3c that receives the fixing pin 12 is disposed on the upper surface of the reinforcement member 3, and the plug-in connector 4 and a harness 4a are directly fixed to the lower surface of the reinforcement member 3. The fixing pin 12 is formed on the back side of the audio or navigation apparatus located at the central portion of the compound equipment 10, and the connector 11 on the module side is mounted below the fixing pin 12. More specifically, the connector 11 on the module side is mounted on the DIS apparatus or air-conditioner control unit located at the lowermost position of the compound equipment 10.

Upon attaching the center module to the dashboard, the assembly of the center module 200 and compound equipment 10 is inserted into the opening portion 1b of the dashboard, whereby the connector 11 on the module side is fitted into the plug-in connector 4, and the fixing pin 12 is inserted into the fitting hole 3c of the stay 3a. In this state, the fixing pin is fixed to the stay 3a using a bolt, nut, and the like, thereby fixing the assembly of the center module 200 and compound equipment 10 to the opening portion 1b of the dashboard.

<Third Attachment Structure>

FIGS. 64A and 64B are respectively a sectional view and perspective view showing the third attachment structure of the center module and compound equipment.

As shown in FIGS. 64A and 64B, in the third attachment structure, a stay 3a formed with a fitting hole 3c that receives the fixing pin 12 is disposed on the upper surface of the reinforcement member 3, as in the second attachment structure. The plug-in connector 4 and a harness 4a are supported by a frame 1c of the opening portion 1b at a position below the reinforcement member 3. The connector 11 on the module side is mounted on the bottom portion of the compound equipment 10 at a position below the fixing pin 12.

The fixing pin 12 is formed on the back side of the audio or navigation apparatus located at the central portion of the compound equipment 10, and the connector 11 on the module side is mounted below the fixing pin 12. More specifically, the connector 11 on the module side is mounted on the DIS apparatus or air-conditioner control unit located at the lowermost position of the compound equipment 10.

Upon attaching the center module to the dashboard, the assembly of the center module 200 and compound equipment 10 is inserted into the opening portion 1b of the dashboard, whereby the connector 11 on the module side is fitted into the plug-in connector 4, and the fixing pin 12 is inserted into the fitting hole 3c of the stay 3a. In this state, the fixing pin is fixed to the stay 3a using a bolt, nut, and the like, thereby fixing the assembly of the center module 200 and compound equipment 10 to the opening portion 1b of the dashboard.

<Fourth Attachment Structure>

FIGS. 65A and 65B are respectively a sectional view and perspective view showing the fourth attachment structure of the center module and compound equipment.

As shown in FIGS. 65A and 65B, in the fourth attachment structure, the fixing pin 12 is formed on the back side of the audio or navigation apparatus located at the uppermost position of the compound equipment 10, and a stay 3a formed with a fitting hole 3c that receives the fixing pin 12 extends from the upper surface of the reinforcement member 3 to an upper position of the compound equipment 10. The plug-in connector 4 is supported by the stay 3a at a position above the reinforcement member 3. The connector 11 on the module side is mounted on the back side of the audio or navigation apparatus located at the central portion of the compound equipment 10 at a position below the fixing pin 12.

Upon attaching the center module to the dashboard, the assembly of the center module 200 and compound equipment 10 is inserted into the opening portion 1b of the dashboard, whereby the connector 11 on the module side is fitted into the plug-in connector 4, and the fixing pin 12 is inserted into the fitting hole 3c of the stay 3a. In this state, the fixing pin is fixed to the stay 3a using a bolt, nut, and the like, thereby fixing the assembly of the center module 200 and compound equipment 10 to the opening portion 1b of the dashboard.

<Fifth Attachment Structure>

FIGS. 66A and 66B are respectively a sectional view and perspective view showing the fifth attachment structure of the center module and compound equipment.

As shown in FIGS. 66A and 66B, in the fifth attachment structure, the fixing pin 12 is formed on the central portion of the compound equipment 10, and a stay 3a formed with a fitting hole 3c that receives the fixing pin 12 extends from the upper surface of the reinforcement member 3 to the central portion of the compound equipment 10. The plug-in connector 4 and a harness 4a are supported by an arm 3b extending from a heater unit 7 with high rigidity at a position below the reinforcement member 3. The heater unit 7 drives a motor and actuator to control the rotational speed of a fan, the air outlet direction of the duct, and the like on the basis of a control signal from the air-conditioner apparatus. The connector 11 on the module side is mounted on the underside of the compound equipment 10 on its back side at a position underneath the fixing pin 12.

Upon attaching the center module to the dashboard, the assembly of the center module 200 and compound equipment 10 is inserted into the opening portion 1b of the dashboard, whereby the connector 11 on the module side is fitted into the plug-in connector 4, and the fixing pin 12 is inserted into the fitting hole 3c of the stay 3a. In this state, the fixing pin is fixed to the stay 3a using a bolt, nut, and the like, thereby fixing the assembly of the center module 200 and compound equipment 10 to the opening portion 1b of the dashboard.

<Sixth Attachment Structure>

FIGS. 67A and 67B are respectively a sectional view and perspective view showing the sixth attachment structure of the center module and compound equipment.

As shown in FIGS. 67A and 67B, in the sixth attachment structure, the fixing pin 12 is formed on the central portion of the compound equipment 10, and a stay 3a formed with a fitting hole 3c that receives the fixing pin 12 extends from the upper surface of the reinforcement member 3 to the central portion of the compound equipment 10. The plug-in connector 4 and a harness 4a are supported by an arm 3b extending from a heater unit 7 with high rigidity at a position below the reinforcement member 3. The heater unit 7 drives a motor and actuator to control the rotational speed of a fan, the air outlet direction of the duct, and the like on the basis of a control signal from the air-conditioner apparatus. The connector 11 on the module side is mounted on the underside of the compound equipment 10 via an arm 3*d*.

Upon attaching the center module to the dashboard, the assembly of the center module 200 and compound equipment 10 is inserted into the opening portion 1*b* of the dashboard, whereby the connector 11 on the module side is fitted into the plug-in connector 4, and the fixing pin 12 is inserted into the fitting hole 3*c* of the stay 3*a*. In this state, the fixing pin is fixed to the stay 3*a* using a bolt, nut, and the like, thereby fixing the assembly of the center module 200 and compound equipment 10 to the opening portion 1*b* of the dashboard.

<Seventh Attachment Structure>

Figure 68:
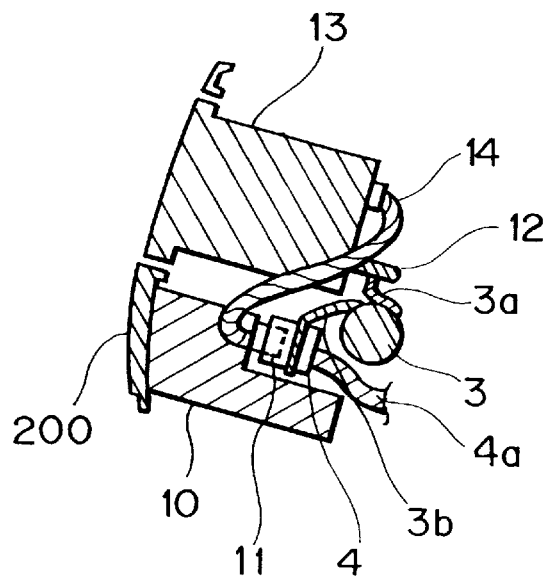
FIG. 68 is a sectional view showing the seventh attachment structure of a center module and compound equipment.

FIG. 68 is a sectional view showing the seventh attachment structure of the center module and compound equipment.

As shown in FIG. 68, the seventh attachment structure allows another audio equipment or the like to be additionally attached to a portion above the compound equipment 10 later. In this attachment structure, the fixing pin 12 is formed on an equipment 13 to be additionally attached, and a stay 3*a* formed with a fitting hole 3*c* that receives the fixing pin 12 extends from the upper surface of the reinforcement member 3. The plug-in connector 4 and a harness 4*a* are supported by an arm 3*b* extending from the reinforcement member 3. The connector 11 on the module side is arranged on the back side of the compound equipment 10.

Upon attaching the other equipment to the dashboard, an intermediate harness 14 on the other equipment 13 is connected to the plug-in connector 4, and the fixing pin 12 is inserted into the fitting hole 3*c* of the stay 3*a*. In this state, the fixing pin 12 is fixed to the stay 3*a* using a bolt, nut, and the like, thereby fixing the other equipment 13 to the opening portion 1*b* of the dashboard together with the assembly of the center module 200 and compound equipment 10.

<Eighth Attachment Structure>

Figure 69:
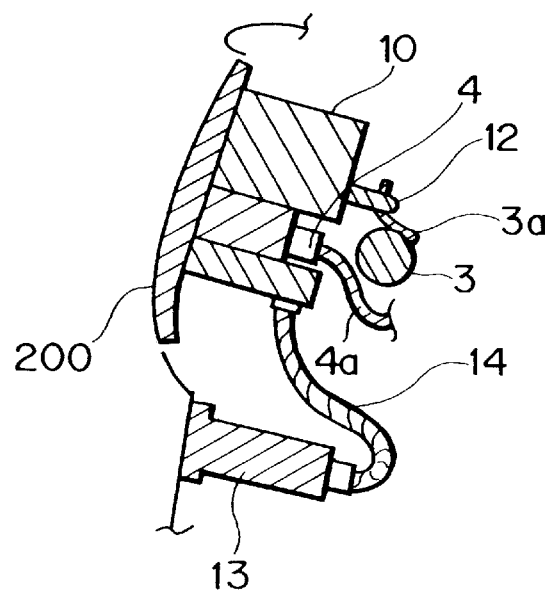
FIG. 69 is a sectional view showing the eighth attachment structure of a center module and compound equipment.

FIG. 69 is a sectional view showing the eighth attachment structure of the center module and compound equipment.

As shown in FIG. 69, the eighth attachment structure allows another audio equipment or the like to be additionally attached to a portion below the compound equipment 10 later. In this attachment structure, the fixing pin 12 is formed on the center module side, and a stay 3*a* formed with a fitting hole 3*c* that receives the fixing pin 12 extends from the upper surface of the reinforcement member 3.

Upon attaching the other equipment to the dashboard, an intermediate harness 14 on another equipment 13 is connected to the compound equipment. Other arrangements are the same as those in the seventh embodiment, and a detailed description thereof will be omitted.

According to the first to eighth attachment structures described above, since the connection of the center module and compound equipment to the connector on the vehicle body side is systematically done, easy assembly and high operability can be assured.

Since the compound equipment is fixed by a fixing pin, the load that acts on the equipment with a connector on the module side can be reduced, and reliability of the connecting portion between the connector on the module side and plug-in connector can be improved.

[Connection Structure Between Center Module and Compound Equipment]

The connection structure between the center module and compound equipment will be described below.

Note that connection examples for the compound equipment 10 having a navigation apparatus 15, audio equipment 16, and DIS apparatus 17 will be explained below.

<Sixth Connection Structure>

Figure 70:
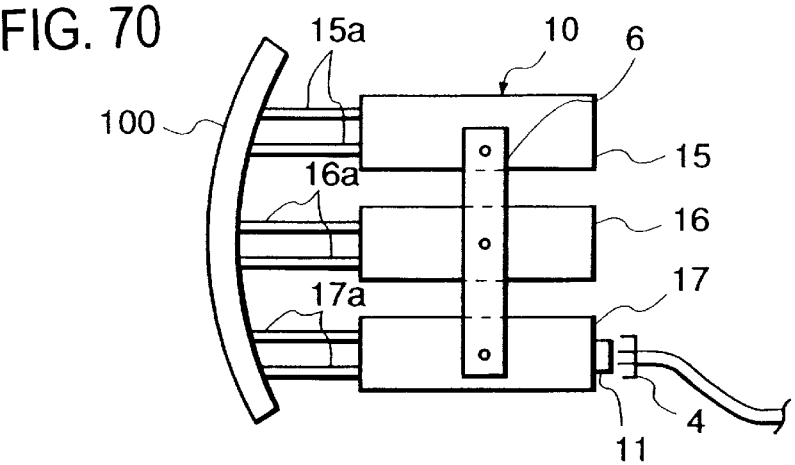
FIG. 70 is a sectional view showing the sixth connection structure of a center module and compound equipment.

FIG. 70 is a sectional view showing the sixth connection structure between the center module and compound equipment.

As shown in FIG. 70, in the sixth connection structure, the navigation apparatus 15, audio equipment 16, and DIS apparatus 17 are mechanically fixed to each other using a fixing member 6, and are electrically connected to the center module 100 via connector wiring lines 15*a*, 16*a*, and 17*a*, respectively.

<Seventh Connection Structure>

Figure 71:
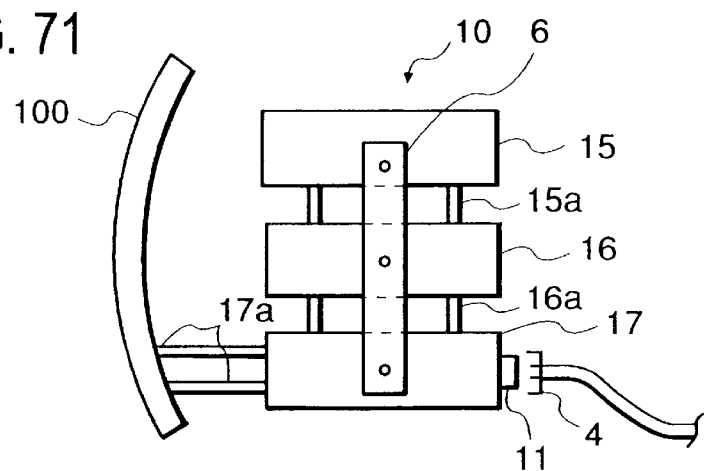
FIG. 71 is a sectional view showing the seventh connection structure of a center module and compound equipment.

FIG. 71 is a sectional view showing the seventh connection structure between the center module and compound equipment.

As shown in FIG. 71, in the seventh connection structure, the navigation apparatus 15, audio equipment 16, and DIS apparatus 17 are mechanically fixed to each other using a fixing member 6. The navigation apparatus 15 is electrically connected to the audio equipment 16 via a connector wiring line 15*a*, and the audio equipment 16 is electrically connected to the DIS apparatus 17 via a connector wiring line 16*a*. The DIS apparatus 17 is electrically connected to the center module 100 via a connector wiring line 17*a*, and communicates various signals including those received from the navigation apparatus 15 and audio equipment 16 with the center module.

<Eighth Connection Structure>

Figure 72:
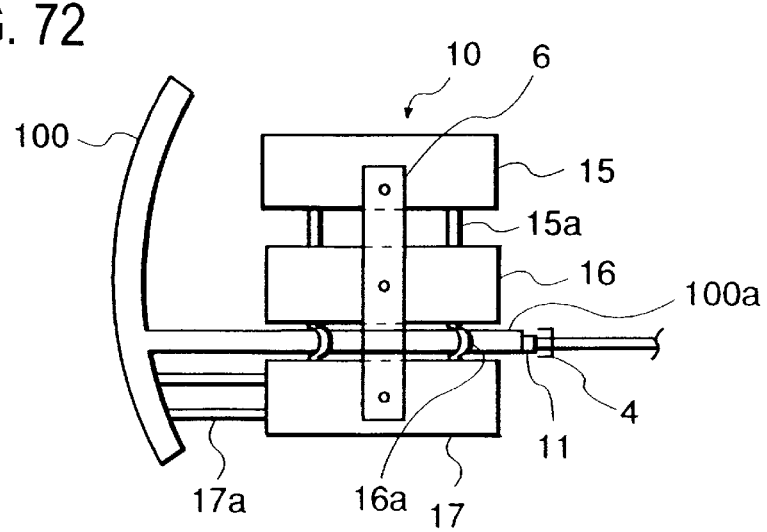
FIG. 72 is a sectional view showing the eighth connection structure of a center module and compound equipment.

FIG. 72 is a sectional view showing the eighth connection structure between the center module and compound equipment.

As shown in FIG. 72, in the eighth connection structure, the navigation apparatus 15, audio equipment 16, and DIS apparatus 17 are mechanically fixed to each other using a fixing member 6. The navigation apparatus 15 is electrically connected to the audio equipment 16 via a connector wiring line 15*a*, and the audio equipment 16 is electrically connected to the DIS apparatus 17 via a connector wiring line 16*a*. The DIS apparatus 17 is electrically connected to the center module 100 via a connector wiring line 17*a*, and communicates various signals including those received from the navigation apparatus 15 and audio equipment 16 with the center module. The center module 100 has an extending portion 100*a*, which projects on the back portion of the compound equipment 10 via the space between the audio equipment 16 and DIS apparatus 17, and is electrically connected to the plug-in connector 4.

<Ninth Connection Structure>

Figure 73:
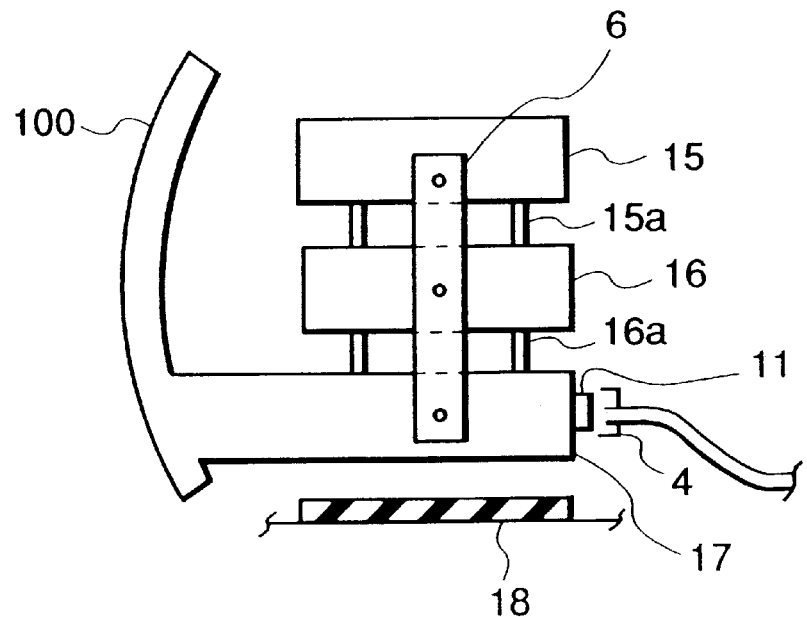
FIG. 73 is a sectional view showing the ninth connection structure of a center module and compound equipment.

FIG. 73 is a sectional view showing the ninth connection structure between the center module and compound equipment.

As shown in FIG. 73, in the ninth connection structure, the navigation apparatus 15, audio equipment 16, and DIS apparatus 17 are mechanically fixed to each other using a fixing member 6. The navigation apparatus 15 is electrically connected to the audio equipment 16 via a connector wiring line 15*a*, and the audio equipment 16 is electrically connected to the DIS apparatus 17 via a connector wiring line 16*a*. The DIS apparatus 17 is arranged integrally with the center module 100, and communicates various signals including those received from the navigation apparatus 15 and audio equipment 16 with the center module. The connector 11 on the module side is mounted on the back side of the DIS apparatus 17, and is electrically connected to the plug-in connector 4. In consideration of the weight and the like of the compound equipment 10, a shock absorber 18 such as rubber is placed beneath the DIS apparatus 17.

Hence, by supporting the lowermost apparatus that receives the weights of other compound equipments via the shock absorber inserted, reliability of the connecting portion between the connector on the module side and plug-in connector can be improved by reducing the load that acts on that apparatus.

<Another Connection Structure>

Figure 74:
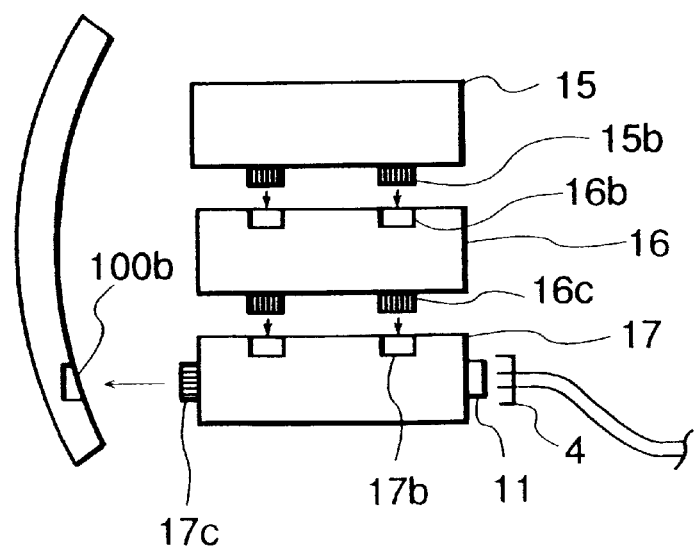
FIG. 74 is a sectional view showing another connection structure of a center module and compound equipment.

FIG. 74 is a sectional view showing another connection structure between the center module and compound equipment.

As shown in FIG. 74, in this connection structure, the navigation apparatus 15 and audio equipment 16 are mechanically and electrically connected to each other by engaging male and female connectors 15b and 16b. Likewise, the audio equipment 16 and DIS apparatus are mechanically and electrically connected to each other by engaging male and female connectors 16c and 17b. Furthermore, the DIS apparatus 17 and center module 100 are mechanically and electrically connected to each other by engaging male and female connectors 17c and 100b.

In this way, the need for the fixing member 5 can be obviated by engaging the male and female connectors, and the connection strength of the compound equipment can be increased.

[Electrical Arrangement of Center Module and Compound Equipment]

The electrical arrangement of the center module and compound equipment will be described below.

Note that the multiplex communication scheme applied to this embodiment is a network access scheme so-called CSMA (Carrier Sense Multiple Access)/CD (Collision Detection).

<Center Module of Sixth Embodiment>

Figure 75:
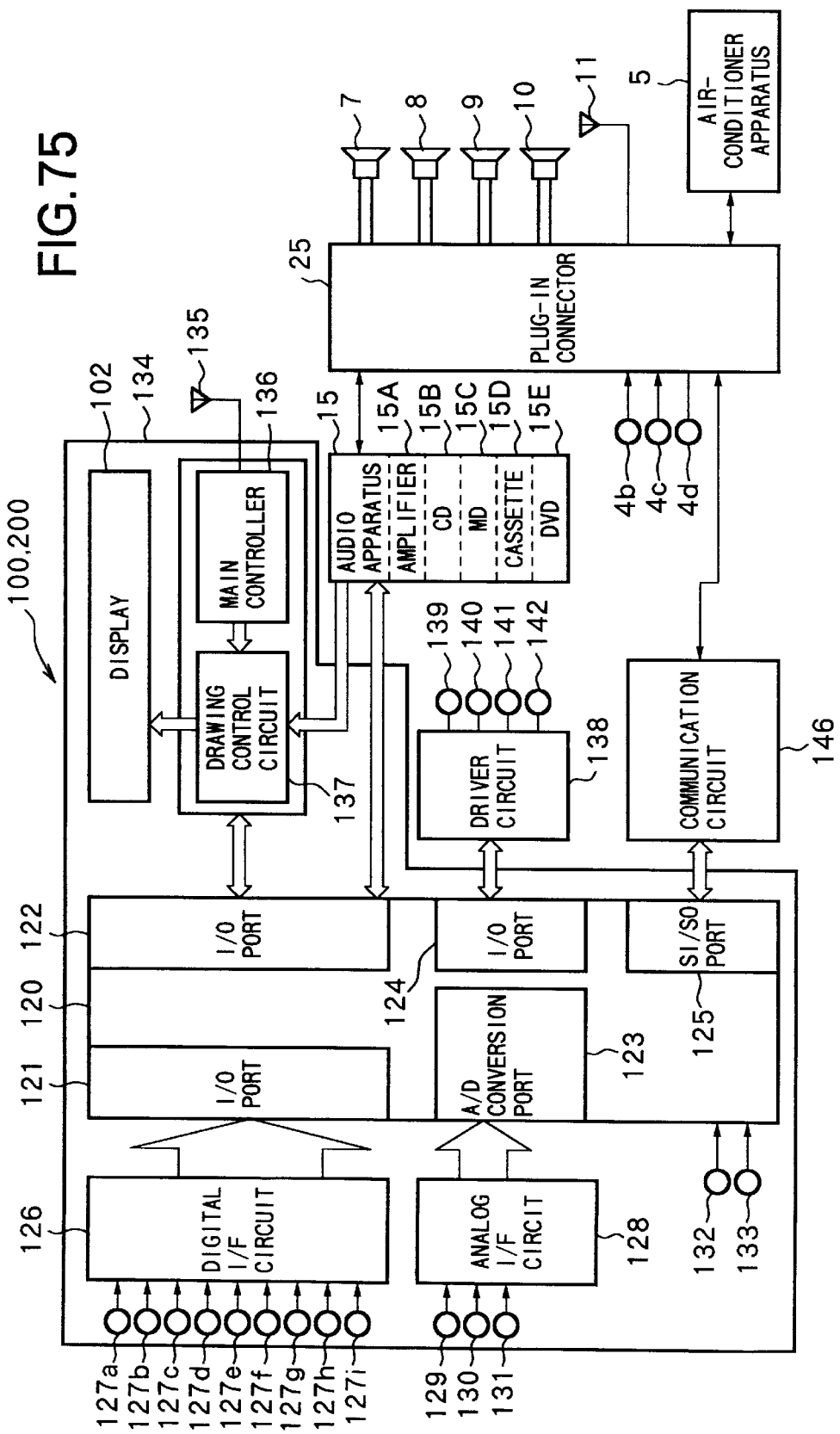
FIG. 75 is a block diagram showing the electrical arrangement of a center module of the first embodiment.

FIG. 75 is a block diagram showing the electrical arrangement of the center module of the sixth embodiment.

The center module of the sixth embodiment is the one having a minimum number of functions, or an intermediate number of functions shown in FIGS. 49 or 50.

As shown in FIG. 75, the center module of the sixth embodiment comprises an ECU 120 serving as a central processing unit for controlling the overall center module, a digital interface (I/F) circuit 126 for receiving digital switch signals, an analog interface (I/F) circuit 128 for receiving analog switch signals, a display 102, and a drawing circuit 134.

The center module is connected with the audio apparatus 15 as the compound equipment, and is also connected with various indicators 139 to 145 via a driver circuit 138. Furthermore, the center module 100 or 200 is connected to the air-conditioner apparatus 5 via the plug-in connector 4 (25) and a communication circuit 146 so as to allow communications therebetween. The audio apparatus 15 is connected with external loudspeakers 7 to 10 and an FM antenna via the plug-in connector 4.

The digital I/F circuit 126 receives digital switch signals generated upon operating a navigation operation switch 127a, a CD (compact disk) operation switch 127b, an MD (mini disk) operation switch 127c, a DVD (digital video disk) operation switch 127d, a cassette deck operation switch 127e, a radio operation switch 127f, a DIS apparatus operation switch 127g, an FM character multiplex operation switch 127h, and an air-conditioner operation switch 127i. These digital switch signals are input to the ECU 120 via an input/output (I/O) port 121.

The analog I/F circuit 128 receives analog switch signals generated upon operating a dial-type operation switch 129 for switching the air-conditioning mode, a dial-type operation switch 130 for switching the air-conditioner setting temperature, and a dial-type operation switch 131 for switching the air-conditioning fan. These analog switch signals are converted into digital signals via an analog/digital (A/D) conversion port 123 of the ECU 120, and the digital signals are input to the ECU 120.

The ECU 120 also receives switch signals from an ignition switch 132 and power switch 133.

The ECU 120 outputs switch operation signals for controlling the audio apparatus 15 via an I/O port 122 in accordance with switch signals received by the digital I/F circuit 126. The audio apparatus 15 controls the audio apparatus in accordance with the switch operation signals input from the ECU 120, and outputs an image signal for displaying the operation state of the audio apparatus 15 on the display 102. The audio apparatus 15 comprises an amplifier unit 15A, CD unit 15B, MD unit 15C, cassette deck unit 15D, and DVD unit 15E.

The ECU 120 outputs the image signal to the drawing circuit 134 via the I/O port 122. The drawing circuit 134 forms a drawing signal to be displayed on the display 102 using a main controller 136 on the basis of the image signal, and controls display of the display 102 using a drawing control circuit 137. Also, the drawing circuit 134 forms a drawing signal to be displayed on the display 102 on the basis of an FM character multiplex signal output from the audio apparatus 15, and controls display of the display 102 using the drawing control circuit 137.

The ECU 120 outputs indicator driving signals to the driver circuit 138 via an I/O port 124 in accordance with the switch operation signals from the digital I/F circuit 126 or analog I/F circuit 128. The driver circuit 138 ON/OFF-controls the indicator 139 for an auto/manual mode of the air conditioner, the indicator 140 for a DEF switch, the indicator 141 for an REC switch, and the indicator 142 for an ON/OFF switch of the air conditioner, in accordance with the indicator driving signals from the ECU 120.

The ECU 120 outputs air-conditioner control signals to the communication circuit 146 via a serial input/serial output (SI/SO) port 125 of a serial interface type such as an RS-232C or the like in accordance with the switch operation signals from the digital I/F circuit 126 or analog I/F circuit 128. The communication circuit 146 outputs the air-conditioner control signals to the air-conditioner apparatus 5. The communication circuit 146 and air-conditioner apparatus 5 can communicate with each other by, e.g., a network access scheme called CSMA (Carrier Sense Multiple Access)/CD (Collision Detection).

The drawing circuit 134 can have a simple navigation apparatus function. In such case, a GPS antenna 135 is mounted, and the position information of the own vehicle is displayed via the display 102.

Furthermore, a hazard switch 4b, rear DEF switch 4c, cigarette lighter 4d, and the like are connected to the harness on the vehicle body side via the plug-in connector 4.

<Center Module of Seventh Embodiment>

Figure 76:
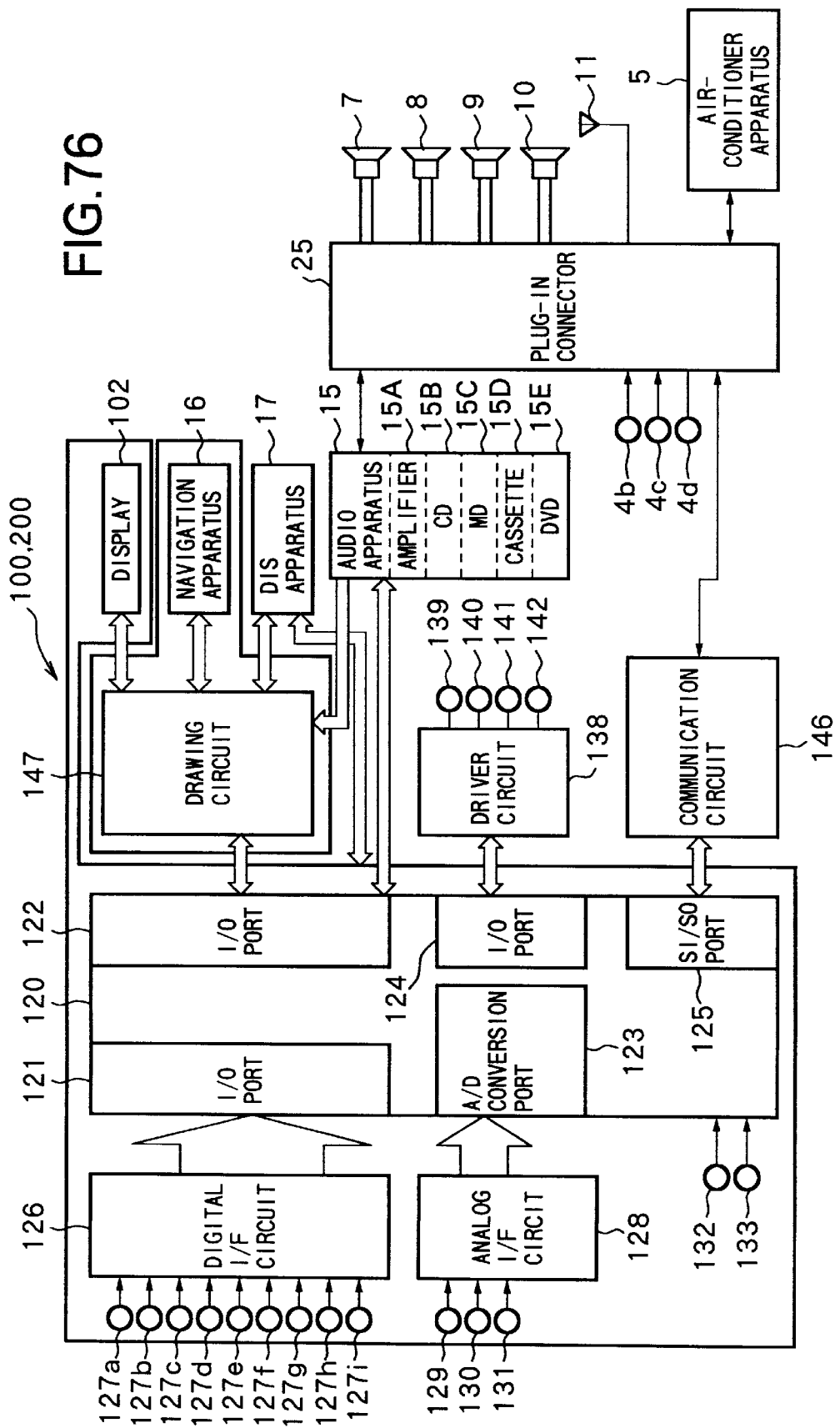
FIG. 76 is a block diagram showing the electrical arrangement of a center module of the second embodiment.

FIG. 76 is a block diagram showing the electrical arrangement of the center module of the seventh embodiment.

The center module of the seventh embodiment is the most compound one, as shown in FIG. 51.

As shown in FIG. 76, the center module of the seventh embodiment has the navigation apparatus 16 and DIS apparatus 17, and display control on a display is directly done by a drawing circuit 147 of the navigation apparatus 16. This is because the navigation apparatus must display a large volume of information such as map information, and requires high-speed operations, but an internal drawing circuit of the ECU 120 cannot meet such requirements. That is, the ECU 120 outputs switch operation signals to the audio apparatus 15, navigation apparatus 16, and DIS apparatus 17 via the I/O port 22, and outputs an image signal from the audio apparatus 15 to the drawing circuit 147. The drawing circuit 147 forms a drawing signal to be displayed on the display 102 on the basis of the image signal, and controls display of the display 102. Also, the drawing circuit 147 forms a drawing signal to be displayed on the display 102 on the basis of an FM character multiplex signal output from the audio apparatus 15, and controls display of the display 102.

Hence, the need for the internal drawing circuit of the center module can be obviated, and this circuit is set inactive.

As for other arrangements, the same reference numerals denote the same parts as those in the center module of the sixth embodiment, and a detailed description thereof will be omitted.

<Center Module of Eighth Embodiment>

Figure 77:
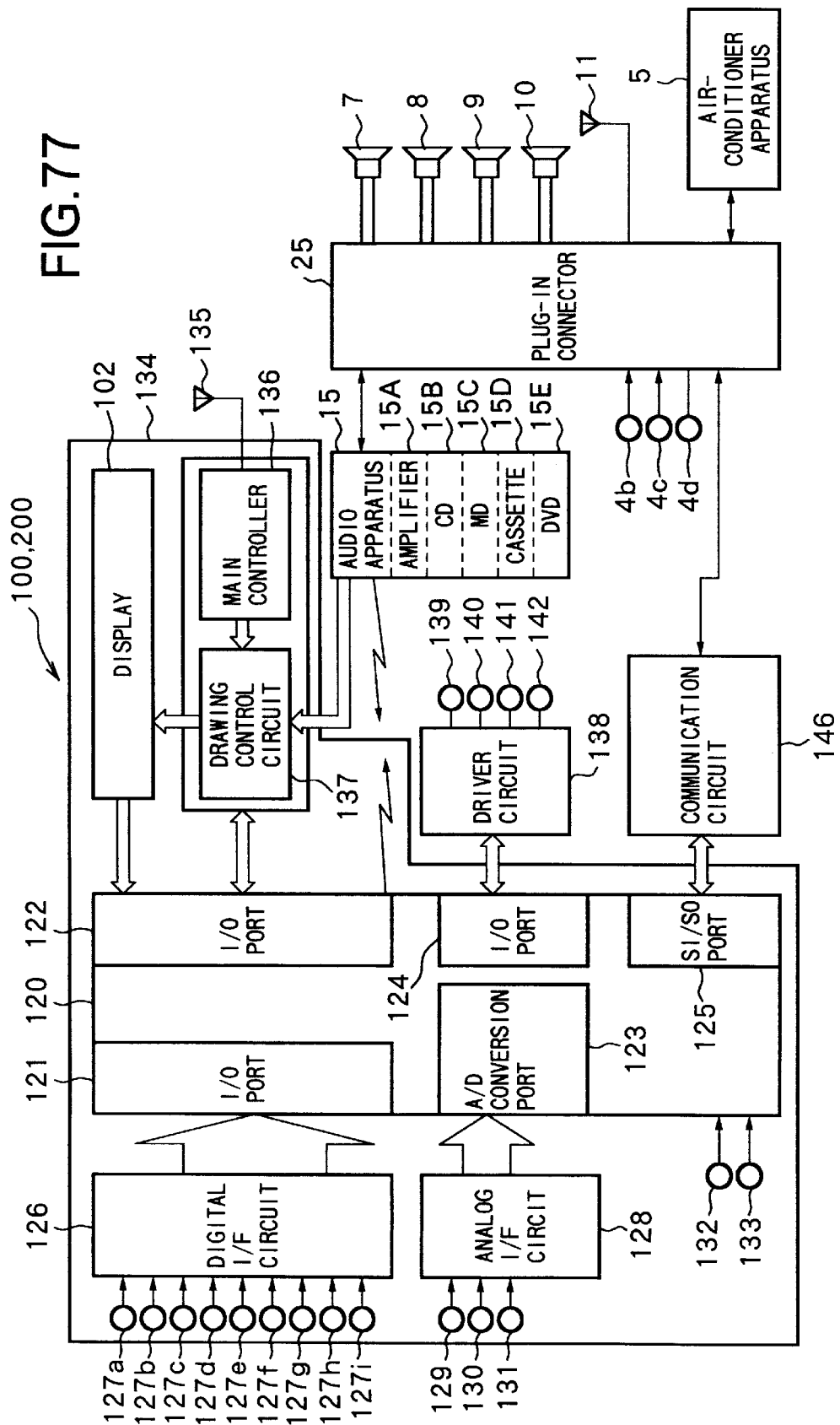
FIG. 77 is a block diagram showing the electrical arrangement of a center module of the third embodiment.

FIG. 77 is a block diagram showing the electrical arrangement of the center module of the eighth embodiment.

The center module of the eighth embodiment has substantially the same arrangement as that of the center module of the sixth embodiment, except that the ECU 120 and audio apparatus 15 communicate with each other via radio communications using, e.g., infrared rays.

As for other arrangements, the same reference numerals denote the same parts as those in the center module of the sixth embodiment, and a detailed description thereof will be omitted.

As the number of types of compound equipments can be increased/decreased or functions can be added/deleted without changing the functions of the center module itself of each of the sixth to eighth embodiments, the manufacturing cost can be reduced since a common center module is used, and parts cost and the like of the compound equipment can also be reduced since it does not require any operation switches and the like.

[Signal I/O Mode between Center Module and Compound Equipment]

The signal I/O mode between the center module and compound equipment will be explained below.

The ECU 120 of the center module distributes and outputs switch operation signals input via the digital I/F circuit 126 or analog I/F circuit 128 in correspondence with the audio apparatus 15, navigation apparatus 16, and DIS apparatus 17. The audio apparatus 15, navigation apparatus 16, and DIS apparatus 17 control the respective units in accordance with the switch operation signals, and outputs image signals to the ECU 120. Such image signals represent that the units have been controlled in accordance with the switch operation signals, and serve as response signals to the switch operation signals.

When an image signal representing control according to the switch operation signal is not sent back, or when an image signal which is discordant with the switch operation signal is sent back, the ECU 120 determines a failure of the output source unit of that image signal.

The ECU 120 receives image signals from the audio apparatus 15, navigation apparatus 16, and DIS apparatus 17, checks if an image signal representing control according to the switch operation signal is sent back, or an image signal which is concordant with the switch operation signal is sent back, and then outputs the image signals to the drawing circuit.

<Another I/O Mode>

FIG. 100 is a table showing operations corresponding to another signal I/O mode between the center module and compound equipment.

As the other signal I/O mode between the center module and compound equipment, the ECU 120 of the center module distributes and outputs switch operation signals input via the digital I/F circuit 126 or analog I/F circuit 128 in correspondence with the audio apparatus 15, navigation apparatus 16, and DIS apparatus 17, and outputs image signals representing control according to the switch operation signals to the drawing circuit so as to nearly simultaneously execute the control of the audio apparatus 15, navigation apparatus 16, and DIS apparatus 17, and the display control of the display.

In such case, for example, upon setting the temperature, the air outlet direction, or the like of the air-conditioner apparatus, high control response can be obtained to user's operations.

As shown in FIG. 100, the audio apparatus 15, navigation apparatus 16, and DIS apparatus 17 should undergo the display control by outputting image signals simultaneously with output of switch operation signals immediately after the power switch is turned on, and the temperature setup in the auto mode of the air-conditioner apparatus, fan, temperature, and duct setups in the manual mode, and the like should undergo the display control simultaneously with input of the switch operation signals.

As shown in FIG. 100, there are no functions that should undergo display control after the switch operation signals are output and image signals are input immediately after the power switch is turned on. On the other hand, fan setup, duct setup, and the like in the auto mode of the air-conditioner apparatus should undergo such control upon input of the switch operation signals.

The ECU 120 of the center module selectively uses a first mode that executes display control simultaneously with switch operations, and a second mode that executes display control after switch operation signals are output and image signals are received.

[Communication Mode between Center Module and Air-conditioner Apparatus]

The communication mode between the center module and air-conditioner apparatus will be explained below.

<Data to be Transferred from Center Module to Air-conditioner Apparatus>

FIG. 78 shows switch signal transfer data to be transferred from the center module to the air-conditioner apparatus. FIG. 80 shows data for designating the transfer contents in a command field.

As shown in FIG. 78, switch signal transfer data to be transferred from the center module to the air-conditioner apparatus has a 24-bit data length: bits 1 to 8 define a command field for designating the switch signal transfer contents, bits 9 to 20 a switch content field that represents the contents of switch operation; and bits 21 to 24 a parity field.

The switch signal transfer contents are designated by data CM0 to CM7 in the command field, as shown in FIG. 80, and the contents of the switch operations are designated by the switch content field.

The air-conditioner apparatus 5 recognizes switch signal transfer data based on the command field, and then executes switch operation designated by the following switch content field.

<Data to be Transferred from Air-conditioner Apparatus to Center Module>

FIGS. 79A and 79B show display signal transfer data to be transferred from the air-conditioner apparatus to the center module.

As shown in FIGS. 79A and 79B, the display signal transfer data to be transferred from the air-conditioner apparatus to the center module has a 72-bit data length: bits 1 to 8 define a command field for designating the display signal transfer contents, bits 9 to 66 a display content field that represents the display contents, and bits 67 to 72 a parity field.

The display signal transfer contents are designated by data CM0 to CM7 in the command field, as shown in FIG. 80, and the display contents are then designated by the display content field. Data of bits 34 to 55 represent the display contents of, e.g., a temperature display, and represent a numerical value when a dot-matrix display is used, or the display contents of the individual segments when a segment display is used.

The center module confirms the display signal transfer data based on the command field, and then executes display processing designated by the following display content field.

[Operation of Center Module]

The operation of the center module will be explained below. As the compound equipment, an audio apparatus, navigation apparatus, DIS apparatus, intelligent cruising control (ICC) apparatus, parking assist system (PAS), and vehicle telephone are mounted.

FIG. 81 is a flow chart showing the main control operation of the center module. FIG. 82 shows the meanings of flags set in the center module.

As shown in FIG. 81, initialization is executed in step S2. This initialization performs power-ON reset, sets the previous screen, initializes flags, and sets an initial screen flag F4 upon power ON or reset. The previous screen is set by storing, in a memory, a screen displayed immediately before the ignition switch was turned off, and reading out that screen from the memory when the ignition switch is turned on (or upon power-ON reset).

In step S4, failure detection/diagnosis is executed. In this failure detection/diagnosis, failure diagnosis in other apparatuses (compound equipment) and center module is done. If a serious failure is detected, a flag F7 is set; if a middle-level failure is detected, a flag F6 is set; or if a light-level failure is detected, a flag F5 is set.

In step S6, switch operation detection is executed. In this switch operation detection, whether or not one of operation switches on the center module has been operated and a switch operation signal has been input is detected, if switch operation has been done, a flag F3 is set.

In step S8, center module arithmetic processing is executed. The center module arithmetic processing is done, for example, when the time measurement calculation of a timepiece is made, or display contents are changed, and a flag F1 is set upon updating information.

In step S10, a switch operation signal is output to another apparatus.

In step S12, an image signal representing the control result is input from the other apparatus, and when information of the other apparatus (e.g., the air outlet amount of the air conditioner) is updated, and the display contents are changed, a flag F2 is set.

In step S14, the flags set in the center module are checked, and arbitration for the screen display is executed.

In step S16, drawing on the display is executed on the basis of the arbitration result in step S14.

In step S18, screen setups are executed. In the screen setups, the user can desirably set the display contents on the display.

As shown in FIG. 82, the flag F7 is set upon detecting a serious failure, and is reset upon recovering from the failure. The flag F6 is set upon detecting a middle-level failure, and is reset upon recovering from the failure. The flag F5 is set upon detecting a light-level failure, and is reset upon recovering from the failure. The flag F4 is set upon initial power ON, and is reset upon detecting another event. The flag F3 is set upon switch operation, and is reset when switch operation has not been made for a predetermined period of time. The flag F2 is set upon updating information of another apparatus, and is reset upon completion of arbitration. The flag F1 is set upon updating information of the center module, and is reset upon completion of arbitration. A flag F0 is a spare flag.

<Arbitration>

The arbitration of the center module shown in FIG. 81 will be explained below.

FIG. 83 is a flow chart showing the arbitration of the center module. FIG. 84 shows the display patterns on the display upon detecting a failure. FIG. 85 shows the display pattern on the display upon initialization. FIGS. 86 and 87 show the switching processes of the display patterns upon arbitration. FIG. 88 shows the failure ranks.

As shown in FIG. 83, it is checked in step S20 if a failure has occurred. Whether or not a failure has occurred can be determined by checking if one of the flags F5 to F7 is set. If it is determined in step S20 that the failure has occurred (YES in step S20), the flow advances to step S40; otherwise (NO in step S20), the flow advances to step S22.

It is checked in step S22 if an initial screen is displayed. Whether or not the initial screen is displayed can be determined by checking if the flag F4 is set. If it is determined in step S22 that the initial screen is displayed (YES in step S22), the flow advances to step S24 and initial screen display processing is executed using a display pattern shown in FIG. 90F, as shown in FIG. 85, thus displaying the failure contents on area K (display example: see FIG. 94H). If the FM multiplex switch has been depressed in step S22, initial screen display processing is executed using a display pattern shown in FIG. 90D, as shown in FIG. 91, thus displaying the failure contents on area I.

<Another Embodiment of Initial Screen Display Processing>

Figure 94A:
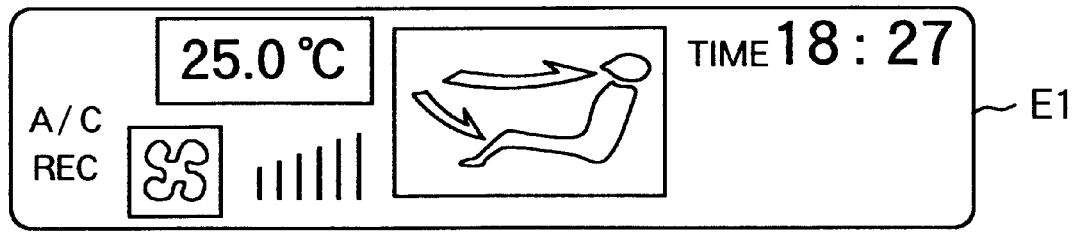
FIGS. 94A to 94N show examples of the screen displays in accordance with the display patterns on a display.
Figure 94B:
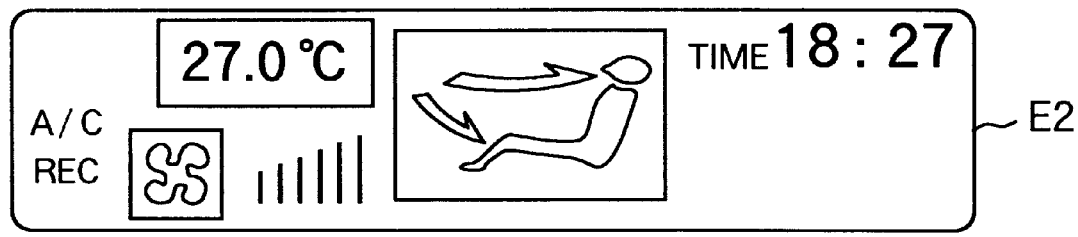
Figure 94C:
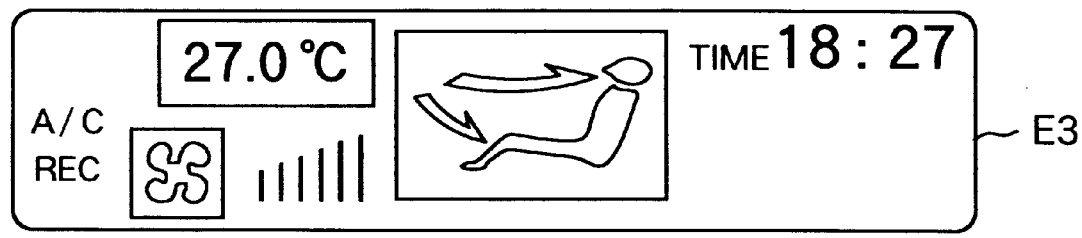
Figure 94D:
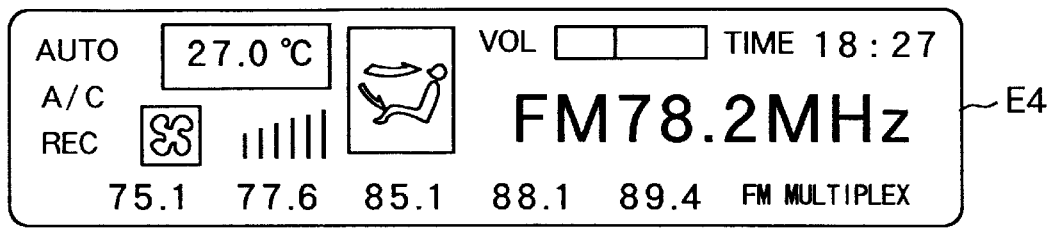
Figure 94E:
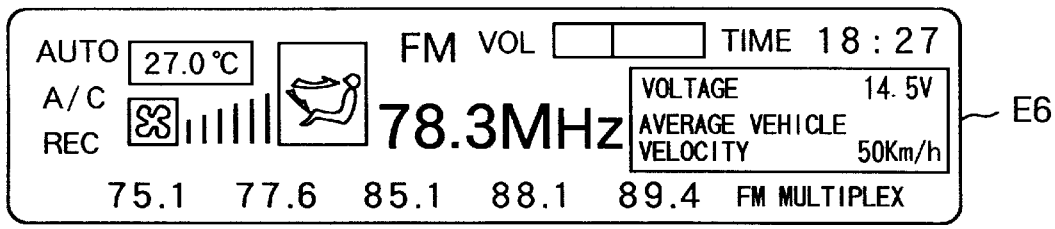
Figure 94F:
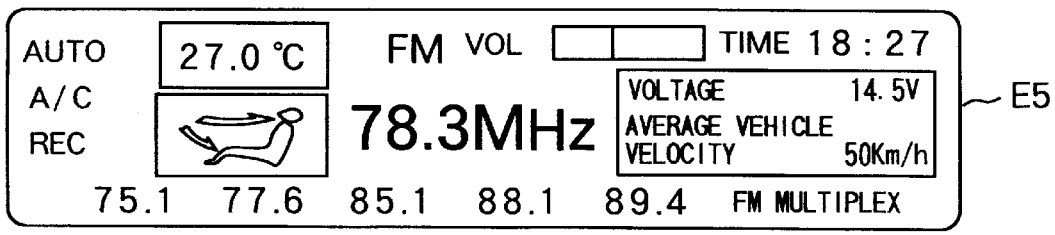
Figure 94G:
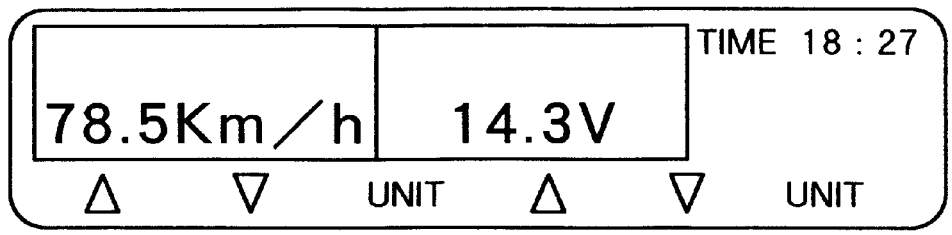
Figure 94H:
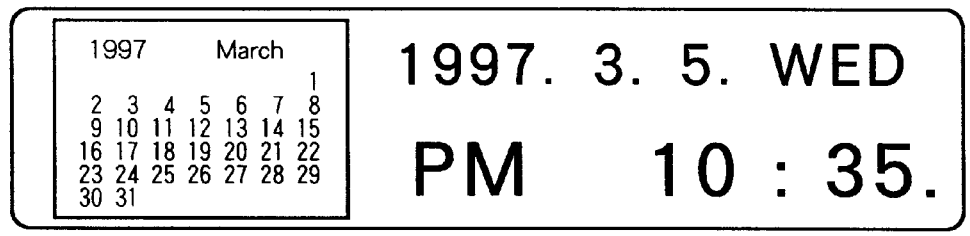

As another embodiment of the initial screen display processing, when a battery is connected or the memory contents of the center module have been erased, a time display or time & calendar display is made on the initial screen, as shown in a display example E8 in FIG. 94H, and an RGB full-screen display may be made to check any failure of the display in an initial display state.

When the ignition switch has been turned on, a display screen saved when the ignition switch was turned off previously is displayed. In this case, if navigation information was displayed on the previous display screen, it is not displayed; if radio information or the like was displayed on the previous screen, the display contents may be updated.

If it is determined in step S22 that the initial screen is not displayed (NO in step S22), the flow advances to step S26 to check if user's switch operation has been done. Whether or not switch operation has been done can be determined by checking if the flag F3 is set. If it is determined in step S26 that switch operation is not done (NO in step S26), the flow advances to step S34; otherwise (YES in step S26), the flow advances to step S27.

It is checked in step S27 if switch operation has been done twice. If it is determined in step S27 that switch operation has been done twice (YES in step S27), the flow advances to step S28; otherwise (NO in step S27), the flow advances to step S34.

Figure 90A:
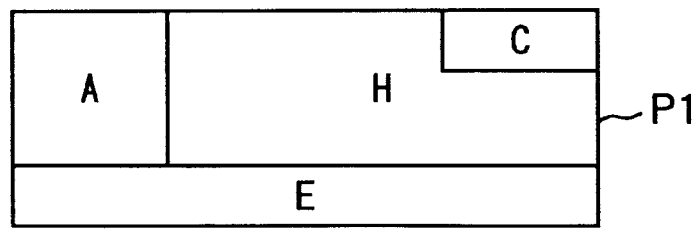
FIGS. 90A to 90H show the display patterns on a display.
Figure 90B:
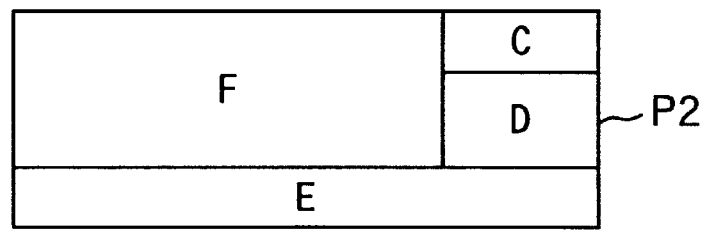
Figure 90C:
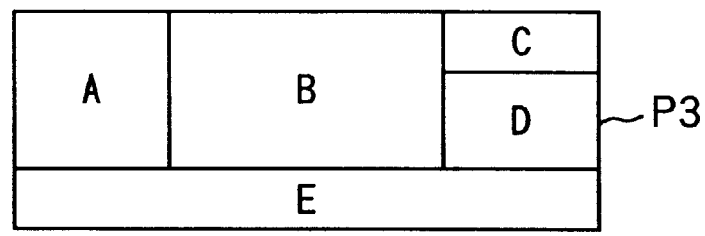
Figure 90D:
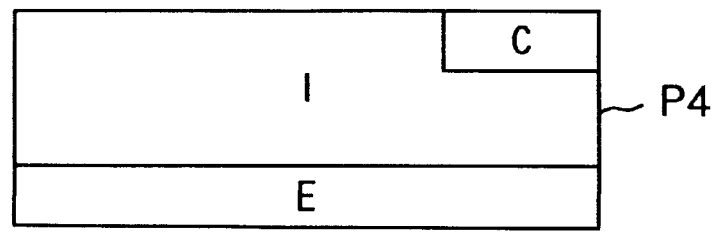

In step S28, the display pattern on the display screen is switched in correspondence with the type of switch operated, as shown in FIG. 86, and screen display processing is executed using a display pattern shown in FIGS. 90A or 90D.

In step S30, it is checked if a predetermined period of time (about 3 sec) has elapsed after the screen was displayed in step S28. If it is determined in step S30 that the predetermined period of time has elapsed (YES in step S30), the flow advances to step S30; otherwise (NO in step S30), the flow jumps to step S36.

In step S32, display screen arbitration is executed, as shown in FIG. 86, and screen display processing is executed using a display pattern shown in FIGS. 90B or 90D.

In step S34, display processing (to be described later) is executed.

It is then checked in step S36 if information of another apparatus is to be updated. Whether or not the information is to be updated can be determined by checking if the flag F1 or F2 is set. If it is determined in step S36 that information is not updated (NO in step S36), the flow returns to the start of this program; otherwise (YES in step S36), the flow advances to step S38 to update the information.

<Upon Occurrence of Failure>

As the arbitration to be performed upon occurrence of a failure, the display area of the display screen is changed in corresponding to the failure rank, the failure display is protected from being erased by user's switch operation, when the user has recognized the failure and operates a predetermined switch, the display area is reduced in accordance with the failure rank, and if a plurality of failures have occurred at the same time, corresponding failure messages are alternately displayed.

If it is determined in step S20 that a failure has occurred (YES in step S20), the flow advances to step S40.

It is checked in step S40 if the failure that has occurred is a serious one. Whether or not the failure is serious can be determined by checking the flag F7 is set. If it is determined in step S40 that the failure is not a serious one (NO in step S40), the flow advances to step S44; otherwise (YES in step S40), the flow advances to step S42.

Figure 90E:
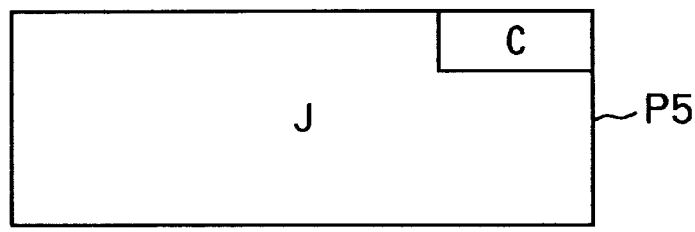
Figure 90F:
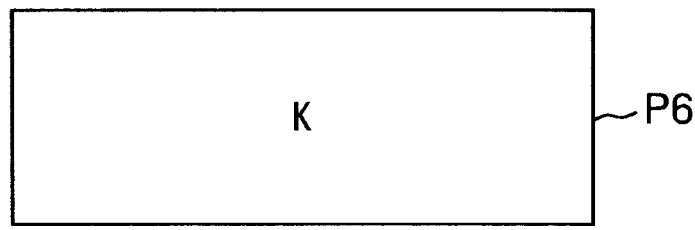
Figure 90G:
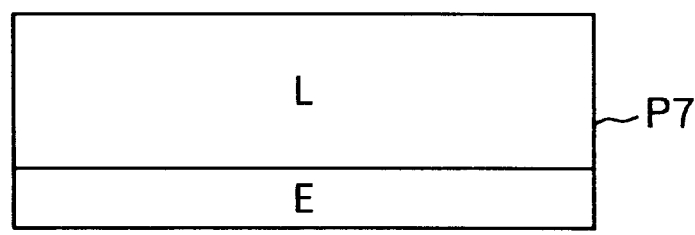
Figure 94I:
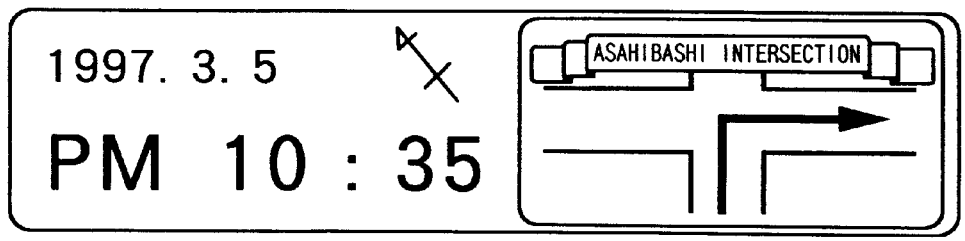
Figure 94J:
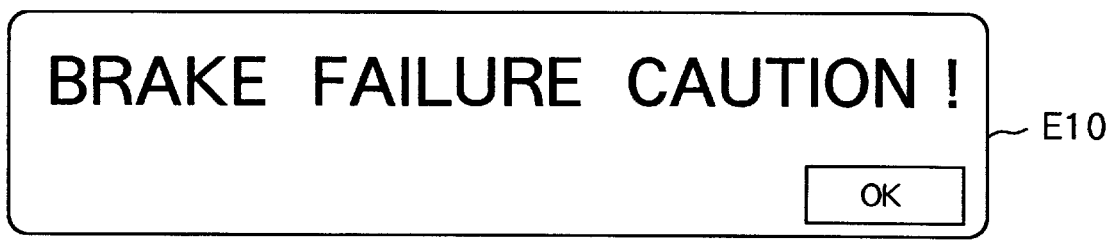

In step S42, failure screen display processing is executed using a display pattern shown in FIG. 90G, as shown in FIG. 84, and the failure contents are displayed on area L (display example: see FIG. 94J).

It is checked in step S44 if the failure that has occurred is a middle-level one. Whether or not the failure is a middle-level one can be determined by checking if the flag F6 is set. If it is determined in step S44 that the failure is not a middle-level one (NO in step S44), it is determined that the failure that has occurred is a light-level one, and the flow advances to step S48; otherwise (YES in step S44), the flow advances to step S46.

Figure 90H:
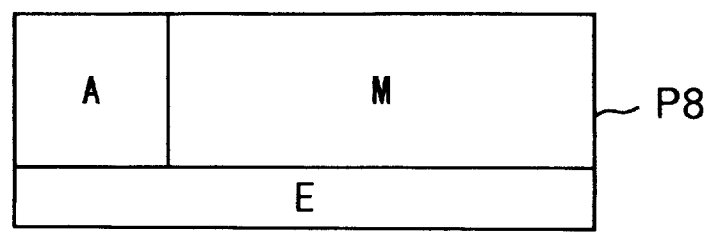
Figure 94K:
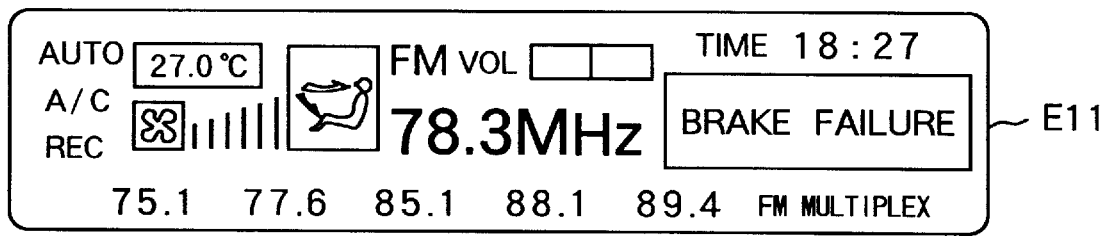
Figure 94L:
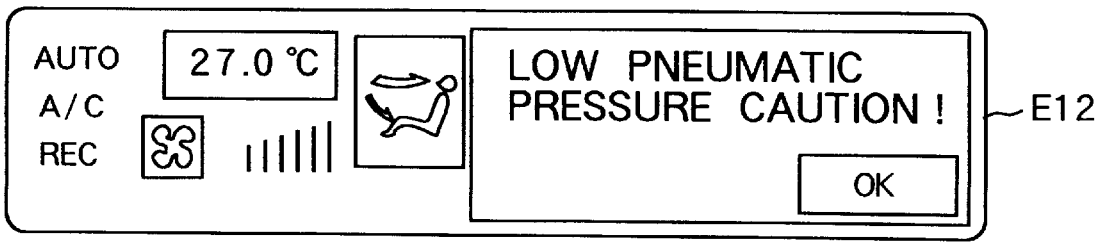

In step S46, failure screen display processing is executed using a display pattern shown in FIG. 90H, as shown in FIG. 84, and the failure contents are displayed on area M (display example: see FIG. 94L).

Figure 94M:
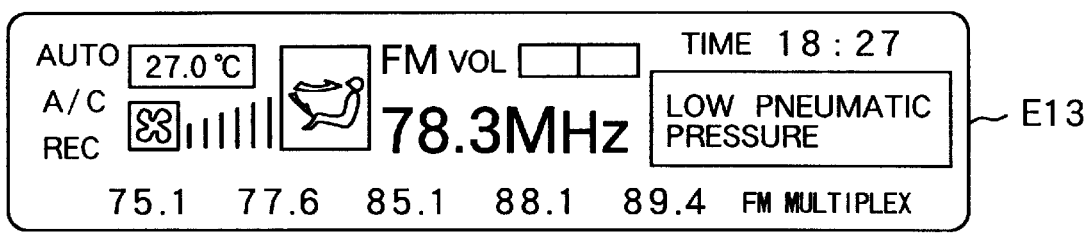
Figure 94N:
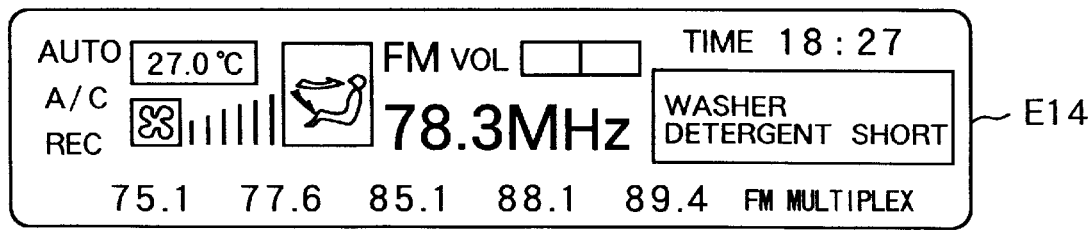

In step S48, failure screen display processing is executed using a display pattern shown in FIGS. 90B or 90C, as shown in FIG. 84, and the failure contents are displayed on area M (display example: see FIG. 94N).

If a plurality of equivalent failures have occurred in step S44 or S46, the screen display is alternately switched at predetermined time intervals (e.g., 3 sec).

As shown in FIG. 88, the serious failure includes, e.g., a brake failure and a failure that interferes with safe travel of the vehicle, the middle-level failure includes, e.g., a pneumatic pressure drop of tires, a decrease in remaining fuel amount, ICC failure, airbag failure, voltage failure, and the like, and the light-level failure includes, e.g., short of a detergent for a washer, operation errors of the compound equipment, and the like.

<Display Processing>

The display processing of the center module shown in FIG. 83 will be explained below.

In this display processing, when a switch has been operated while two or more different display items are being displayed, an item corresponding to the operated switch is emphasized by changing the color or displaying it in an enlarged scale for a predetermined period of time to improve the visibility for the user, the user sets the number of items that can be simultaneously displayed, and when an item display request beyond the number of displayable items has been set, the number of items to be displayed is adjusted to fall within the range of a maximum number of displayable items on the basis of the priority order, and when each display area becomes small, some display items are turned off according to a predetermined rule.

With this processing, the display item corresponding to the operated switch is emphasized and displayed to improve the visibility for the user. Also, the user can customize the display areas on the display screen.

Figure 89:
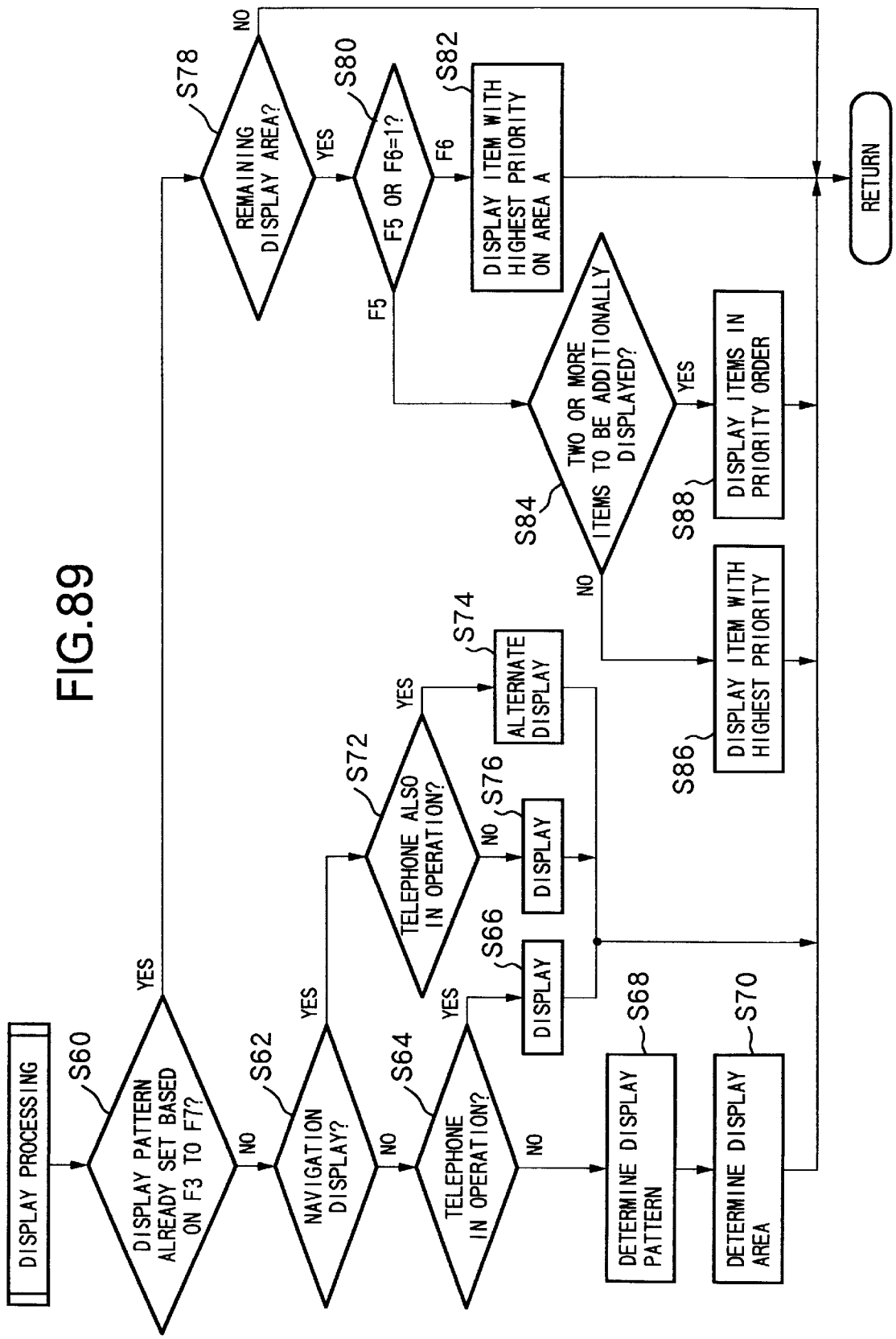
FIG. 89 is a flow chart showing the display processing of the center module.

FIG. 89 is a flow chart showing the display processing of the center module.

As shown in FIG. 89, it is checked in step S60 if one of the flags F3 to F7 is set and a display pattern is set. If it is determined in step S60 that any display pattern is not set (NO in step S60), the flow advances to step S62; otherwise (YES in step S60), the flow advances to step S78.

It is checked in step S62 if an item associated with the navigation apparatus is displayed on the screen. If it is determined in step S62 that the item associated with the navigation apparatus is not displayed on the screen (NO in step S62), the flow advances to step S64; otherwise (YES in step S62), the flow advances to step S72.

It is checked in step S64 if the vehicle telephone is active. If it is determined in step S64 that the vehicle telephone is not active (NO in step S64), the flow advances to step S68; otherwise (YES in step S64), the flow advances to step S66.

In step S66, an item is displayed on area J using a display pattern shown in FIG. 90E.

In step S68, the display pattern is determined. The display pattern is determined on the basis of a maximum number of displayable items which is set in advance, and the number of items to be displayed, as shown in FIG. 92, and determination is done in accordance with the procedure shown in FIG. 87.

In step S70, the display areas are determined. The display areas are determined on the basis of the priority levels of the items to be displayed, and the display priority order on the display pattern, as shown in FIGS. 93A and 93B. When an item associated with the air-conditioner apparatus is to be displayed, it is displayed on area A regardless of the priority order if area A on display pattern P1 or P4 is not used. This is to improve the visibility for the user by always laying out the item display associated with the air-conditioner apparatus at a predetermined position.

It is checked in step S72 if the vehicle telephone is active. If it is determined in step S72 that the vehicle telephone is not active (NO in step S72), the flow advances to step S76; otherwise (YES in step S72), the flow advances to step S74.

In step S74, items associated with the navigation apparatus and vehicle telephone are alternately displayed on area J using the display pattern shown in FIG. 90E.

In step S76, the item associated with the navigation apparatus is displayed on area J using the display pattern shown in FIG. 90E.

It is checked in step S78 if a display area still remains. If it is determined in step S78 that no display area remains (NO in step S78), the flow returns to the start point of this program; otherwise (YES in step S78), the flow advances to step S80.

It is checked in step S80 if the flag F6 or F5 is set. If it is determined in step S80 that the flag F5 is set, the flow advances to step S84; if the flag F6 is set, the flow advances to step S82.

In step S82, since a middle-level failure has occurred, an item with the highest priority other than the failure shown in FIG. 93A is displayed on area A using a display pattern shown in FIG. 90H.

In step S84, since a light-level failure has occurred, it is checked if the number of items to be displayed additionally is two or more. If it is determined in step S84 that the number of items to be displayed additionally is less than two (NO in step S84), the flow advances to step S86; otherwise (YES in step S84), the flow advances to step S88.

In step S86, an item with the highest priority other than the failure shown in FIG. 93A is displayed on area A using a display pattern shown in FIG. 90B.

In step S88, items with the highest and second highest priority levels other than the failure in FIG. 93A are displayed on areas B and A using a display pattern shown in FIG. 90C.

When the number of display items becomes larger than that on the current display screen, the display pattern is switched, as shown in FIG. 87.

With this arbitration of the display screen, even when a plurality of image signals are input from other compound equipments by switch operations, items necessary for the user can be appropriately displayed in accordance with the failure level and priority order.

[Screen Display Example of Arbitration]
<Upon Failure>

FIGS. 95 and 96, and FIGS. 97A to 99C show screen display examples of the arbitration shown in FIG. 83.

Figure 95:
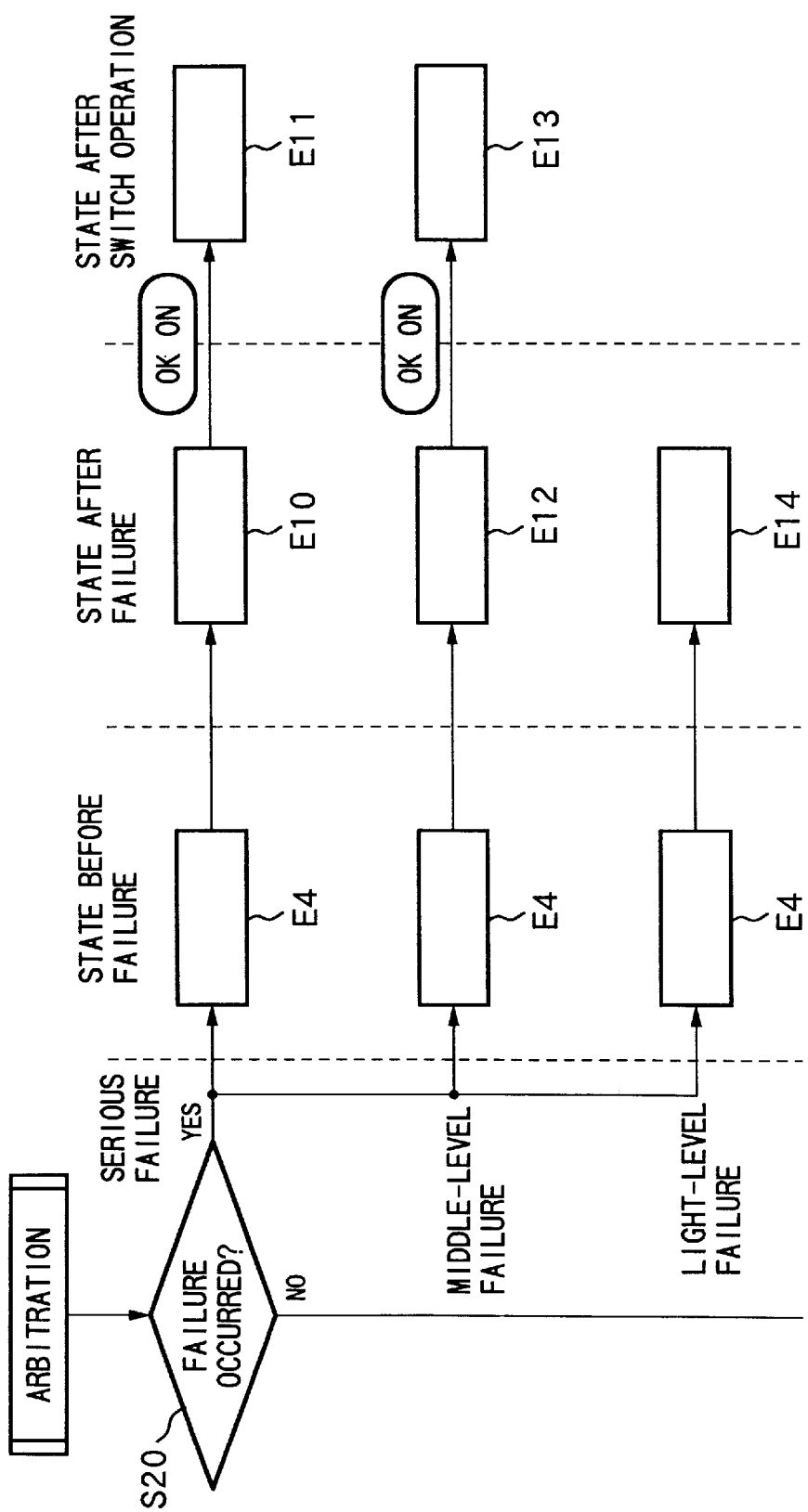
FIG. 95 is a chart showing an example of the screen displays in the arbitration shown in FIG. 83.

When it is determined in the arbitration that a serious failure has occurred, as shown in FIG. 95, the screen display is switched from a display example E4 in FIG. 94D as that before the failure to a display example E10 in FIG. 94J as that after the failure. When the user has turned on an "OK" switch, the screen display is switched to a display example E11 in FIG. 94K.

On the other hand, when it is determined that a middle-level failure has occurred, as shown in FIG. 95, the screen display is switched from the display example E4 in FIG. 94D as that before the failure to a display example E12 in FIG. 94L as that after the failure. When the user has turned on the "OK" switch, the screen display is switched to a display example E13 in FIG. 94M.

Furthermore, when it is determined that a light-level failure has occurred, as shown in FIG. 95, the screen display is switched from the display example E4 in FIG. 94D as that before the failure to a display example E14 in FIG. 94N as that after the failure.

Note that the background color of the screen display (the display examples E10 to E14) upon detection of a failure is changed from a normal screen color (e.g., blue background) to an emergency screen color (e.g., red background).

<Upon Initial Power ON>

When an initial screen is displayed in the arbitration, as shown in FIG. 96, a display example E8 in FIG. 94H is used.

<Upon Updating Information>

When information has been updated in the arbitration, as shown in FIG. 96, the screen display is switched from a display example E7 in FIG. 94G to a display example E7' as that after the information has been updated.

<Upon Switch Operation Free From Change in Number of Display Items>

(Upon Displaying Three Items)

As shown in FIG. 97A, when it is determined in the arbitration that a certain switch has been operated, if the number of items to be displayed remains the same, and three items are displayed, the screen display is switched from a display example E1 in FIG. 94A as that before the switch operation to a display example E2 in FIG. 94B as that indicating the intermediate user's operation result of the temperature switch. When the user has ended the operation of the temperature switch, the screen display is switched to a display example E3 in FIG. 94C as that after the switch operation.

(Upon Displaying Four Items)

As shown in FIG. 97B, when four items are displayed, the screen display is switched from a display example E4 in FIG. 94D as that before the switch operation to the display example E2 in FIG. 94B as that indicating the intermediate user's operation result of the temperature switch. When the user has ended the operation of the temperature switch, the screen display is switched to a display example E4 in FIG. 94D as that after the switch operation.

(Upon Displaying Five Items)

As shown in FIG. 97C, when five items are displayed, the screen display is switched from a display example E6 in FIG. 94E as that before the switch operation to the display example E2 in FIG. 94B as that indicating the intermediate user's operation result of the temperature switch. When the user has ended the operation of the temperature switch, the screen display is switched to the display example E6 in FIG. 94E as that after the switch operation.

<Upon Switch Operation Requiring Decrease in Number of Display Items>

(Upon Displaying Two Items→One Item)

Figure 98A:
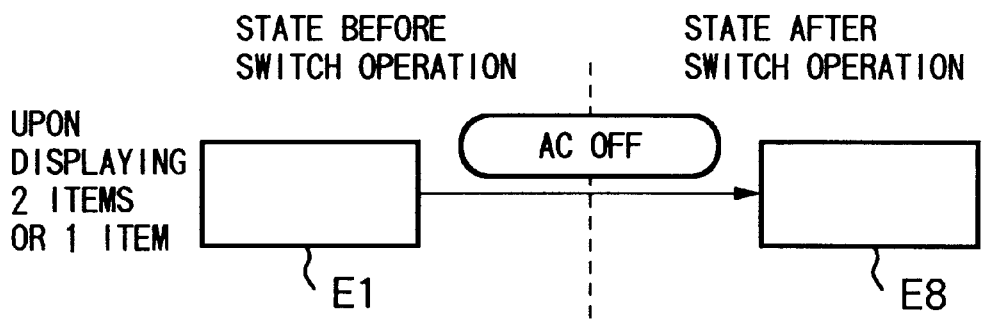
FIGS. 98A to 98C are charts showing examples of the screen displays in the arbitration shown in FIG. 83.

As shown in FIG. 98A, when it is determined in the arbitration that a certain switch has been operated, and the number of items to be displayed decreases from two (e.g., time and air-conditioner items) to one (e.g., time item), the screen display is switched from the display example E1 in FIG. 94A as that before the switch operation to a display example E8 in FIG. 94H as that after the user has turned off the air-conditioner switch to disable the air-conditioner.

When the number of items to be displayed decreases from one to zero, a display example E8 shown in FIG. 94H is used.

(Upon Displaying Three Items→Two Items)

Figure 98B:
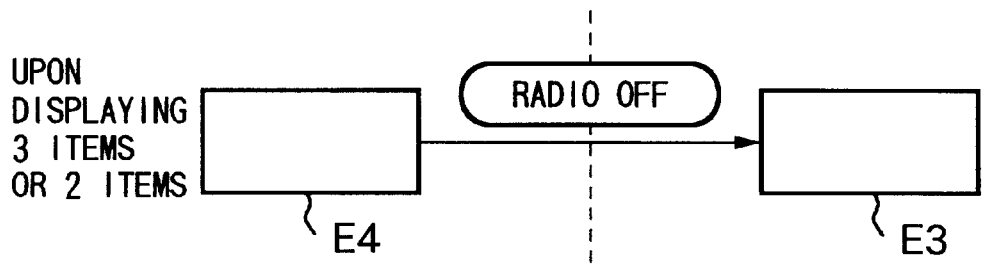

As shown in FIG. 98B, when it is determined in the arbitration that a certain switch has been operated, and the number of items to be displayed decreases from three (e.g., time, air-conditioner, and radio items) to two (e.g., time and air-conditioner items), the screen display is switched from the display example E4 in FIG. 94D as that before the switch operation to the display example E3 in FIG. 94C as that after the user has turned off the radio switch to turn off the radio function.

(Upon Displaying Four Items→Three Items)

Figure 98C:
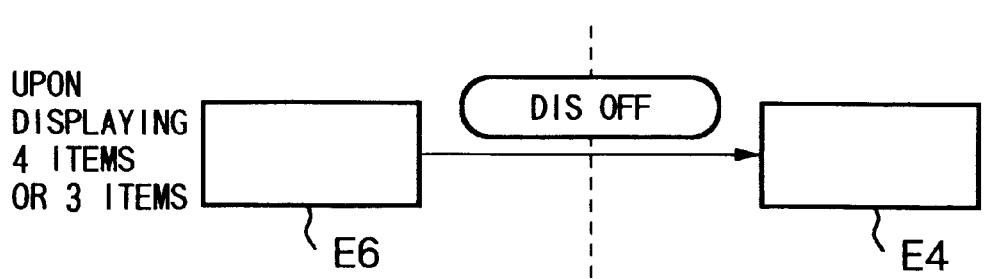

As shown in FIG. 98C, when it is determined in the arbitration that a certain switch has been operated, and the number of items to be displayed decreases from four (e.g., time, air-conditioner, radio, and DIS items) to three (e.g., time, air-conditioner, and radio items), the screen display is switched from the display example E6 in FIG. 94E as that before the switch operation to the display example E4 in FIG. 94D as that after the user has turned off the DIS switch to turn off the DIS function.

<Upon Switch Operation Requiring Increase in Number of Display Items>
(Upon Displaying Three Items→Four Items)

Figure 99A:
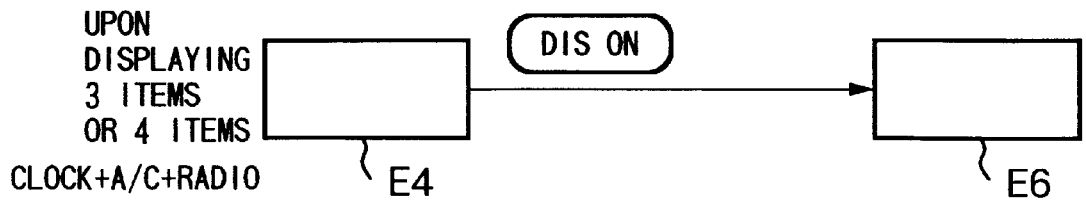
FIGS. 99A to 99C are charts showing examples of the screen displays in the arbitration shown in FIG. 83.

As shown in FIG. 99A, when it is determined in the arbitration that a certain switch has been operated, and the number of items to be displayed increases from three (e.g., time, air-conditioner, and radio items) to four (e.g., time, air-conditioner, radio, and DIS items), the screen display is switched from the display example E4 in FIG. 94D as that before the switch operation to the display example E6 in FIG. 94E as that after the user has turned on the DIS switch to turn on the DIS function.

(Upon Changing Display Method)

Figure 99B:
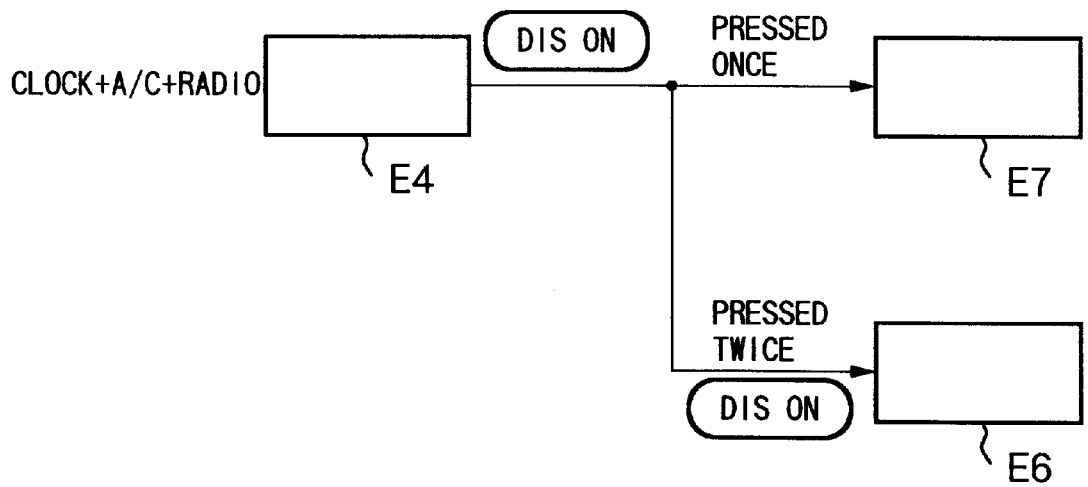

As shown in FIG. 99B, when the display method is to be changed by switch operation in the arbitration, the screen display is switched from the display example E4 in FIG. 94D as that before the switch operation to the display example E7 in FIG. 94G when the user has turned on the DIS switch once, and to the display example E6 in FIG. 94E as that after the DIS function is enabled when the user has successively turned on the DIS switch twice.

(Upon Displaying Four Items→Five Items)

Figure 99C:
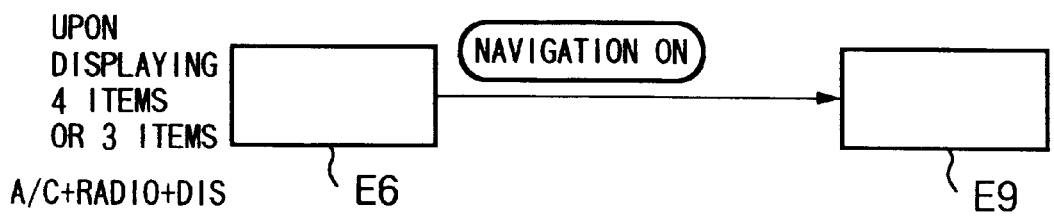

As shown in FIG. 99C, when it is determined in the arbitration that a certain switch has been operated, and the number of items to be displayed increases from four (e.g., time, air-conditioner, radio, and DIS items) to five (e.g., time, air-conditioner, radio, DIS, and navigation items), the screen display is switched from the display example E6 in FIG. 94E as that before the switch operation to a display example E9 in FIG. 94I as that after the user has turned on the navigation switch to enable the navigation function.

Note that the present invention may be applied to modifications and changes of the above embodiments without departing from the spirit and scope of the invention.

For example, the compound equipment may include a TV tuner, a control unit for controlling the motor and actuator of the air-conditioner apparatus, and the like in addition to the navigation apparatus, DIS apparatus, or the audio apparatus such as a cassette player, radio receiver, and the like as standard equipments of the vehicle.

In the above embodiments, the compound equipment is placed behind the center module. Alternatively, the compound equipment may be placed beneath a seat or in a trunk room, and only the center module may be placed on the dashboard. In this case, the center module and compound equipment are connected to each other via the plug-in connector.

The center module of each of the above embodiments can be applied to devices other than electric device equipments mounted on the vehicle.

As described above, according to the above embodiments, a center module having a console and display for a plurality of electric device units is arranged, and outputs operation signals from the console to the electric device units. In addition, the center module controls the display on the basis of display control signals output from the electric device units, and distributes and outputs the operation signals to the corresponding electric device units. In this way, all the types of vehicles can commonly use electric device components for a vehicle, and a control apparatus, i.e., the center module, which can concentratively control these components is provided, thus reducing the manufacturing cost and assuring easy assembly.

When center modules having different functions and designs are prepared in correspondence with the types of vehicles, the range of choice for the user can be broadened, and the user can choose the center module considering the appearance of the passenger room.

Since the display of the center module directly undergoes display control by a navigation system as one electric device unit, the arithmetic processing load associated with the display control on the center module can be reduced.

The center module is detachably connected to a plurality of electric device units, has a console and display for these electric device units, distributes and outputs operation signals from the console to the corresponding electric device units, and controls the display on the basis of display control signals output from the electric device units. For this reason, all the types of vehicles can commonly use electric device components for a vehicle, and a control apparatus, i.e., the center module that can concentratively control these components is used, thus reducing the manufacturing cost and assuring easy assembly.

When center modules having different functions and designs are prepared in correspondence with the types of vehicles, the range of choice for the user can be broadened, and the user can choose the center module considering the appearance of the passenger room.

According to the above embodiments, after the ECU of the center module distributes and outputs operation signals to the ECUs of the corresponding electric device units, it controls the display on the basis of display control signals output from the ECUs of the electric device units. Hence, since the ECU executes display control after it confirms if each electric device unit has executed control corresponding to the user's switch operation, it can execute the display control while detecting failures and the like in the electric device units.

Also, the ECU of the center module distributes and outputs operation signals to the ECUs of the corresponding electric device units, and controls the display on the basis of display control signals corresponding to the operation signals output to the ECUs of the electric device units. Therefore, since the display control is done at substantially the same timing as the user's switch operation, the user practically does not feel delays of the display control upon switch operation.

The ECU of the center module has a first mode for distributing and outputting operation signals to the ECUs of the corresponding electric device units, and then controlling the display on the basis of display control signals output from the ECUs of the electric device units, and a second mode for distributing and outputting operation signals to the ECUs of the corresponding electric device units, and controlling the display on the basis of display control signals corresponding to the operation signals output to the ECUs of the electric device units, and comprises switching means for selecting one of the first and second modes in correspondence with the operation signals. In this manner, the display control can be appropriately done in correspondence with the user's switch operation.

According to the above embodiments, when the drawing control circuit for the display receives display control signals from the ECUs of a plurality of electric device units, it selects some of the display control signals according to a predetermined condition, and controls the display on the basis of the selected display control signals. Therefore, even when the display is commonly used, items necessary for the user can be appropriately displayed in accordance with the failure level, priority order, and the like when a plurality of image signals are input from the compound equipment by switch operations and the like.

When the drawing control circuit for the display receives display control signals from the ECUs of a plurality of electric device units, it reduces the scales of the display control signals according to a predetermined condition and displays images corresponding to the plurality of reduced-scale display control signals. In this way, even when the display is commonly used, items necessary for the user can be appropriately displayed in accordance with the failure level, priority order, and the like when a plurality of image signals are input from the compound equipment by switch operations and the like.

According to the above embodiments, an electronic apparatus equipment comprises a plurality of electric device units, a unit-side coupling portion which is arranged on one of the electric device units, and outputs information of the electric device units together, and a vehicle-body-side coupling portion which is coupled to the unit-side coupling portion, and inputs/outputs information associated with the electric device units. Hence, the connection between a plurality of electric device components and the vehicle-body-side connector can be simultaneously attained, thus assuring easy assembly and high operability.

Also, as data input/output to/from the electric device components are generalized, the arithmetic processing load on other electric device components can be reduced.

Furthermore, for the electric device units can be coupled to the vehicle body by the unit-side coupling portion that outputs information of a plurality of electric device units together, these units need not be coupled using their own connectors unlike in the conventional apparatus. Note that the unit-side coupling portion need not always be coupled to a plurality of electric device units upon coupling to the vehicle body, and so-called subassemblies (they can be coupled to each other in advance) can be prepared to improve operability upon coupling to the vehicle body.

As many apparently widely different embodiments of the present invention can be made without departing from the spirit and scope thereof, it is to be understood that the invention is not limited to the specific embodiments thereof except as defined in the appended claims.

What is claimed is:

1. An electronic equipment apparatus comprising:

a plurality of information processing units which are formed independent of each other and execute different information processing calculations;

a plurality of cases which store each of said information processing units;

a panel body which is formed independently of said information processing units, and has an output portion for a passenger and an input portion operated by the passenger; and a controller which is adapted to, when said information processing units and said panel body are connected to each other, control to operate said information processing units in accordance with a passenger's operation for said input portion, and to output a processing state of each of said information processing units to said output portion, wherein said panel body constitutes a portion of a wall surface in a passenger room, and covers entire surfaces of the cases of said information processing units which face to the passenger room so that said information processing units cannot be visually observed from the passenger room.

wherein when at least one of said information processing units which have a unit-side loading/unloading port of an information storage medium is mounted, a panel-side loading/unloading port of the information storage medium corresponding to said unit-side loading/unloading port is formed on said panel body, and wherein when said information processing unit which has the unit-side loading/unloading port is not mounted, said panel-side loading/unloading port is closed by a lid member.

2. The apparatus according to claim 1, wherein said information processing units overlap each other in a vertically stacked state in a direction parallel to said panel body.

3. The apparatus according to claim 1, wherein an opening portion having a predetermined shape is formed on the wall surface in the passenger room, and is covered by said panel body which is formed in correspondence with the shape of said opening portion, and said information processing units are arranged on a side opposite to the passenger room to sandwich said panel body therebetween, and cannot be visually observed from the passenger room due to the presence of said panel body.

4. The apparatus according to claim 1, wherein said panel body comprises a sensor serving as said input portion.

5. The apparatus according to claim 1, wherein said panel body comprises a microphone serving as said input portion.

6. The apparatus according to claim 1, wherein said panel body comprises a receiver for receiving a radio signal from a remote control switch serving as said input portion.

7. The apparatus according to claim 1, wherein said output portion comprises at least one of a display and a lamp which visually transmit information.

8. The apparatus according to claim 1, wherein said output portion comprises a loudspeaker for audibly transmitting information.

9. The apparatus according to claim 1, wherein air-conditioning air outlets are formed on right and left end portions of said panel body.

10. The apparatus according to claim 1, wherein said panel body has an ashtray.

11. The apparatus according to claim 10, wherein said ashtray is detachably mounted to an opening of the panel body, a panel-side connector and a vehicle body-side connector, by which the electric device unit and a vehicle body side member are coupled, are firmly coupled using a coupling member via the opening.

12. The apparatus according to claim 1, wherein said panel body has a cigarette lighter.

13. The apparatus according to claim 1, wherein said panel body has a cup holder.

14. The apparatus according to claim 1, wherein said information processing units include at least one of an audio control unit, an air-conditioner control unit, and a navigation control unit.

15. The apparatus according to claim 1, wherein said information processing units include at least an audio unit and an air-conditioner control unit, said output portion of said panel body comprises an information display portion for visually transmitting information, and said input portion of said panel body comprises an audio operation input portion, and an air-conditioner operation input portion.

16. The apparatus according to claim 15, wherein said information display portion, audio operation input portion, and air-conditioner operation input portion are arranged on said panel body, with said information display portion being located at an uppermost position, said air-conditioner operation input portion being located at a lowermost position, and said audio operation input portion being located between said information display portion and said air-conditioner operation input portion.

17. The apparatus according to claim 15, wherein said information display portion displays operation states of said audio unit and an air conditioner.

18. The apparatus according to claim 15, wherein said panel body has at least one of an ashtray and cup holder, and said ashtray or cup holder is arranged below said air-conditioner operation input portion.

19. The apparatus according to claim 15, wherein air-conditioning air outlets are formed on right and left end portions of said panel body, and
a level of said air-conditioning air outlets falls within a level range between said information display portion and said audio operation input portion.

20. The apparatus according to claim 1, wherein said controller is arranged in said panel body, and is connected to said output portion, input portion, and information processing units.

21. The apparatus according to claim 1, wherein said panel body further comprises other input/output portion which is not related to each of said information processing unit.

22. The apparatus according to claim 21, wherein said input/output portion includes at least one of a lamp ON/OFF-control portion, a lid-open control portion, a vehicle light adjustment control portion or an anti-theft control portion.

23. An electronic equipment apparatus comprising:
a plurality of electric device units;
a plurality of cases which store each of said electric device units;
first control means, arranged in each of said electric device units, for controlling operation of the electric device unit;
operation means which is formed independently of said electric devices and has a console and display for said electric device units; and
second control means, arranged in said operation means, for distributing and outputting operation signals from said console to said first control means of the corresponding electric device units,
wherein said electric device units include at least a car navigation system, and said first control means of said car navigation system directly controls said display of said operation means without mediating said second control means.

24. The apparatus according to claim 23, wherein said plurality of electric device units are independently and detachably connected to said operation means.

25. The apparatus according to claim 23, wherein said electric device units include at least an air-conditioner apparatus for a vehicle, said second control means outputs an operation signal from said console to said air-conditioner apparatus for the vehicle, and driving of said air-conditioner apparatus for the vehicle is independently controlled by said second control means on the basis of the operation signal.

26. The apparatus according to claim 23, wherein said second control means detects operation states of said electric device units.

27. The apparatus according to claim 23, wherein said second control means outputs an image signal to a drawing circuit of the car navigation system, and wherein said drawing circuit forms a drawing signal from the signal and controls a display of the operation means.

28. An electronic equipment apparatus comprising:
a plurality of electric device units;
first control means, arranged in each of said electric device units, for controlling operation of the electric device unit;
operation means having a console and display for said electric device units; and
second control means, arranged in said operation means, for outputting operation signals from said console to said first control means and controlling said display on the basis of display control signals output from said first control means,
wherein said second control means distributes and outputs the operation signals to said first control means of the corresponding electric device units, and controls said display on the basis of display control signals corresponding to the operation signals output to said first control means.
wherein said second control means has a first mode for distributing and outputting the operation signals to said first control means of the corresponding electric device units, and then controlling said diplay on the basis of display control signals output from said first control means, and a second mode for distributing and outputting the operation signals to said first control means of the corresponding electric device units, and controlling said display on the basis of display control signals corresponding to the operation signals output to said first control means, and
wherein said second control means comprises switching means for selecting one of the first and second modes in accordance with the operation signals.

29. The apparatus according to claim 28, wherein said switching means selects the second mode in accordance with an operation signal indicating power ON.

30. The apparatus according to claim 28, wherein said electric device units include at least an air-conditioner apparatus for a vehicle, and said switching means selects the second mode when said air-conditioner apparatus is operating in a manual mode, and selects the first mode when said air-conditioner apparatus is operating in an auto mode.

31. The apparatus according to claim 28, wherein said electric device unit is an air-conditioner apparatus for a vehicle, and said switching means selects the second mode when any of a temperature setting switch for the air-conditioner in an auto mode, fan, temperature or a duct setting for the air-conditioner in a manual mode is operated, and selects the first mode when either the fan or duct setting switch for the air-conditioner in the auto mode is operated.

32. An electronic equipment apparatus comprising:
a plurality of electric device units which are formed independent of each other;
a plurality of cases which store each of said electric device units;
first control means, arranged in each of said electric device units, for controlling operation of the electric device unit;
display means having a display; and
second control means for controlling said display on the basis of a display control signal output from each first control means,
wherein said second control means judges a failure level, determines a display area of which is changeable on the basis of the failure level and display failure contents on said determined display area, and
wherein, when said second control means receives display control signals from a plurality of first control means, said second control means selects some of the display control signals on the basis of a predetermined condition, and controls said display other than the determined display area on the basis of the selected display control signals.

33. The apparatus according to claim 32, wherein the predetermined condition includes an ON operation of an ignition switch of a vehicle, and when the ignition switch of the vehicle is turned on, said second control means selects a display control signal output from said first control means and associated with a timepiece.

34. The apparatus according to claim 32, wherein the predetermined condition includes an emergency level during vehicle travel.

35. The apparatus according to claim 32, wherein said display means has a console for said electric device units, and said second control means preferentially selects a display control signal according to an operation signal from said console.

36. The apparatus according to claim 35, wherein upon receiving a predetermined operation signal from said console, said second control means inhibits a display image from being preferentially displayed in accordance with the operation signal from said console.

37. The apparatus according to claim 32, wherein when said second control means receives display control signals from a plurality of first control means, said second control means reduces scales of a plurality of display control signals on the basis of a predetermined condition, and displays display images according to the plurality of reduced-scale display control signals.

38. The apparatus according to claim 37, wherein the predetermined condition includes an emergency level during vehicle travel.

39. The apparatus according to claim 32, wherein said second control means scales of a display area of failure contents and displays the failure contents on the reduced display area, when a certain switch is operated during the failure contents are displayed.

40. An electronic equipment apparatus comprising:
a plurality of electric device unit which are formed independent of each other;
a plurality of cases which store each of said electric device units;
a unit-side coupling portion for outputting information of said plurality of electric device units together; and
a vehicle-body-side coupling portion which is coupled to said unit-side coupling portion, and inputs/outputs information associated with said electric device units.
wherein each of said electric device units overlap each other in a vertically stacked state in a direction parallel to said panel body,
wherein said unit-side coupling portion is mounted on a surface of a specific electric device unit opposite to the panel body, and
wherein a support portion for supporting said plurality of electric device units on a vehicle-body-side support portion is mounted on a surface of said electric device unit located above the specific electric device unit opposite to the panel body.

41. The apparatus according to claim 40, wherein said vehicle-body-side coupling portion is fixed to a portion of a vehicle body, which has high rigidity.

42. The apparatus according to claim 40, wherein an engaging direction of said electric device units with respect to said support portion substantially agrees with a coupling direction of said unit-side coupling portion to said vehicle-body-side coupling portion.

43. The apparatus according to claim 40, further comprising a panel member which is connected to said electric device units, and has a console and display for said plurality of electric device units, and wherein said unit-side coupling portion is mounted on said panel member.

44. The apparatus according to claim 40, wherein the specific electric device unit is an air-conditioner control unit.

45. The apparatus according to claim 40, wherein the specific electric device unit is a lowermost one of said plurality of electric device units.

46. The apparatus according to claim 40, wherein the specific electric device unit is a unit which is equipped on a vehicle as a standard unit.

47. The apparatus according to claim 40, wherein saud vehicle-body-side coupling portion and unit-side-coupling portion are supported with a single bracket.

48. An electronic equipment apparatus comprising:
a plurality of electric device units which are formed independent of each other;
a plurality of cases which store each of said electric device units;
a unit-side coupling portion for outputting information of said plurality of electric device units together;
a vehicle-body-side coupling portion which is coupled to said unit-side coupling portion, and inputs/outputs information associated with said electric device units; and
a panel member which is connected to said electric device units, and has a console and display for said plurality of electric units,
wherein said unit-side coupling portion is mounted on said panel member.

49. An electronic equipment apparatus comprising:
a plurality of electric device units which are formed independent of each other;
a plurality of cases which store each of said electric device units;
a unit-side coupling portion for outputting information of said plurality of electric device units together; and
a vehicle-body-side coupling portion which is coupled to said unit-side coupling portion, and inputs/outputs information associated with said electric device units;
wherein said unit-side coupling portion is mounted on specific electric unit main body, and
wherein the specific electric unit is an air-conditioner control unit.

* * * * *

UNITED STATES PATENT AND TRADEMARK OFFICE
CERTIFICATE OF CORRECTION

PATENT NO.   : 6,119,060
DATED        : September 12, 2000
INVENTOR(S)  : Masatoshi Takayama, et al.

Page 1 of 1

It is certified that error appears in the above-identified patent and that said Letters Patent is hereby corrected as shown below:

<u>Title page,</u>
Item [56] References Cited, please add: -- 5,127,057   6/1992   Chapman --;
Item [56] FOREIGN PATENT DOCUMENTS, change "61-244636   10/1996   Japan" to -- 61-244636   10/1986   Japan --;
Item [56] FOREIGN PATENT DOCUMENTS, please add:
-- 60 121142   6/1985   Japan
   4-43724     2/1992   Japan
   8-295181    11/1996  Japan
   6-132836    5/1994   Japan
   8-318792    12/1996  Japan
   2-190030    7/1990   Japan --.

<u>Column 44,</u>
Line 22, (claim 47), change "saud" to -- said --.

Signed and Sealed this

Ninth Day of October, 2001

Attest:

NICHOLAS P. GODICI
Attesting Officer    Acting Director of the United States Patent and Trademark Office